March 5, 1963 G. E. HAGEN ET AL 3,080,548

COMPUTER MEMORY SECTION SELECTION SYSTEM

Original Filed Aug. 18, 1953 39 Sheets-Sheet 1

INVENTORS
GLENN E. HAGEN
JOSEPH ALLAN BEEK JR

BY Strauch, Nolan & Diggins
ATTORNEYS

FF - FLIPFLOP
OS - ONESHOT
RA - READ AMP
WA - WRITE AMP
PR - PUSH PULL READ AMP
PW - PUSH PULL WRITE AMP
DI - DIODE CARD
RE - RESISTOR
CR - CLOCK READ
CD - CLOCK DRIVER

INVENTORS
GLENN E. HAGEN
JOSEPH ALLAN BEEK JR
BY Strauch, Nolan & Diggins
ATTORNEYS

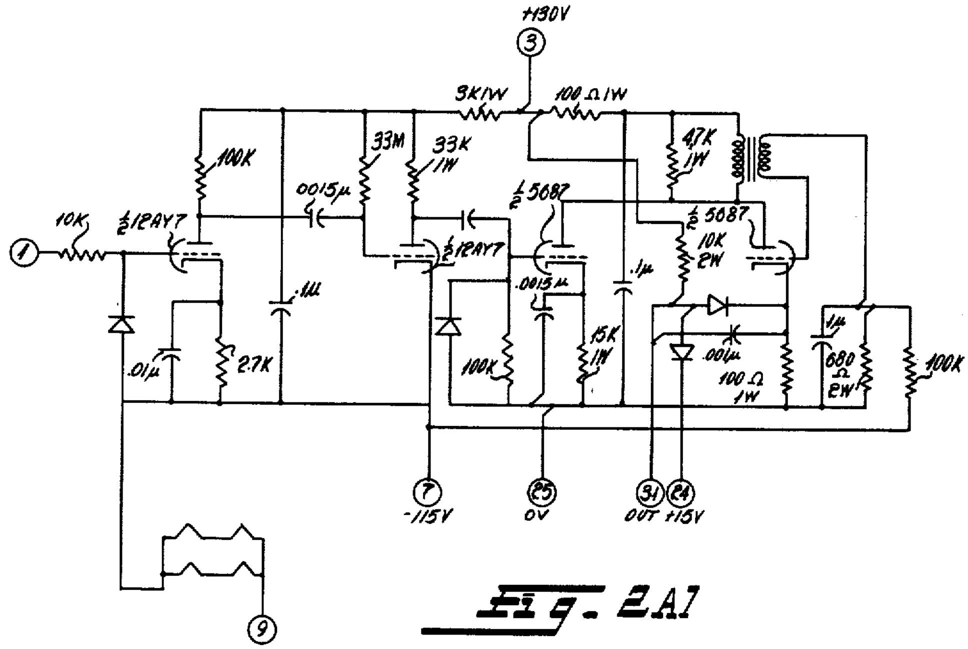
FIG. 2A1
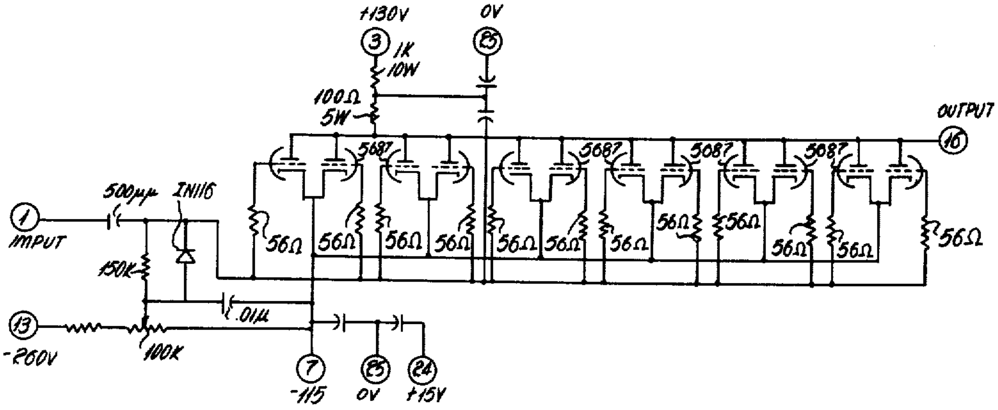
FIG. 2B1
INVENTORS
GLENN E. HAGEN
JOSEPH ALLAN BEEK, JR.
BY
Strauch, Nolan & Neale
ATTORNEYS

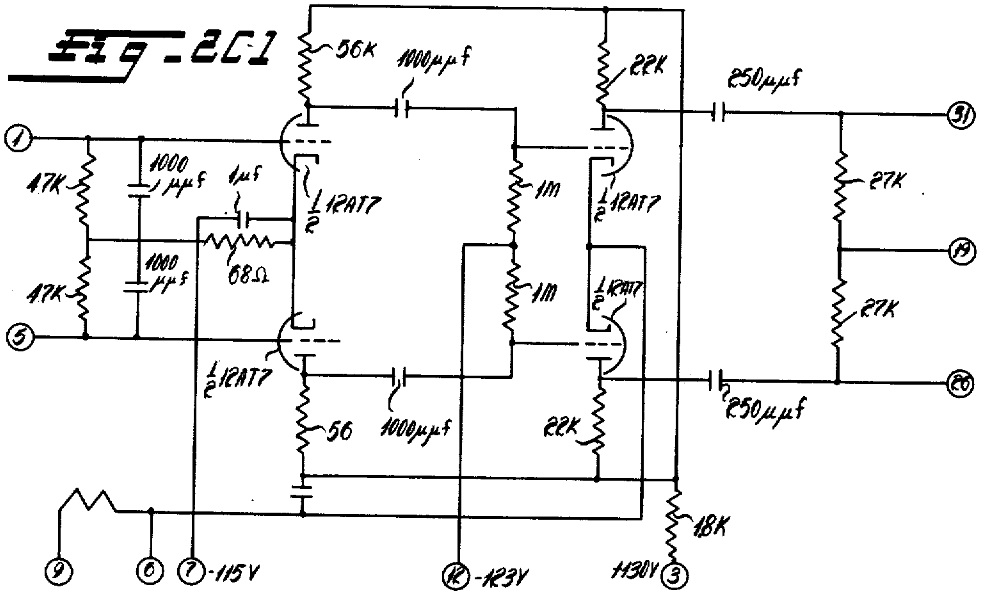
Fig. 2C1
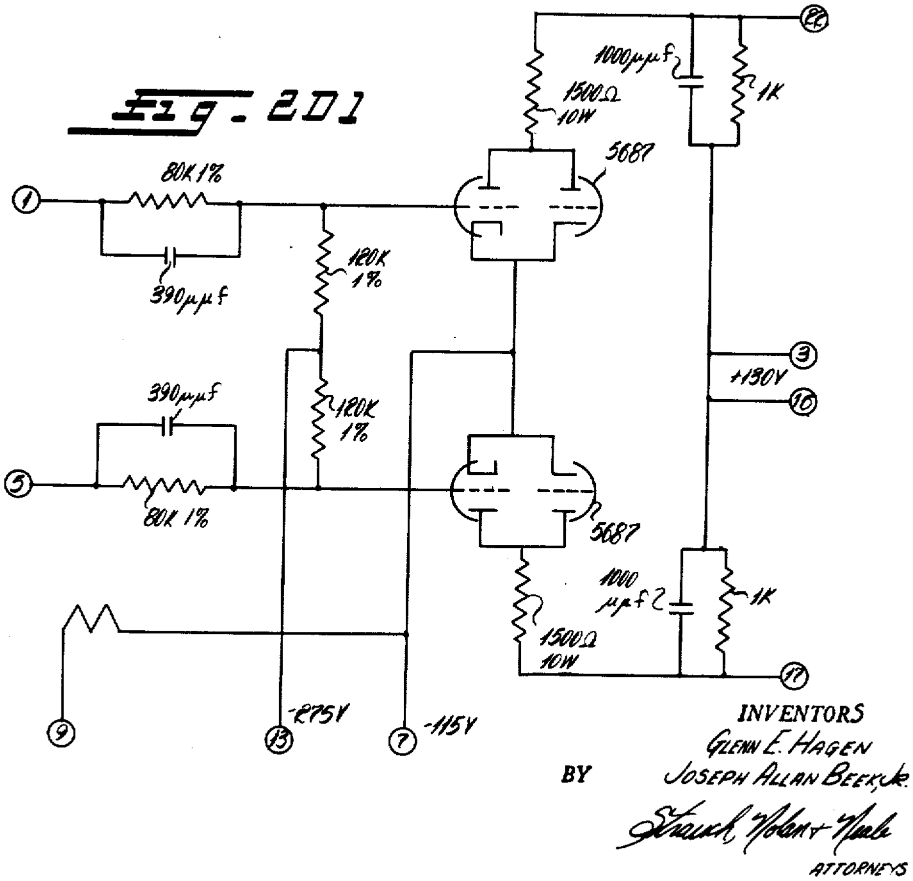
Fig. 2D1
INVENTORS
GLENN E. HAGEN
JOSEPH ALLAN BEEK, JR.
BY
Staunch, Nolan & Neale
ATTORNEYS

PUSH PULL READ AMPLIFIER (PR)

INVENTORS
GLENN E. HAGEN
JOSEPH ALLAN BEEK JR.

BY Strauch, Nolan & Diggins
ATTORNEYS

D-DRIVER (FIGS. 3B)
FF-FLIPFLOP (FIGS. 3A)
Re-RESISTOR (FIGS. 2E)
OS-ONESHOT (FIGS. 3F)
DI-DIODE (FIGS. 3C)
IC-INPUT CIRCUIT for FLIPFLOPS (FIGS. 3E)
RU-RESISTOR (FIGS 3D)

INVENTORS
GLENN E. HAGEN
JOSEPH ALLAN BEEK JR.
BY Strauch, Nolan & Diggins
ATTORNEYS

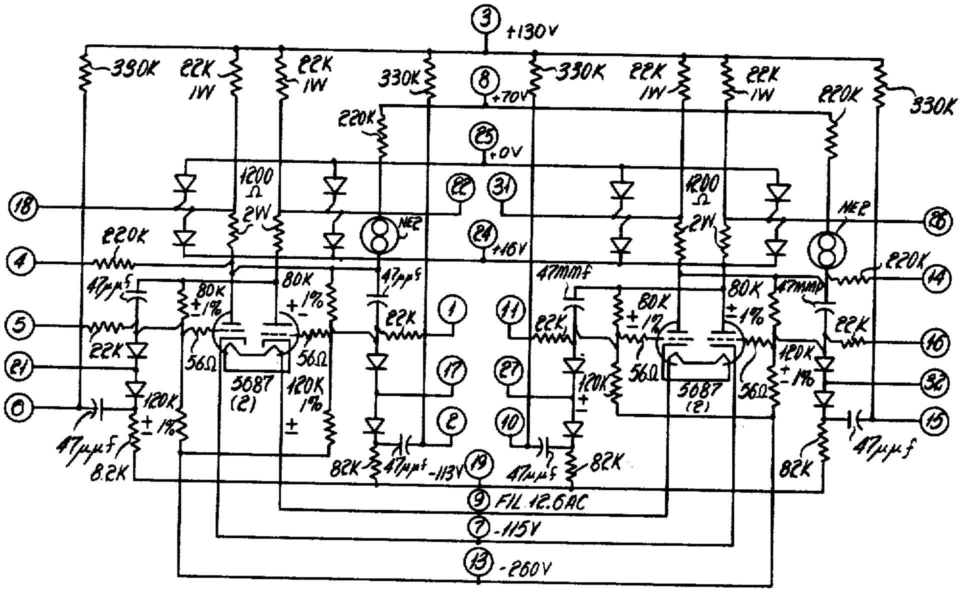
Fig. 3A1
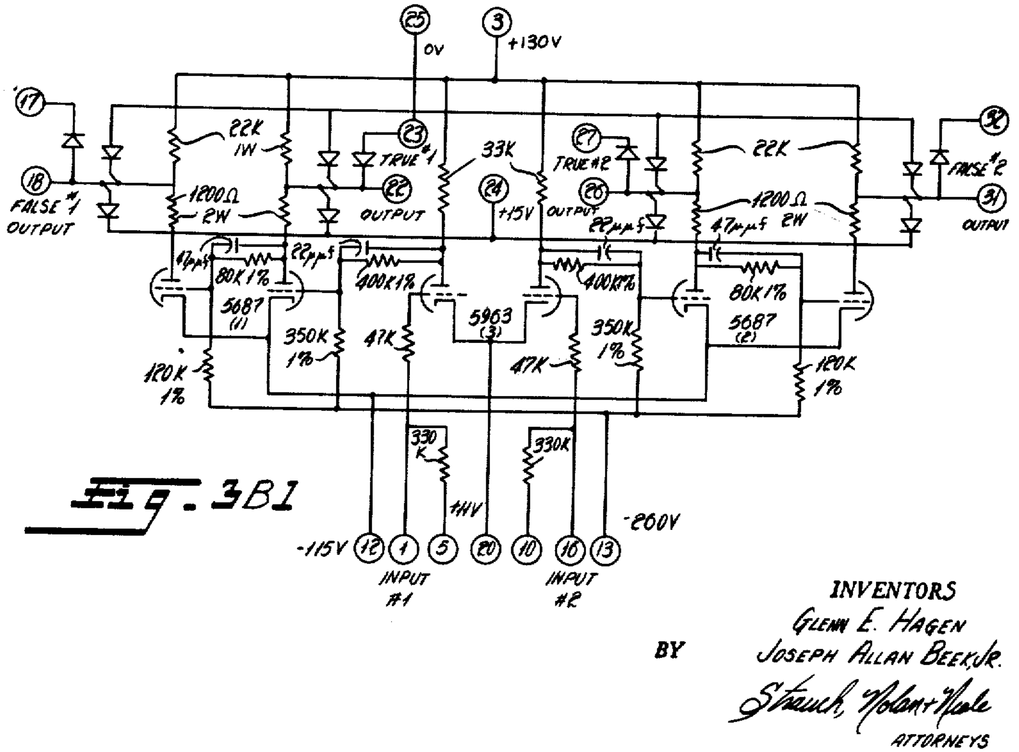
Fig. 3B1
INVENTORS
Glenn E. Hagen
Joseph Allan Beek, Jr.
BY
Strauch, Nolan & Neale
ATTORNEYS

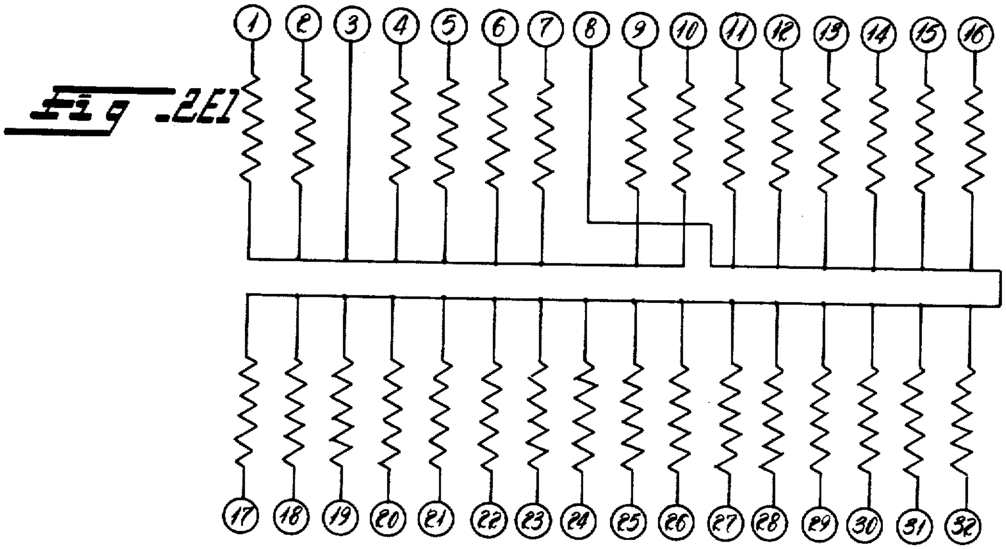
FIG. 2E1
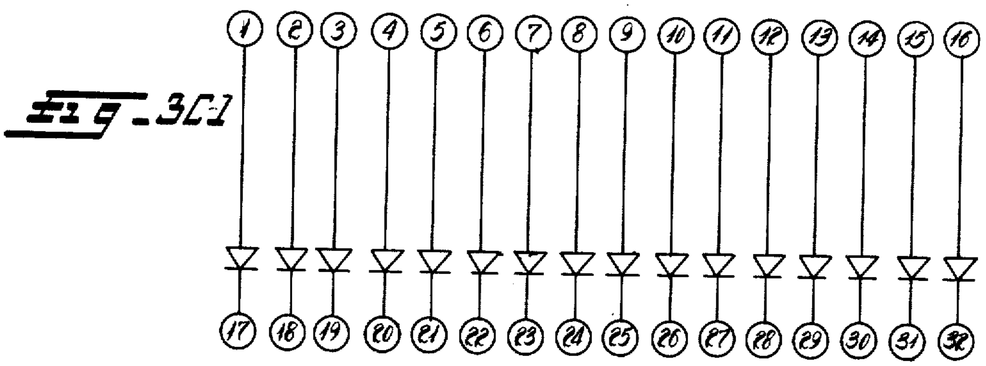
FIG. 3C1
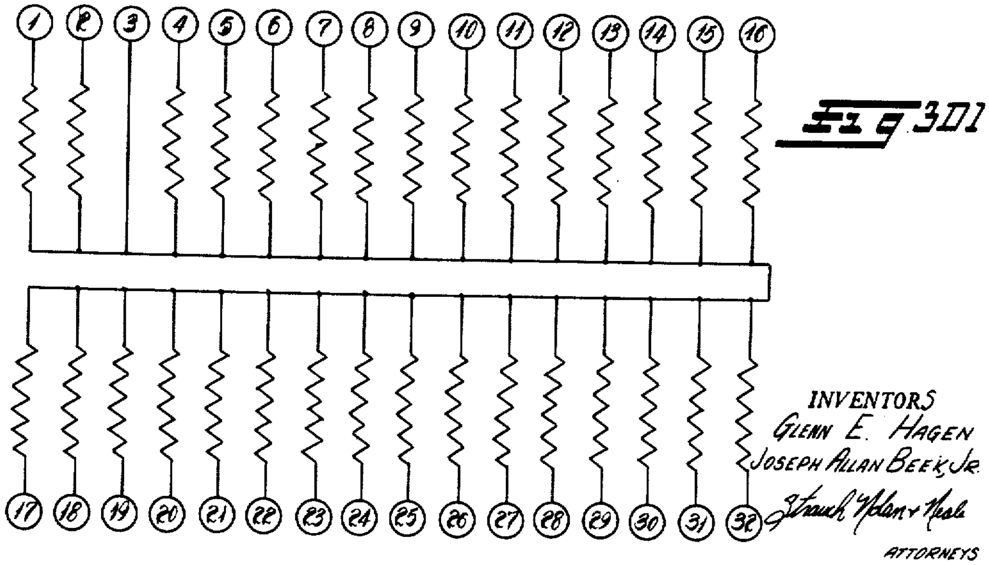
FIG. 3D1
INVENTORS
GLENN E. HAGEN
JOSEPH ALLAN BEEK, JR.
Strauch, Nolan & Neale
ATTORNEYS

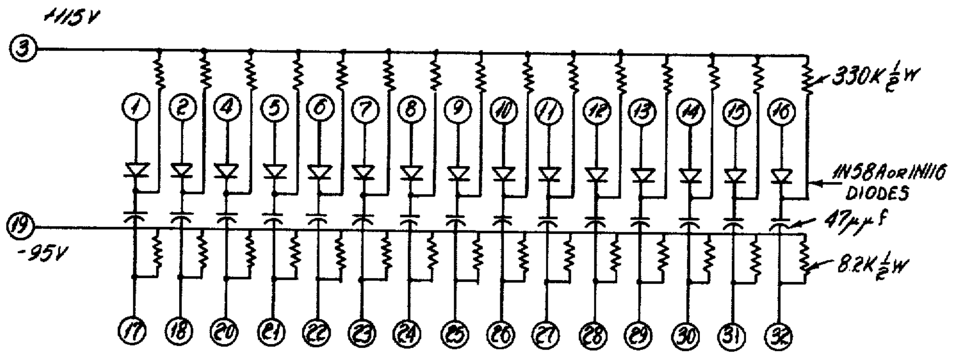
FIG. 3E1
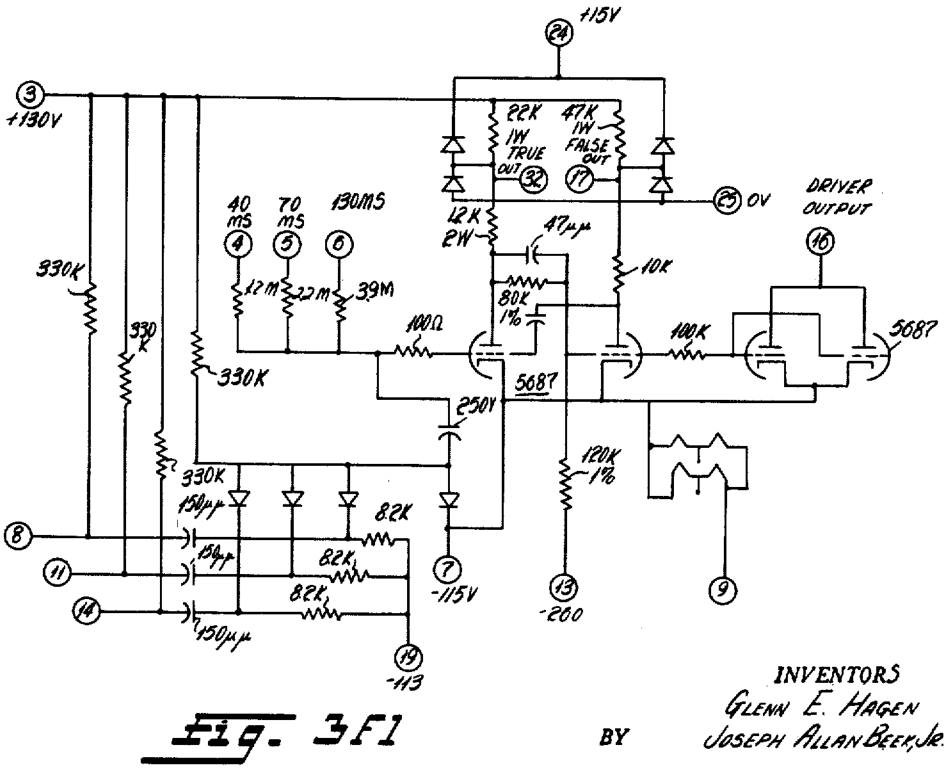
FIG. 3F1
INVENTORS
GLENN E. HAGEN
BY JOSEPH ALLAN BEEK, JR.
Strauch, Nolan & Neale
ATTORNEYS INVENTORS
GLENN E. HAGEN
JOSEPH ALLAN BEEK JR.
BY Strauch, Nolan & Diggins
ATTORNEYS March 5, 1963 G. E. HAGEN ET AL 3,080,548

COMPUTER MEMORY SECTION SELECTION SYSTEM

Original Filed Aug. 18, 1953 39 Sheets-Sheet 11

INVENTORS
GLENN E. HAGEN
JOSEPH ALLAN BEEK JR.

BY Strauch, Nolan & Diggins
ATTORNEYS

INVENTORS
GLENN E. HAGEN
JOSEPH ALLAN BEEK JR.
BY Strauch, Nolan & Diggins
ATTORNEYS March 5, 1963 G. E. HAGEN ET AL 3,080,548
COMPUTER MEMORY SECTION SELECTION SYSTEM
Original Filed Aug. 18, 1953 39 Sheets-Sheet 13
FIG. 13
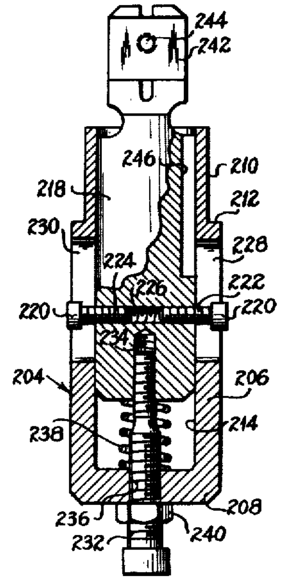
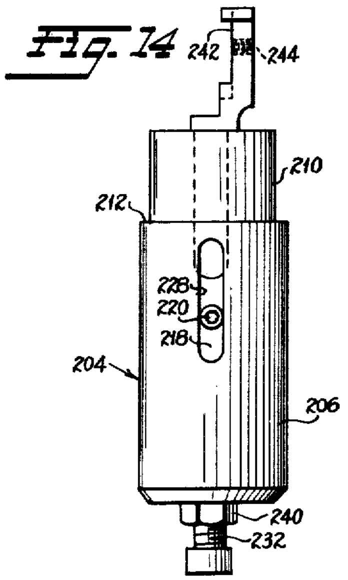
FIG. 15
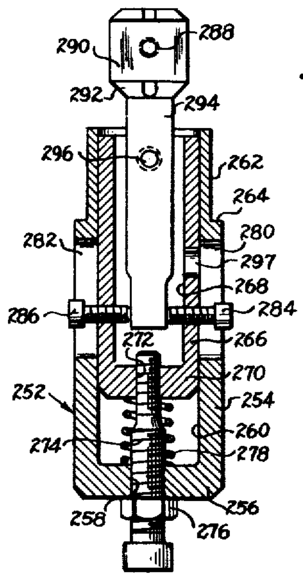
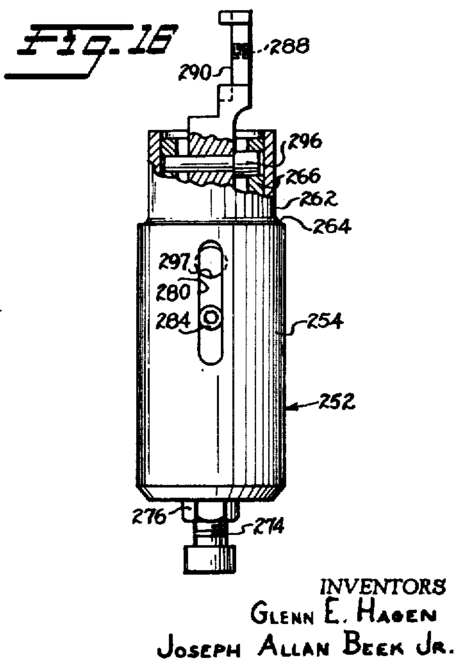
INVENTORS
GLENN E. HAGEN
JOSEPH ALLAN BEEK JR.
BY Strauch, Nolan & Diggins
ATTORNEYS

LAYOUT OF CHANNEL DESIGNATIONS RECORDED IN MAIN MEMORY

WORD PAIR DESIGNATIONS RECORDED ON F CHANNEL AT E33, P33, E34 + P34

INVENTORS
GLENN E. HAGEN
JOSEPH ALLAN BEEK Jr.
BY Strauch, Nolan & Diggins
ATTORNEYS INVENTORS
GLENN E. HAGEN
JOSEPH ALLAN BEEK JR
BY Strauch, Nolan + Diggins
ATTORNEYS March 5, 1963 G. E. HAGEN ET AL 3,080,548

COMPUTER MEMORY SECTION SELECTION SYSTEM

Original Filed Aug. 18, 1953 39 Sheets-Sheet 16

TIMING CHART

BY Strauch, Nolan & Diggins
ATTORNEYS

INVENTORS
GLENN E. HAGEN
JOSEPH ALLAN BECK JR

COMPUTER MEMORY SECTION SELECTION SYSTEM

Original Filed Aug. 18, 1953 39 Sheets-Sheet 17

INVENTORS
GLENN E. HAGEN
JOSEPH ALLAN BEEK JR.

BY Strauch, Nolan & Diggins
ATTORNEYS

COMPUTER MEMORY SECTION SELECTION SYSTEM

INVENTORS
GLENN E. HAGEN
JOSEPH ALLAN BEEK JR
BY
Strauch, Nolan & Diggins ATTORNEYS

FIG. 23

ABb - ABr

ABb' - ABr'

ABr - AB

ABw - Ar

Ad - 08(φ2 An) + φ7'(0605)(An P0) + (06 05 04 03 φ7 Bn) + (06 05 04 03 φ0'φ1'φ2' P0' P1') U1' Al
+(06 05 04 03 φ0'φ1 φ2' P0' P1' U1) Al Dn Rd + (06 05 04 03 φ0'φ1'φ2' P0' P1' U1) Al Dn' Rd'
+(06 05 04 03 φ0'φ1'φ2' P0' P1 U1) Al' Dn Rd' + (06 05 04 03 φ0'φ1'φ2 P0' P1 U1) Al' Dn' Rd
+(06 05 04 03 φ0'φ1'φ2' P1) U1' S1 + (06 05 04 03 φ0'φ1'φ2' P1 U1) S1 Dn'
+(06 05 04 03 φ0'φ1'φ2' P1 U1) S1' Dn

Ae - Be (F1'C)

Ae' - Be' (F1'C)

Al - An (F1'C)

Al' - An' (F1'C)

An - Ae (F1'C)

An' - Ae' (F1'C)

Ar - Ad (F1 C) + Br (F1'C)

Ar' - Ad' (F1 C) + Br' (F1'C)

Bl - Bn (F1 C)

Bl' - Bn' (F1 C)

Bd - (06 05 04 03 φ0'φ1'φ2' P0' P1') Bl + (06 05 04 03 φ0'φ1'φ2' P1) S2 + (06 05 04 03 φ7) En
+06(φ7' P0) Bn + φ0 Bn + φ1 Bn + φ2 06 Bn

Be - ABb C

Be' = ABb' C

Bn - Be (F1 C)

Bn' - Be' (F1 C)

Br - Bd (F1 C)

Br' - Bd' (F1 C)

DEb = DEr

DEb' - DEr'

DEr - DE

DEw - Dr

De - Ee (F1'C)

De' - Ee' (F1'C)

Dn - De (F1'C)

Dn' - De' (F1'C)

Dr - (05 φ4')(Dn F1 C) + (φ2'φ4')(Dn F1 C) + 06(Dn F1 C) + 03(Dn F1 C) + 02'(Dn F1 C) + Er(F1'C)

Dr' - (φ2'φ4')(Dn' F1C) + 06(Dn' F1C) + 03(Dn' F1C) + 02'(Dn' F1C) + Er' (F1'C) + (05 φ4')(Dn' F1C)

Ed - (06 05 04 03 φ0'φ1'φ2' P0' P1') El + (06 05 04 03 φ0'φ1'φ2' P1 U1) + (06 05 04 03 φ7 Bn) Dn
+(06 05 04 03 φ7) Bn' Dn' + (06 En)(φ7' P0) + φ2 (08 En) + φ0 En + φ1 En

Ee - DEb C

Ee' - DEb' C

El - En (F1 C)

El' - En' (F1 C)

En - Ee (F1 C)

En' - Ee' (F1 C)

Er - Ed (F1 C)

Er' - Ed' (F1 C)

INVENTORS
GLENN E. HAGEN
JOSEPH ALLAN BEEK JR
BY Strauch, Nolan & Diggins
ATTORNEYS

COMPUTER MEMORY SECTION SELECTION SYSTEM

INVENTORS
Glenn E. Hagen
Joseph Allan Beek Jr.
BY Strauch, Nolan + Diggins
ATTORNEYS INVENTOR.
GLENN E. HAGEN
JOSEPH ALLAN BEEK JR
Strauch, Nolan & Diggins
ATTORNEYS INVENTORS
GLENN E. HAGEN
JOSEPH ALLAN BEEK JR.
BY Strauch, Nolan & Diggins
ATTORNEYS INVENTORS
GLENN E. HAGEN
JOSEPH ALLAN BEEK JR
BY Strauch, Nolan & Diggins
ATTORNEYS

FIG. 29

N (ADDRESS) REGISTER

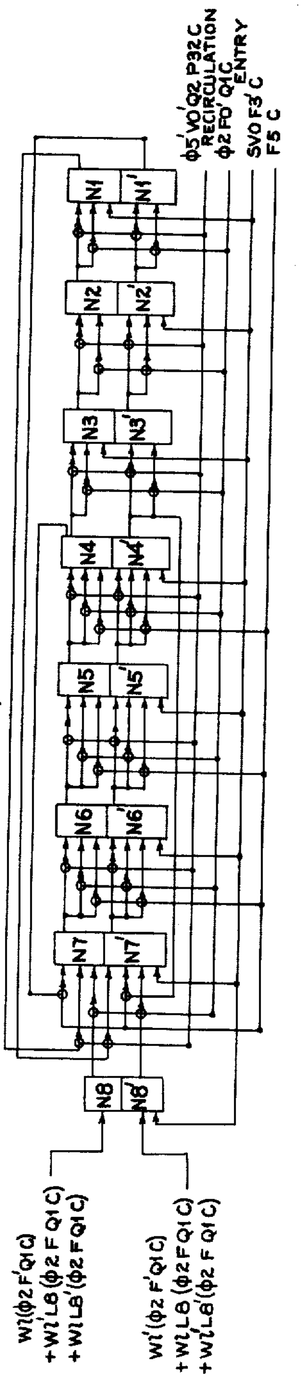

$N1 = (SVO\,F3'C) + N2(\phi 5'\,VO'\,Q2\,P32\,C) + N2(\phi 2\,FO'\,Q1\,C)$ $N1' = N2'(\phi 5'\,VO'\,Q2\,P32C) + N2'(\phi 2\,FO'\,Q1C)$ $N2 = N3(\phi 5'\,VO'\,Q2\,P32\,C) + N3(\phi 2\,FO'\,Q1\,C)$ $N2' = (S\,VO\,F3'\,C) + N3'(\phi 5'\,VO'\,Q2\,P32C) + N3'(\phi 2\,FO'\,Q1\,C)$ $N3 = (S\,VO\,F3'\,C) + N4(\phi 5'\,VO'\,Q2\,P32C) + N4(\phi 2\,FO'\,Q1\,C)$ $N3' = N4'(\phi 5'\,VO'\,Q2\,P32C) + N4'(\phi 2\,FO'\,Q1\,C)$ $N4 = N5(\phi 5'\,VO'\,Q2\,P32C) + N5(\phi 2\,FO'\,Q1\,C) + N5(F5\,C)$ $N4' = (S\,VO\,F3'\,C) + N5'(\phi 5'\,VO'\,Q2\,P32\,C) + N5'(\phi 2\,FO'\,Q1\,C) + N5'(F5\,C)$ $N5 = N6(\phi 5'\,VO'\,Q2\,P32\,C) + N6(\phi 2\,FO'\,Q1\,C) + N6(F5\,C)$ $N5' = (S\,VO\,F3'C) + N6'(\phi 5'\,VO'\,Q2\,P32C) + N6'(\phi 2\,FO'\,Q1\,C) + N6'(F5\,C)$ $N6 = N7(\phi 5'\,VO'\,Q2\,P32C) + N7(\phi 2\,FO'\,Q1\,C) + N7(F5\,C)$ $N6' = N7'(\phi 5'\,VO'\,Q2\,P32C) + N7'(\phi 2\,FO'\,Q1\,C) + N7'(F5\,C) + (S\,VO\,F3'\,C)$ $N7 = N1(\phi 5'\,VO'\,Q2\,P32C) + N8(\phi 2\,FO'\,Q1\,C) + N4(F5\,C)$ $N7' = (S\,VO\,F3'\,C) + N1'(\phi 5'\,VO'\,Q2\,P32C) + N8'(\phi 2\,FO'\,Q1\,C) + N4'(F5\,C)$ $N8 = W1(\phi 2\,F'\,Q1\,C) + W1'L8(\phi 2\,F\,Q1\,C) + W1\,L8'(\phi 2\,F\,Q1\,C)$ $N8' = W1'(\phi 2\,F'Q1\,C) + W1\,L8(\phi 2\,F\,Q1\,C) + W1'L8'(\phi 2\,F\,Q1\,C) + (S\,VO\,F3'C)$ INVENTORS
GLENN E. HAGEN
JOSEPH ALLAN BEEK JR.
BY
Strauch, Nolan & Diggins
ATTORNEYS March 5, 1963 G. E. HAGEN ET AL 3,080,548

COMPUTER MEMORY SECTION SELECTION SYSTEM

Original Filed Aug. 18, 1953 39 Sheets-Sheet 25

PERMANENT MEMORY RECORDING CONTROL CIRCUITRY

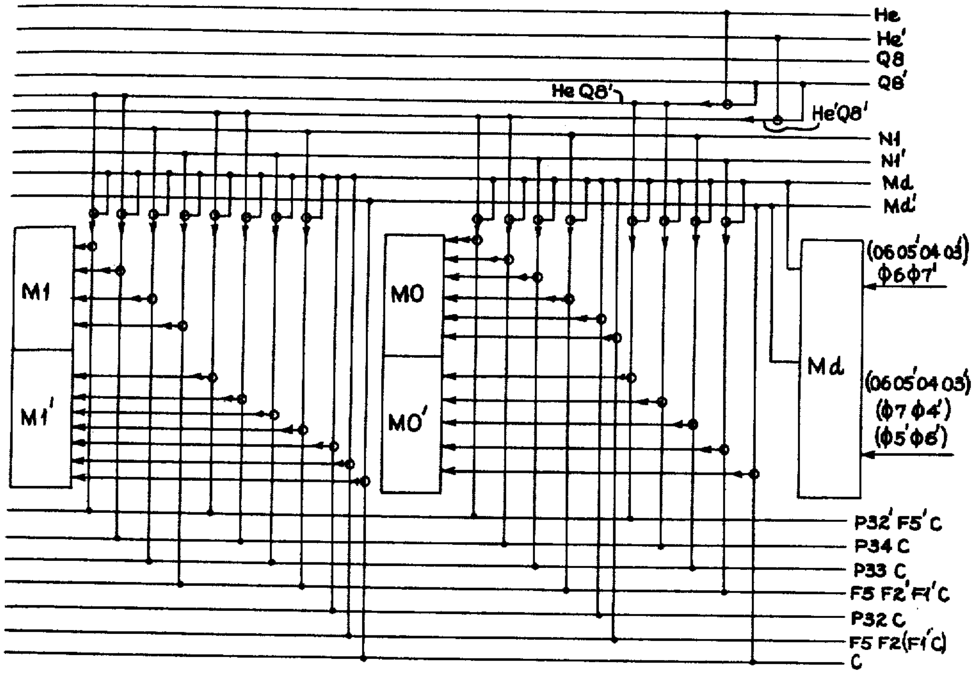

$$\underline{Md} = (06\,05'\,04\,03')\,\phi6\,\phi7' + (06\,05'\,04\,03')(\phi7\,\phi4')(\phi5'\,\phi6')$$

$$\underline{M0} = (He'Q8')(Md\ P32'\,F5'\,C) + (He'Q8')(Md\ P34C) + N1'\,Md\,(P33\,C) + N1\,Md(F5\,F2'\,F1'\,C) + Md\,(P32C) + Md\ F5\ F2\,(F1'C)$$

$$\underline{M0}' = (He\,Q8')(Md\ P32'\,F5'\,C) + (HeQ8')(Md\ P34C) + N1\ Md\ (P33C) + N1'\,Md\ (F5\,F2'\,F1'\,C) + Md'\,C$$

$$\underline{M1} = (He\,Q8')(Md\ P32'\ F5'C) + (He\,Q8')(Md\ P34\,C) + N1\ Md\ (P33C) + N1'\,Md\ (F1'\,F2'\,F5\,C)$$

$$\underline{M1}' = (He'Q8')(Md\ P32'\,F5'\,C) + (He'Q8')(Md\ P34\,C) + N1'\,Md\ (P33C) + N1\ Md\,(F1'\,F2'\,F5\,C) + Md\ (P32\,C) + Md\ F2\,F5\,(F1'C) + Md'\,C$$

Fig. 30

INVENTORS
GLENN E. HAGEN
JOSEPH ALLAN BEEK JR

BY Strauch, Nolan & Diggins
ATTORNEYS

March 5, 1963 G. E. HAGEN ET AL 3,080,548

COMPUTER MEMORY SECTION SELECTION SYSTEM

Original Filed Aug. 18, 1953 39 Sheets-Sheet 26

INVENTORS
GLENN E. HAGEN
JOSEPH ALLAN BEEK JR.
BY Strauch, Nolan & Neale
ATTORNEYS March 5, 1963 G. E. HAGEN ET AL 3,080,548

COMPUTER MEMORY SECTION SELECTION SYSTEM

Original Filed Aug. 18, 1953 39 Sheets-Sheet 27

INVENTORS
GLENN E. HAGEN
JOSEPH ALLAN BEEK JR.

BY Strauch, Nolan & Diggins
ATTORNEYS

INVENTORS
GLENN E. HAGEN
JOSEPH ALLAN BEEK JR.
BY Strauch, Nolan & Diggins
ATTORNEYS

COMPUTER MEMORY SECTION SELECTION SYSTEM

Original Filed Aug. 18, 1953 39 Sheets-Sheet 29

INVENTORS
GLENN E. HAGEN
JOSEPH ALLAN BEEK JR.
BY Strauch, Nolan + Diggins
ATTORNEYS INVENTORS
GLENN E. HAGEN
JOSEPH ALLAN BEEK JR.
BY Strauch, Nolan & Diggins
ATTORNEYS INVENTORS
Glenn E. Hagen
Joseph Allan Beek Jr
BY Strauch, Nolan & Diggins
ATTORNEYS INVENTORS
GLENN E. HAGEN
JOSEPH ALLAN BEEK JR.
BY Strauch, Nolan & Diggins
ATTORNEYS

DIVISION

REGISTERS ARE SET UP TO DIVIDE 25 BY 6. REGISTERS ARE SHOWN WITH COMPUTER IN SEQUENCE φ2, BEFORE DIVISION IS STARTED.

INVENTORS
GLENN E. HAGEN
JOSEPH ALLAN BEEK JR.

BY Strauch, Nolan & Diggins
ATTORNEYS

COMPUTER MEMORY SECTION SELECTION SYSTEM

Original Filed Aug. 18, 1953

INVENTORS
GLENN E. HAGEN
JOSEPH ALLAN BEEK JR

BY Strauch, Nolan + Diggins
ATTORNEYS

INVENTORS
GLENN E. HAGEN
JOSEPH ALLAN BEEK JR.

BY Strauch, Nolan & Diggins
ATTORNEYS

INVENTORS
GLENN E. HAGEN
JOSEPH ALLAN BEEK JR
BY Strauch, Nolan & Diggins
ATTORNEYS March 5, 1963 G. E. HAGEN ET AL 3,080,548

COMPUTER MEMORY SECTION SELECTION SYSTEM

Original Filed Aug. 18, 1953 39 Sheets-Sheet 37

INVENTORS
GLENN E. HAGEN
JOSEPH ALLAN BEEK JR
BY Strauch, Nolan & Neale
ATTORNEYS March 5, 1963 G. E. HAGEN ET AL 3,080,548

COMPUTER MEMORY SECTION SELECTION SYSTEM

Original Filed Aug. 18, 1953 39 Sheets-Sheet 38

INVENTORS
GLENN E. HAGEN
JOSEPH ALLAN BEEK JR.
BY Strauch, Nolan & Neale
ATTORNEYS INVENTORS
GLENN E. HAGEN
JOSEPH ALLAN BEEK JR.
BY Strauch, Nolan + Neale
ATTORNEYS

United States Patent Office 3,080,548
Patented Mar. 5, 1963

3,080,548

COMPUTER MEMORY SECTION SELECTION SYSTEM

Glenn E. Hagen, Southfield, Mass., and Joseph Allan Beek, Jr., Rolling Hills, Calif., assignors to Alwac International, Nassau, Bahamas, a corporation of Panama Continuation of application Ser. No. 374,989, Aug. 18, 1953. This application May 25, 1960, Ser. No. 31,969
1 Claim. (Cl. 340—172.5)

The present invention relates to improvements in electronic computers and more particularly relates to improvements in electronic computers of the selectively sequenced type which are operative in a step by step manner to perform each of a series of operations under the control of a series of operation control order signals to achieve the step by step solution of a mathematical problem. This is a continuation of co-pending application Serial No. 374,989, filed August 18, 1953, now abandoned.

Computers of this general type are customarily provided with a relatively large data storage unit divided into many compartments from individual ones of which data can be selectively read, as needed, for use in the performance of the particular computation. In the prior art computers it has been customary to provide storage device compartments selection circuits which, when closed, provide no indication whatsoever as to whether they have properly functioned. For example, if the particular storage device is selected through the operation of a tree type relay circuit, in prior art selection circuits the circuits to the required relays are set up and it is assumed that all of the relays required for the selection of that particular unit are in fact actuated. There is no positive check that the storage unit compartment intended to be selected has in fact been selected. This, it is apparent, will result in faulty computations which are not readily detectable. In order to overcome this disadvantage, it has been the practice in the past to provide duplicate selection circuits both of which must be operated before the data is read out of the storage unit. In this manner one selection circuit serves as a check on the other. This system greatly multiplies the numbers of circuit components required in the computer and therefore unduly magnifies the bulk of the computer.

Broadly, therefore, it is the basic object of the invention claimed herein to provide, in an electronic digital calculator, a data storage compartment selection control circuit which is selectively settable to a condition indicative of a compartment to be selected, which is controlled jointly by such setting and by data indicative signals from an associated data storage unit, and which, as so controlled, is effective to enable a data transmission circuit connected to the selected compartment.

It is a fundamental object of the present invention to provide an electronic calculator of a selectively sequenced type which is of such improved construction that, without the duplication of circuits, a positive check is made to assure that a storage unit compartment desired to be selected has in fact been selected and connected for data read out before the data read out is actually effectuated by the utilization of data indicative signals stored in the storage unit in association with the compartment selected.

More specifically it is an object of this invention to provide an electronic computer of the selectively sequenced type which is of such improved construction that the correct selection of a particular compartment in a data storage unit is assured by the comparison with the selected setting of the control circuit effectuating compartment selection of a channel identification signal stored in the storage compartment and read out through the data read out channel so that a positive assurance of the correctness of operation of the channel selection circuits exists.

Still more specifically it is an object of the present invention to provide an electronic calculator of the selectively sequenced type which is of such improved construction that the accurate selection of a particular compartment in a data storage is assured by the comparison through the energized compartment read out circuit of a channel identification number indicative signal stored in the data storage device with the setting of a compartment selection control circuit and the anti comparison of a signal indicative of the complement of such number.

A further object of the present invention is to provide, in an electronic selectively sequenced computer, an improved electronic system for controlling the selection of a particular compartment of a data storage unit whereby the energization of the data transmission circuit between the selected compartment and the external circuitry is dependent upon the existence in a comparison circuit of a signal indicative of a predetermined comparative relation between the selected setting of a storage compartment selection circuit and an identification signal stored in the storage unit whereby connection to the external circuit of the actual compartment selected by the setting of the selection circuit is assured.

These and other objects of the present invention will become more fully apparent by reference to the appended claims and as the following detailed description proceeds in reference to the accompanying drawings wherein:

FIGURE 2A–1 is a wiring diagram of the clock read amplifier circuit (CR);

FIGURE 2B–1 is a wiring diagram of the clock driver circuit (CD);

FIGURE 2C–1 is a wiring diagram of the read amplifier plug-in circuit (RA);

FIGURE 2D–1 is a wiring diagram of the record amplifier plug-in circuit (WA);

FIGURE 2E–1 is a wiring diagram of the resistor board plug-in unit (RE);

FIGURE 3A–1 is a wiring diagram of the flip-flop pair plug-in unit (FF);

FIGURE 3B–1 is a wiring diagram of the driver pair plug-in unit (D);

FIGURE 3C–1 is a wiring diagram of the diode board plug-in unit (DI);

FIGURE 3D–1 is a wiring diagram of the resistor board plug-in unit (RU);

FIGURE 3E–1 is a wiring diagram of the flip-flop input circuit plug-in unit (IC);

FIGURE 3F–1 is a wiring diagram of the one shot and relay driver circuit (OS);

FIGURES 13 and 14 are views of an axially adjustable electromagnetic head for use when but a single electromagnetic head is associated with a record track;

FIGURES 15 and 16 are views of an axially and laterally adjustable electromagnetic head for use when read and record heads are associated with a single record track;

FIGURE 23 is a symbolic presentation of the same circuit schematically represented in FIGURE 22;

FIGURE 26 is a schematic and symbolic illustration of the circuitry of the L or order-address register;

FIGURE 29 is a schematic and symbolic illustration of the circuitry of the N or address register;

FIGURE 30 is a schematic and symbolic illustration of the basic circuit components controlling the $\underline{M_1}$ and $\underline{M_0}$ flip-flops for recording of signals in the main memory unit;

Figure 50:
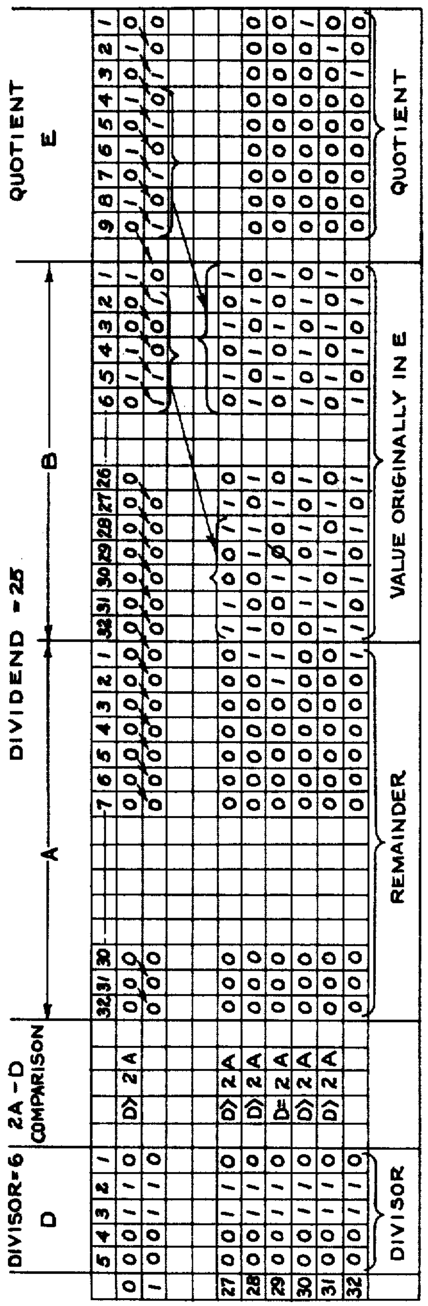
Figures 43, 44, 45, 47, 48:
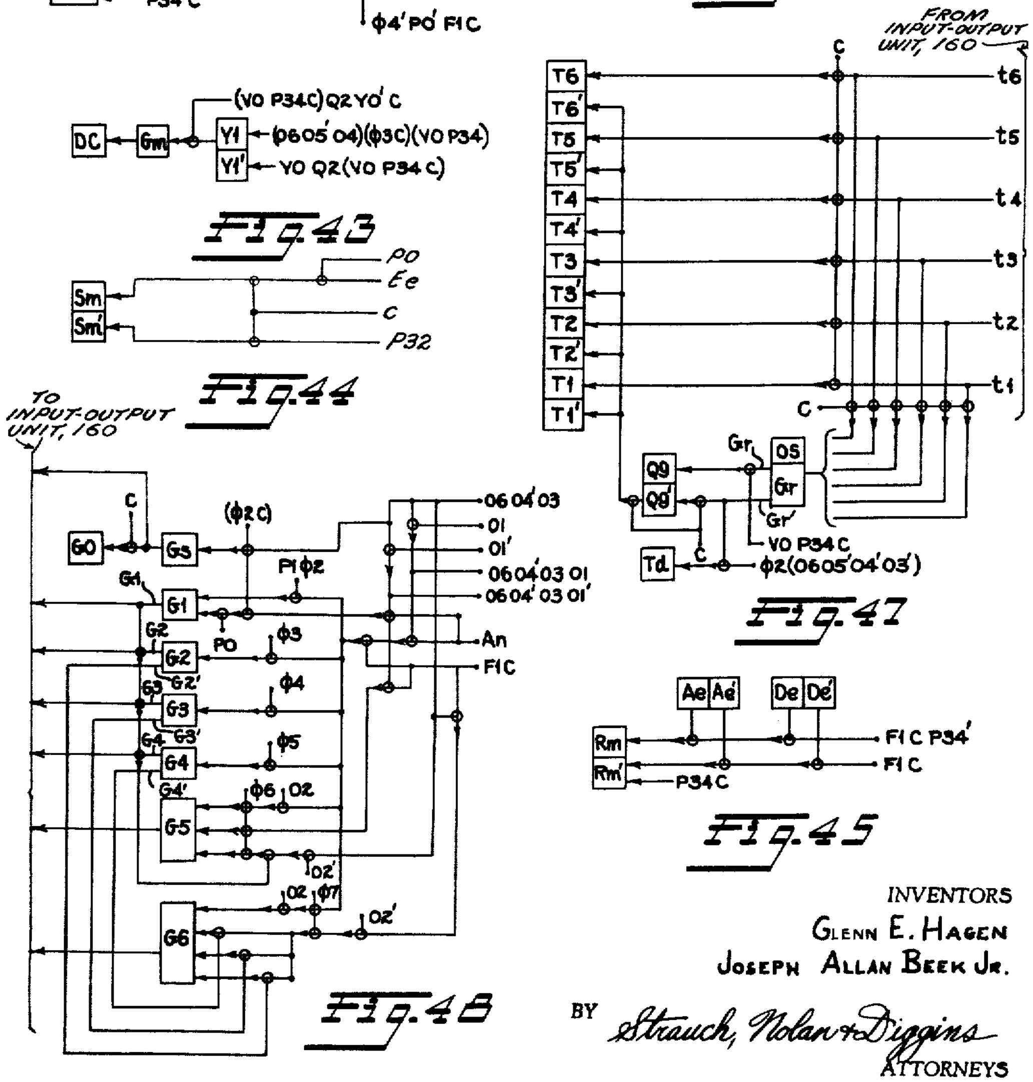
FIGURE 43 illustrates the control circuits for and interrelation of the $\underline{Y_1}$ flop-flop and the $\underline{G_m}$ and $\underline{DC}$ one shot relay drivers.
FIGURE 44 illustrates the control circuit for the $\underline{S_m}$ flip-flop.
FIGURE 45 illustrates the control circuit for the $\underline{R_m}$ flip-flop.
Figure 46:
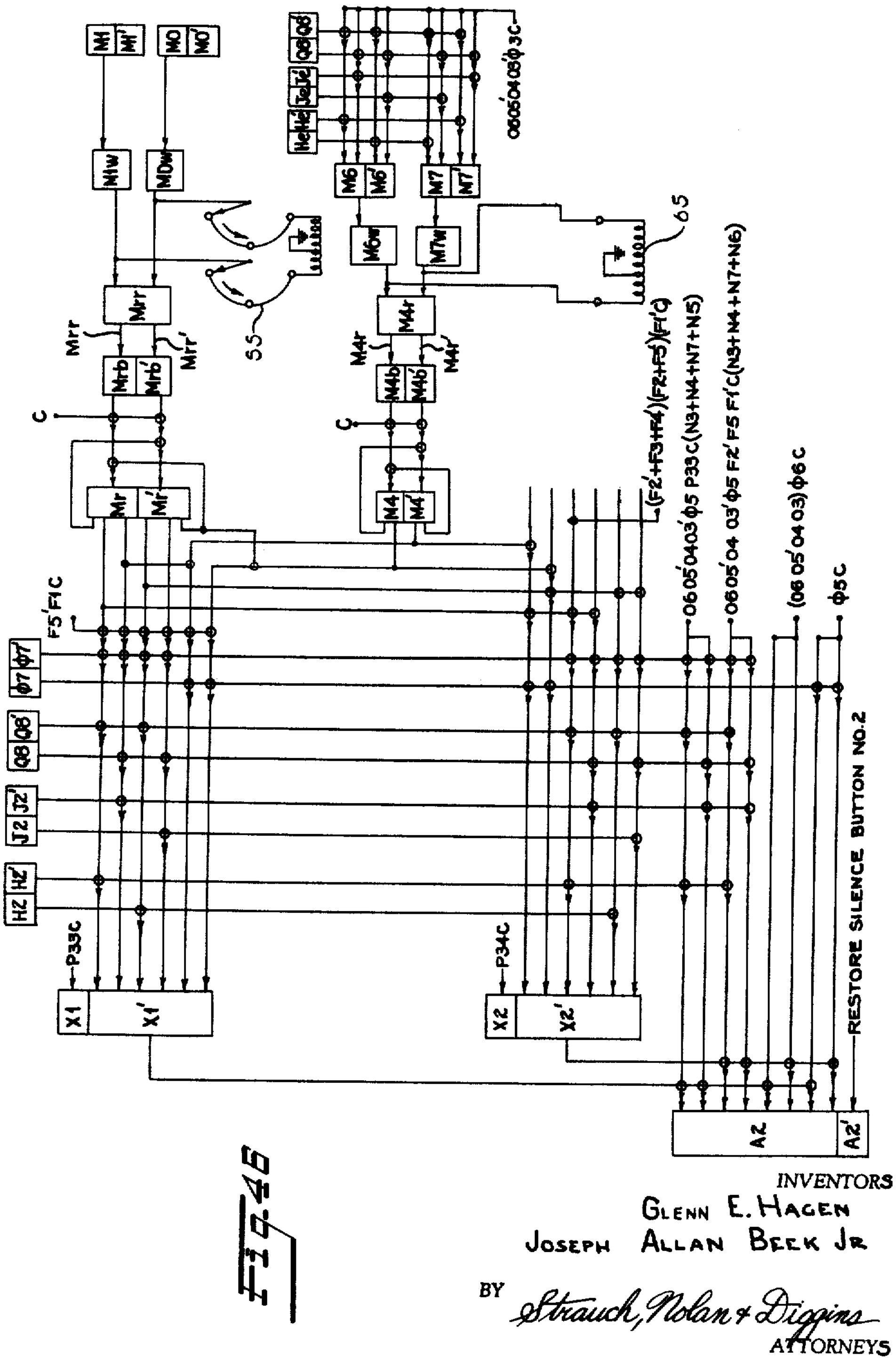
Figure 49:
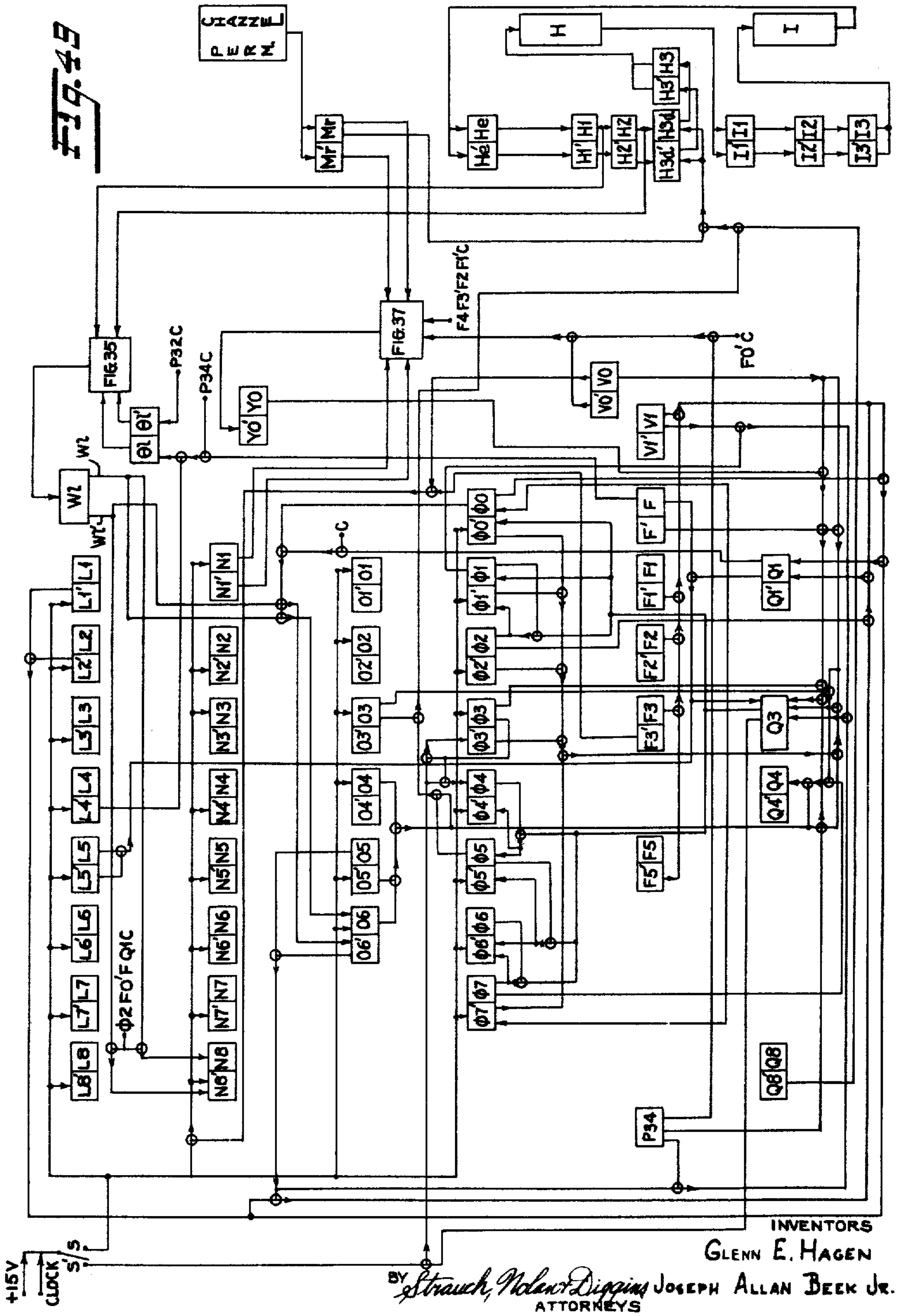
Figure 59:
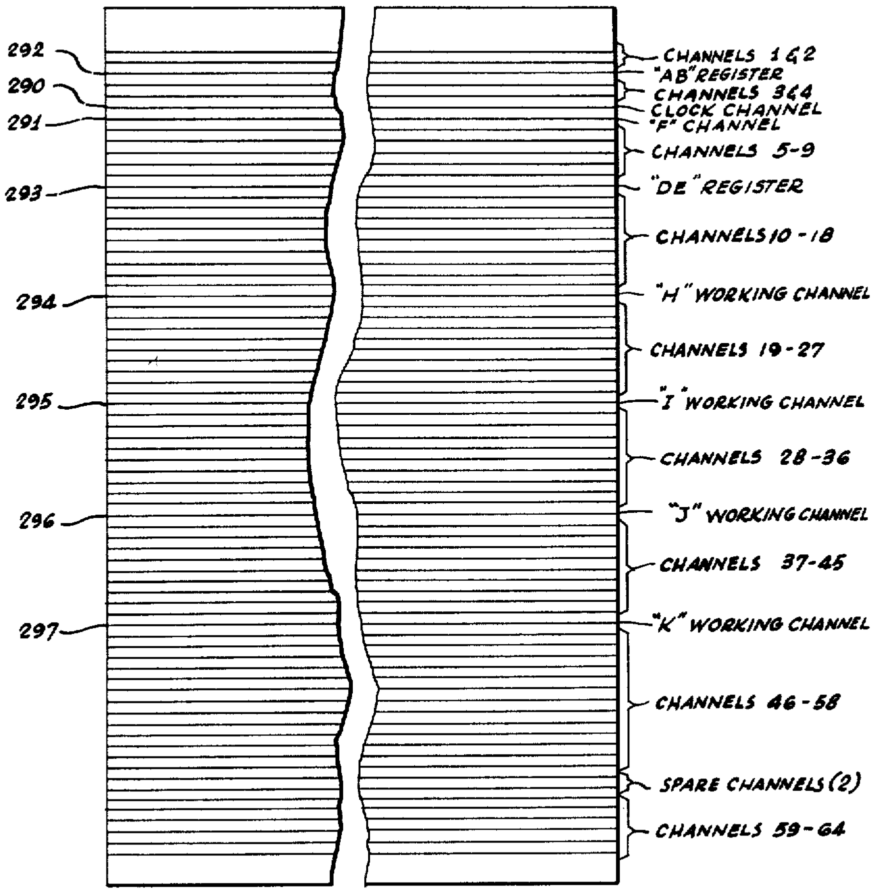
Figure 6D:
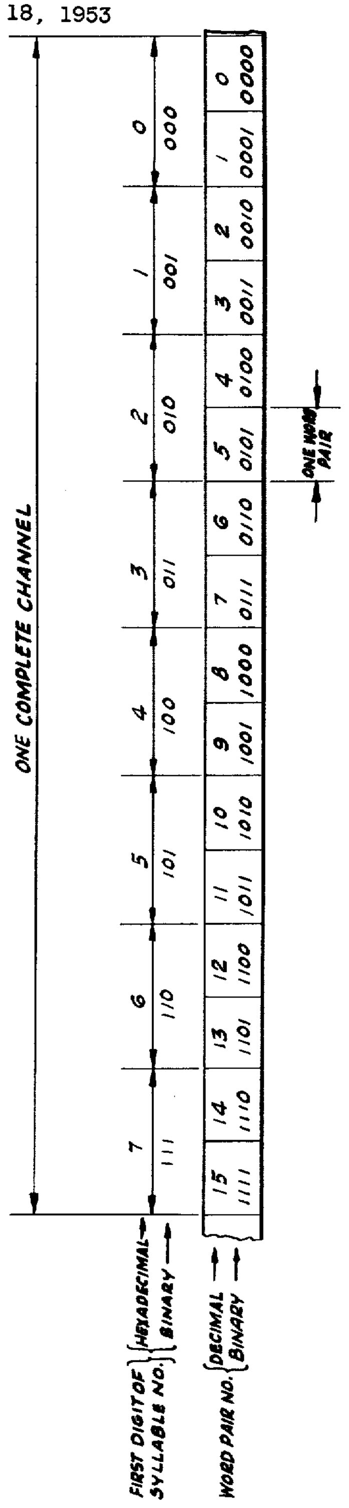
Figure 61:
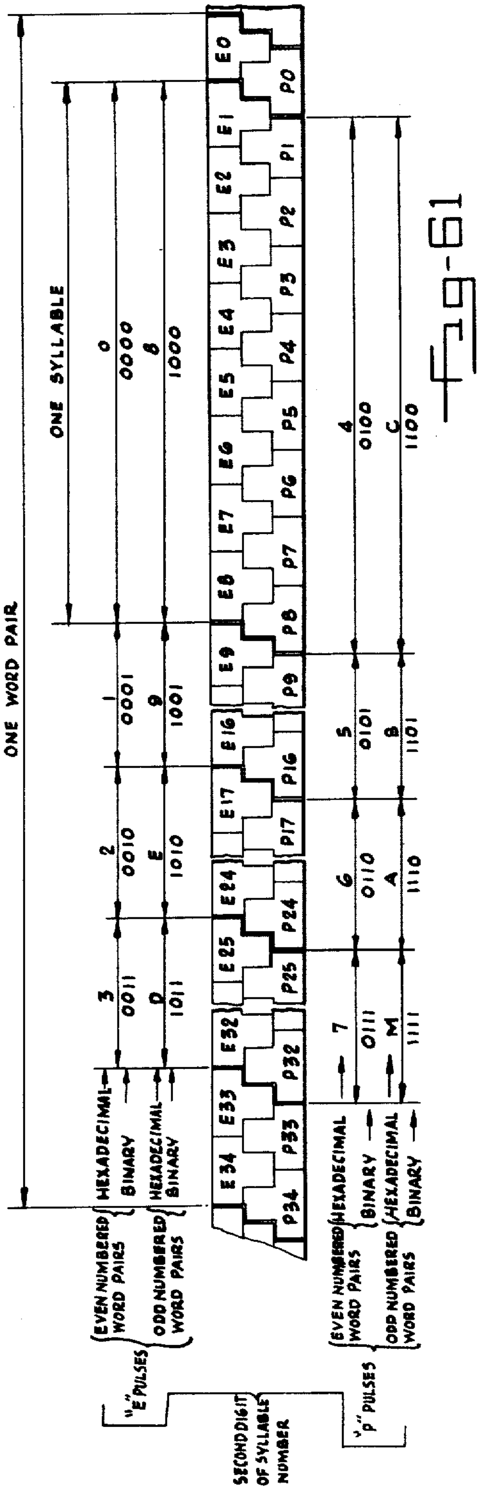
Figure 62:
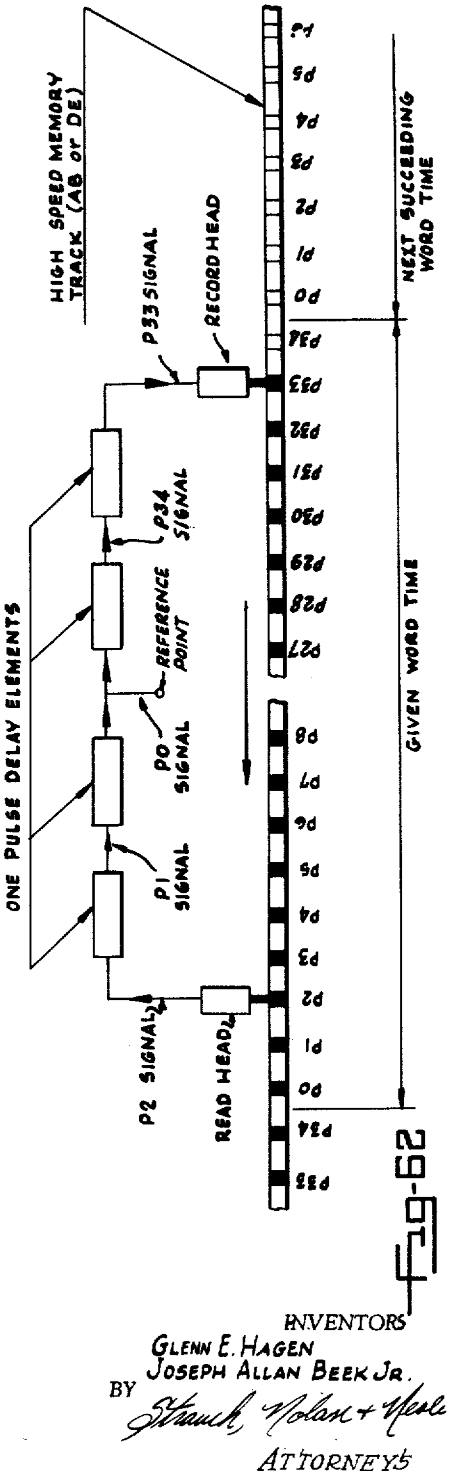

FIGURE 46 illustrates the control circuits for and interrelation of the $\underline{M_6}$, $\underline{M_7}$, $\underline{M_{4b}}$, $\underline{M_4}$, $\underline{M_{rb}}$, $\underline{M_r}$, $\underline{X_1}$, $\underline{X_2}$, and $\underline{A_2}$ flip-flops; the $\underline{M_{6w}}$, $\underline{M_{7w}}$, $\underline{M_{1w}}$ and $\underline{M_{0w}}$ record amplifiers; and the $\underline{M_{1r}}$ and $\underline{M_{4r}}$ amplifiers;

FIGURE 47 illustrates the control circuit for the input to the $\underline{T}$ flip-flops from the input-output unit via the translating relays;

FIGURE 48 illustrates the control circuit for the one shot relay drivers G which transmit data to the input-output unit via the translating relays;

FIGURE 49 is a schematic illustration of the operation of the computer upon the initiation of the start routine;

FIGURE 50 is a diagrammatic illustration of the mathematics of the manner of which the computer performs a division operation;

FIGURES 51 through 58 are charts illustrating the pulses appearing at the various times during the cycles of a division operation;

FIGURE 59 is a diagrammatic development of the recording surface of the drum showing an illustrative arrangement of the signal channels;

FIGURE 60 is a diagrammatic illustration of the relationship of the word-pair constituents of a single complete channel;

FIGURE 61 is a diagrammatic illustration of the syllable and digit constituents of a single word-pair; and FIGURE 62 is a diagrammatic illustration of the reration between the high speed memory track (AB or DE) and the associated electronic delay line circuit.

The electronic computer of the present invention, which is of the type in which the conditions during successive time intervals of a predetermined duration, of continuously generated two condition signals are indicative of the digits of successive denominational orders of a binary number, the lowest denominational order appearing first and the highest denominational order appearing last at any given reference point in point of time, is of the selectively sequenced type which is operable under control of a series of orders transmitted to its control section, to sequentially perform the basic steps of data transfer, addition, subtraction, multiplication, division or data comparison as required in the step by step solution of highly complex mathematical problems.

The various numbers which are utilized by the computer in the performance of its computations are stored or recorded in a magnetic drum type storage device which is divided into three basic storage sections in accordance with the time required to obtain access to the data stored therein. The basic time division upon which the computer operates is known as "one word time" interval. A "one word time" interval is that interval of time necessary for a complete thirty-two denominational order binary number, together with its associated sign and other control data, to pass through a given circuit taken as a reference point. Each revolution of the memory drum encompasses sixteen "one word time" intervals.

The highest speed section of the memory unit consists of what will hereinafter be referred to as the A, B, D and E registers. Each of these four registers has a maximum storage capacity of a single thirty-two denominational order binary number together with its sign and associated control data. The digit of each denominational order of a binary number recorded in the A, B, D or E registers is available for use by the computer once during each word time interval at any given reference point. It is on data read from these four registers that the required arithmetic operations are performed.

The section of the storage unit of this calculator which has an intermediate rate of data availability will hereinafter be referred to as the H—I and J—K working channels. The H and I storage sections are combined to form a storage unit or channel having a capacity of sixteen thirty-two denominational order binary number pairs together with the sign and other control signals associated with each of such binary numbers. A digit of any given denominational order of any of such numbers will be available at any given reference point once during every sixteen word time intervals or once during each revolution of the storage drum. The J—K channel is identical with the H—I channel. The H—I and J—K channels are utilized for the storage of numerical data which, in the course of a given computation, must be transferred to the A, B, D or E registers, and for the storage of computer control data each unit of which consists of an eight digit binary number. These eight digit units of numeric data will be referred to herein as syllables, there being four syllables in each word time interval. The computer control data is of two basic types, operation control data and data source or depository control data.

The storage unit contains sixty-four additional channels, which will hereinafter be referred to as permanent storage channels and from which data is selectably available. Each of these permanent storage channels has a storage capacity of sixteen thirty-two denominational order binary number pairs. The data stored in these sixty-four permanent storage channels is available only by the controlled selection of a particular channel and the copying of such selected channel into the H—I or J—K working channels for utilization from those working channels by the computer.

As has been indicated, the basic control signals of the computer are normally stored for immediate use by the computer in the sequential performance of a problem in H—I or J—K working channels. The basic control of the operation of the computer is exercised by four electronic registers. These four registers are known as the "L" or order-address register, the "O" or order register, the "N" or address register, and the "$\phi$" or sequence register. The "L" or order-address register is the control register which determines the portion of the H—I or J—K channels from which the next succeeding control number will be read. The "O" or order register is that register which effects the primary control of the operation which will be performed by the calculator. The "N" or address register is the register which controls the source of or depository for numeric data which will be utilized by the computer in the performance of the order determined by the permutational setting of the order register in the event that all numeric data sources and depositories required for the performance of that order are not inherent characteristics of the order itself. The "$\phi$" or sequence register is the register which controls the sequential operation of the calculator in the performance of the order set up in the order register.

The order register O and the address register N are each selectively settable to various permutations in accordance with control numbers read from the H—I or J—K working channels under the control of settings of the L or order-address register. The order-address register is normally stepped from one condition to the next in a predetermined pattern after the completion of the transfer of the control data to the order or address register. The sequence register steps through a selectable number of sequential steps under indirect control of the setting of the order register to effect and control the several sequential sub-operations required in the performance of the operation defined by the setting of the order register.

Since it is believed that a complete understanding of the invention defined in the appended claims can be achieved only after the structure of the several subdivisions of the computer and their mutual relation and cooperation is understood, the following detailed description will proceed first with a general explanation of the computer, secondly with a detailed explanation of the symbolic notation used herein to denote circuit components, thirdly with a detailed explanation of the circuitry of each subdivision in the order set forth in the following table of contents and finally by a detailed explanation of the particular aspects of the computer constituting the invention herein claimed.

TABLE OF CONTENTS

TITLE OF SECTION

| Title of Section | Column |
|---|---|
| General Description | 7 |
| Binary Notation | 8 |
| Boolean Algebra | 9 |
| Logic | 10 |
| Logic Signals | 12 |
| Input-Output Unit | 13 |
| Input-Output Control **160** | 14 |
| Input Register | 15 |
| Memory Section | 15 |
| Drum Structure | 15 |
| Magnetic Head Mounts and Drum Layout | 16 |
| Axially Adjustable Head Mount | 16 |
| Radially and Axially Adjustable Head Mount | 17 |
| Drum Layout | 18 |
| Timing Logic | 21 |
| F Channel Logic | 21 |
| One Word Recirculating Registers | 24 |
| H, I, J, and K Recirculation | 26 |
| Flip-Flop Registers | 28 |
| L Register | 29 |
| O Register | 31 |
| N Register | 31 |
| Channel Layout, Order Succession | 33 |
| Master Slave Channels | 34 |
| Limited Access System | 34 |
| Orders and Address—The No Address System | 35 |
| $\phi$ Register | 38 |
| Permanent Memory Recording and Control | 39 |
| $V_1$ | 40 |
| $\phi_1$ | 40 |
| $V_n$ | 41 |
| $\phi_n$ | 41 |
| $V_s$ | 41 |
| $V_0$ | 41 |
| $W_1$ | 41 |
| $W_n$ | 42 |
| $Y_0$ | 42 |
| $Q_1$ to $Q_7$ | 42 |
| $Q_8$ | 44 |
| Overflow Alarm | 44 |
| Start Routine, Channel Selection and No Address System | 45 |
| Computations | 52 |
| Division (Mathematics of) | 52 |
| Division (Circuit Operation) | 114 |

Explanation of Orders ---------- 60
000001 Reverse Overflow ---------- 60
000010 Reverse the Sign of A ---------- 61
000011 Make A Positive ---------- 61
000100 Turn on Overflow if A not Zero ---------- 61
000110 Copy D Into A ---------- 61
000111 Turn on Overflow if A Less Than Zero 62
001000 Exchange A and B ---------- 62
001001 Exchange A and E ---------- 62
001010 Exchange A and D ---------- 62
001011 Complement A ---------- 62
001100 Subtract One From A ---------- 63
001101 Clear A ---------- 63
001110 Shift A and B Right One Digit ---------- 64
001111 Shift A and B Left One Digit ---------- 64
111001 Multiplication ---------- 65
Addition and Subtraction ---------- 68
a. Overflow ---------- 69
011000 Copy W to A Under Control of D ---------- 71
011001 Copy W to A ---------- 71
011010 Copy W to D ---------- 71
011011 Exchange W and A ---------- 71
011100 Turn on the Overflow if A Is Less Than W ---------- 72
010000 Logically Multiply A and W ---------- 72
010001 Copy a Designated Syllable of W Into A ---------- 72
010011 Copy a Designated Syllable of A Into W ---------- 73
110010 Conditional Skip ---------- 73
110011 Unconditional Skip ---------- 74
100001 Read in Four Binary Digits ---------- 74
100011 Read in Six Digits ---------- 75
100010 Read in Sign Digit ---------- 75
100101 Read Out Four Digits ---------- 75
100111 Read Out Six Digits ---------- 76
100110 Read Out Sign Digit ---------- 76
111010 Shift A Right Eight Digits ---------- 76
101010 Copy the Slave Into a Designated Channel ---------- 76
101011 Copy the Master Into a Designated Channel ---------- 78
101110 Copy a Designated Channel Into the Slave ---------- 78
101111 Copy a Designated Channel Into the Master ---------- 79

GENERAL DESCRIPTION

Figure 1:
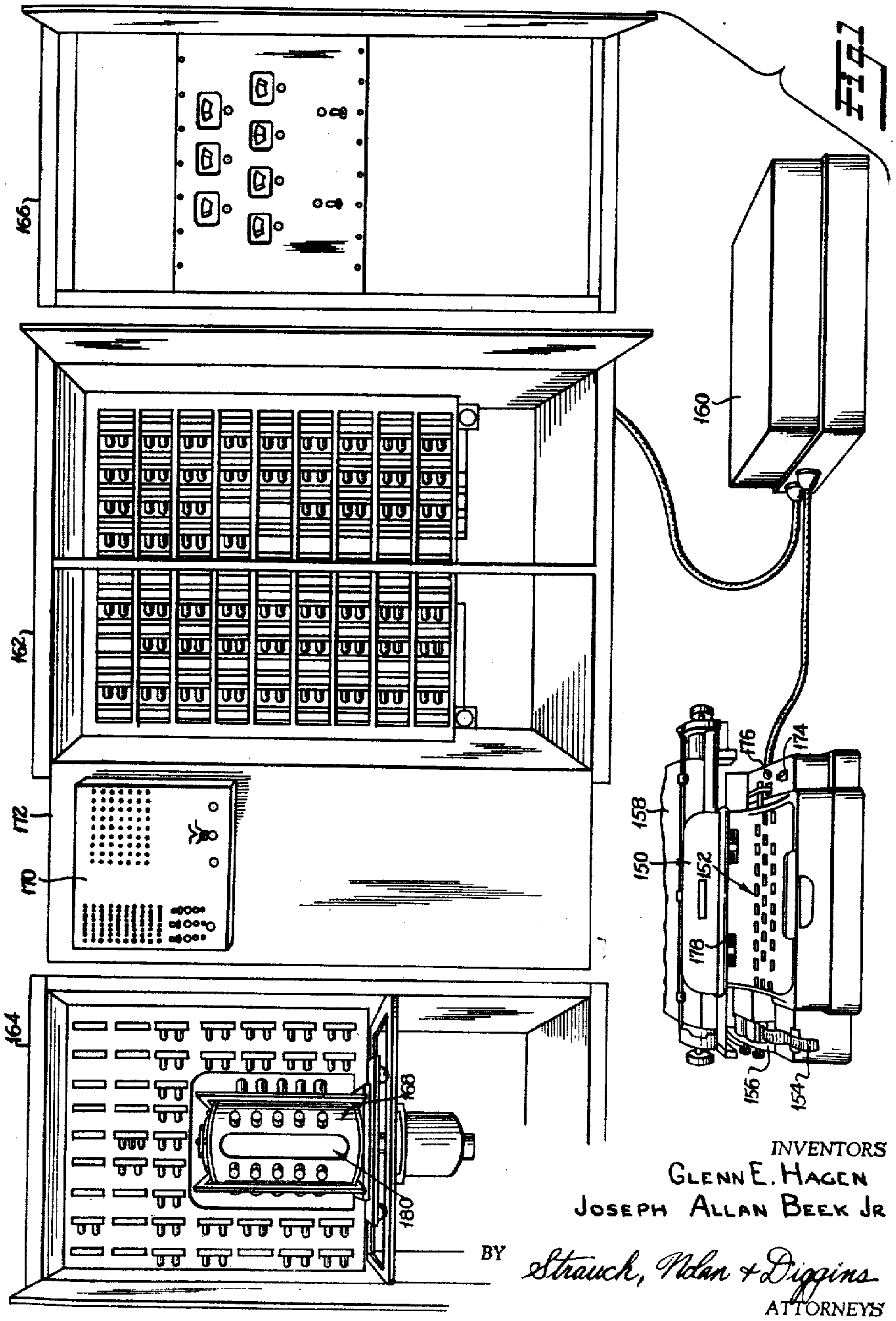
FIGURE 1 is a perspective view illustrating the several units making up the electronic computer of the present invention.

An over-all view of the computer is shown in FIGURE 1. Information is sent to the computer or received from the computer by means of a data input-output device 150 of the type known commercially as a Flexowriter. This input-output device 150 is a type of electric typewriter with attachments for punching and reading paper tapes of the type well known in the telegraph field. Information is transmitted from the input-output unit 150 by either manually typing word and number groups directly on the keyboard 152 or by automatically feeding a punched tape 154 containing the desired information through the tape reader 156. Answer from the computer will be automatically typed out directly on a sheet 158 of paper or punched on a new paper tape by a punching unit disposed rearwardly of the reader 156, or these two operations may be carried on simultaneously by the input-output unit 150.

A series of auxiliary relays which are associated with the operation of the input-output unit 150 are housed in a small box 160 located near and electrically connected to the input-output unit 150. These relays act conventionally as an intermediate translating device between the input-output unit 150 and the main body of the computer whereby the depression of a key or sensing of a combination of holes in the tape is effective to energize predetermined lines to the computer and vice versa.

The main body of the computer is housed in three cabinets 162, 164 and 166. These cabinets are referred to as the Logic Cabinet 162, the Memory Cabinet 164, and the Power Supply Cabinet 166.

Figure 2:
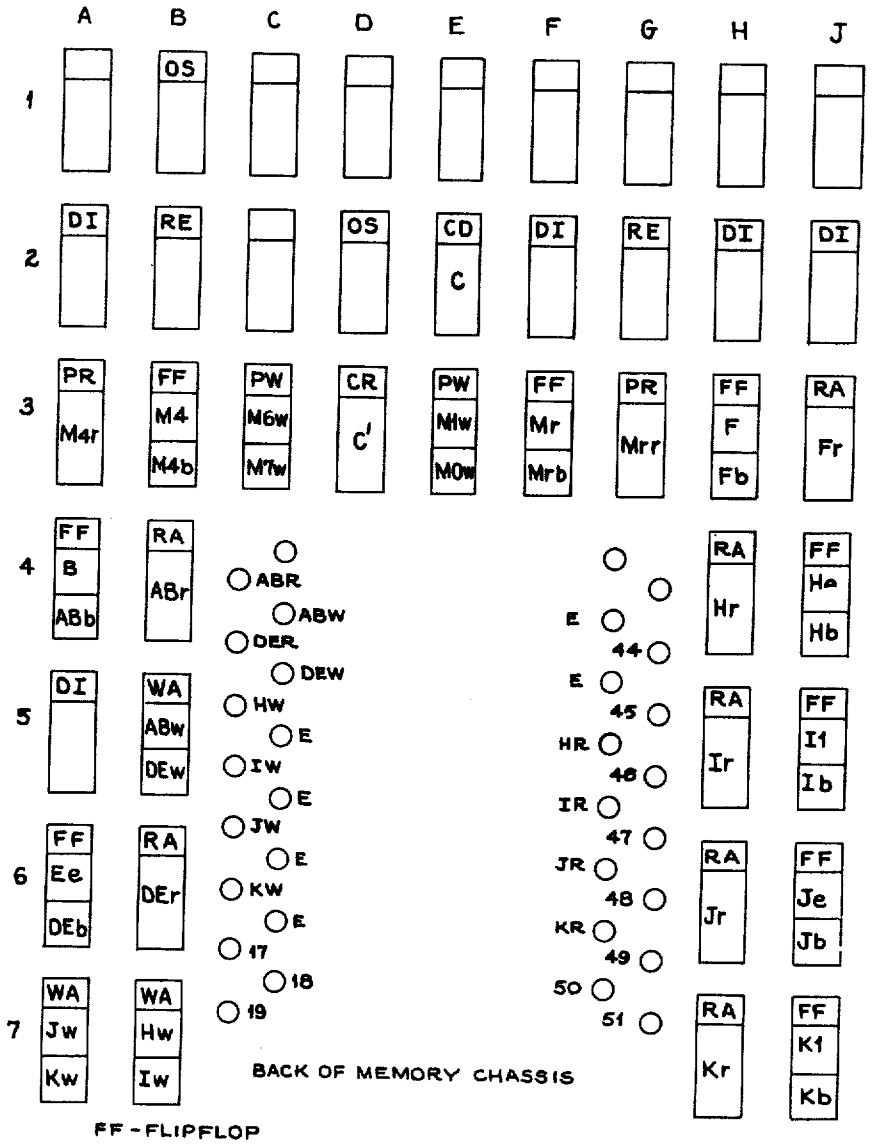
FIGURE 2 is a block layout of the positions of the plug-in circuits as viewed from the back of the memory chassis.
Figure 2F:
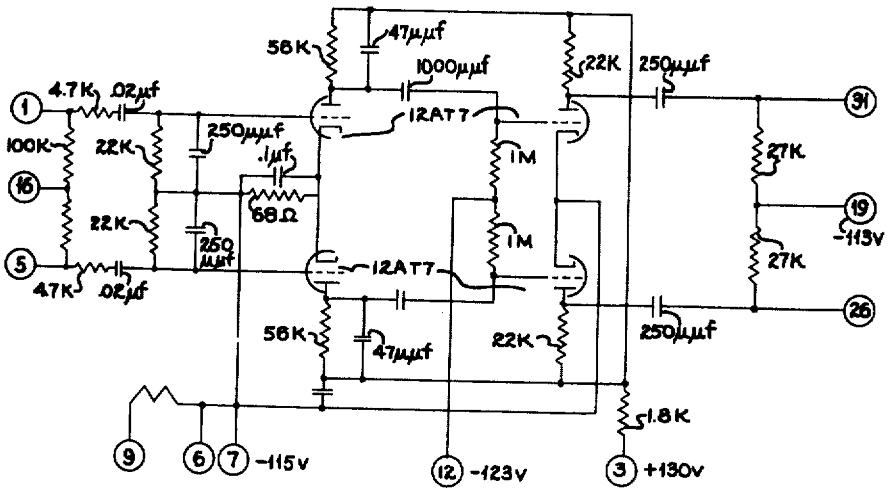
FIGURE 2F is a wiring diagram of the push pull read amplifier circuit (PR)

The Memory Cabinet 164 contains the magnetic memory unit 168. This memory unit 168 acts as a storage device to hold the many binary bits of information upon which the computer operates in the several channels and registers previously referred to. This cabinet also contains the circuitry for putting information into the memory unit 168 and for reading the stored information from the memory unit 168. A detailed layout of the electrical components of the memory cabinet 164 is shown in FIGURE 2.

Figure 2G:
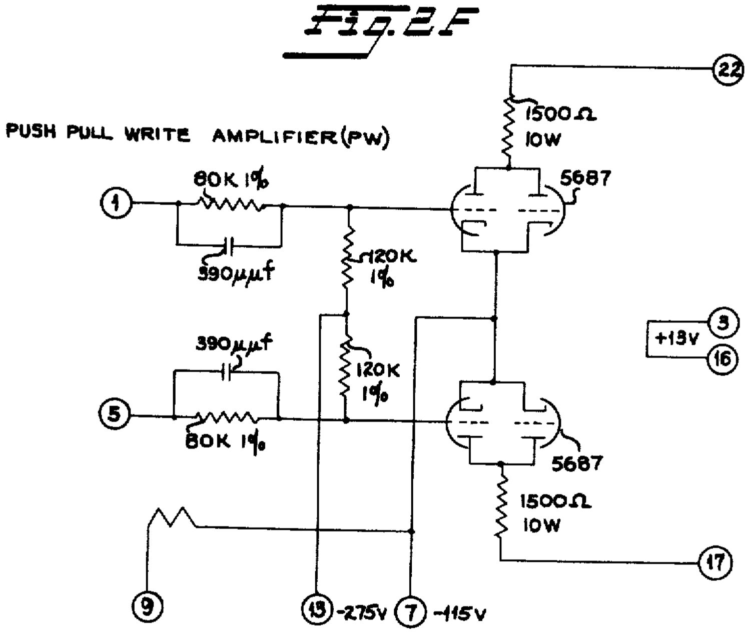
FIGURE 2G is a wiring diagram of the push pull record amplifier circuit (PW)
Figure 3:
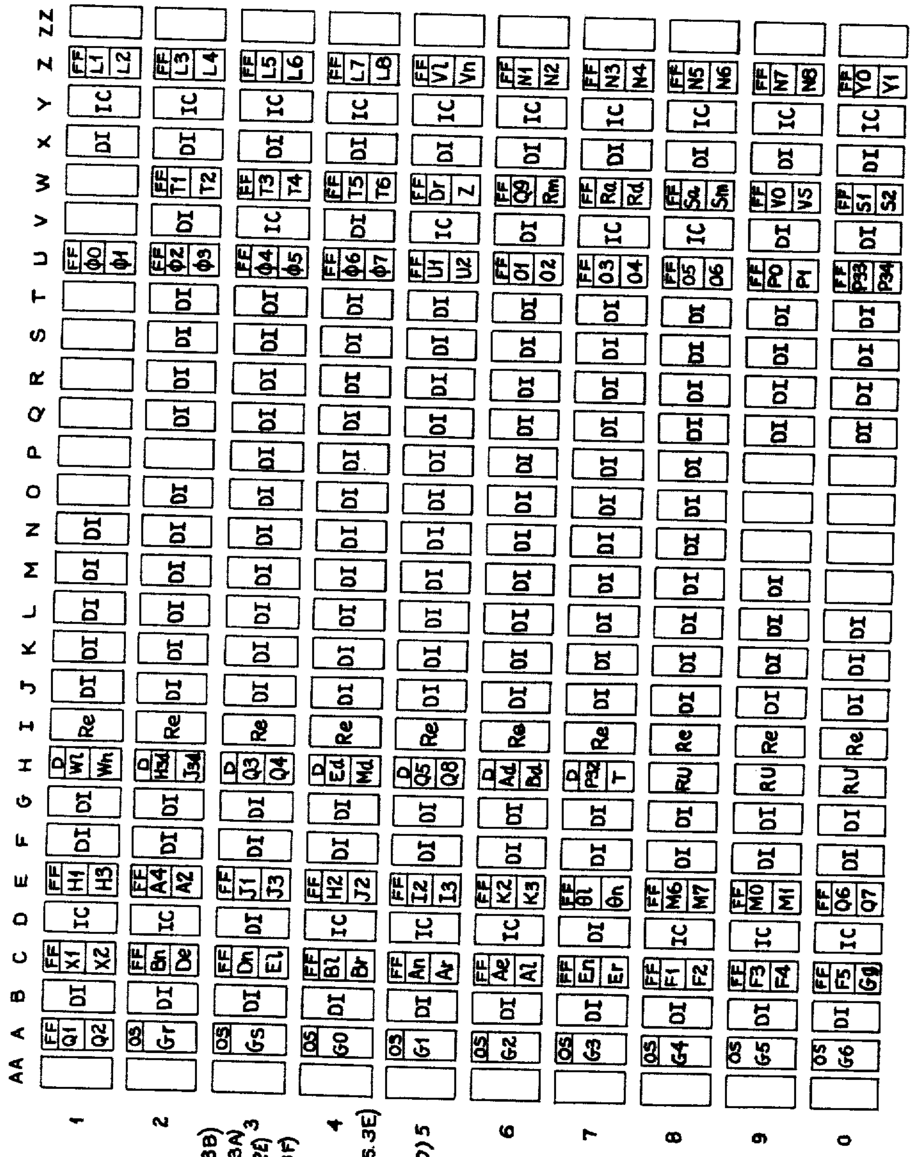
FIGURE 3 is a block layout of the positions of the plug-in units of the central or logic chassis.

The Logic Cabinet 162 contains the circuitry that may be said to give the computer its "personality." It is by the circuitry in this cabinet that the various operations are performed upon binary bits of information constantly being supplied from the memory unit 168 or the input-output unit 150. Here they are organized to carry out the many operations of which the computer is capable and are routed to the proper position at the correct time to perform these operations. A detailed layout of the electrical components of this cabinet 162 is shown in FIGURE 3. The construction of the individual plug-in unit represented by blocks in FIGURES 2 and 3 is shown in FIGURES 2A to G and 3A to F.

A control panel 170 occupies a portion of one door 172 of the Logic Cabinet 162. On this panel various lights and switches are located to facilitate checking the operation of the computer. The alarm indicators are also located here to give a warning in case an irregularity occurs in the computer operation. Except for maintenance checks the control panel is not used since, in normal operation, the computer is controlled completely from the input-output unit 150.

The Power Supply Cabinet 166 contains the means for changing an available single-voltage alternating current power to the various values of direct-current and alternating current power needed to operate the computer. The details of construction of this unit are conventional and need not hereinafter be referred to.

BINARY NOTATION

Before a detailed description of the computer can be undertaken it is essential that a knowledge of the basic means of expression or language used in the computer be mastered.

The computer is a digital machine whose internal operations are carried out in binary arithmetic. The binary number system has only digits 0 and 1. Relays and vacuum tubes can operate dependably if they are made to have only two discrete states and electronic circuits are greatly simplified if the computer is designed to compute in the binary system by multiples of two and its powers instead of by ten and its powers as in the more familiar decimal system. Any decimal number can be expressed in binary form—a short table is shown for illustration.

| Decimal: | Binary |
|---|---|
| 0 | 0 |
| 1 | 1 |
| 2 | 10 |
| 3 | 11 |
| 4 | 100 |
| 5 | 101 |
| 6 | 110 |
| 7 | 111 |
| 8 | 1000 |
| 9 | 1001 |
| 10 | 1010 |
| 16 | 10000 |
| 20 | 10100 |
| 100 | 1100100 |
| 128, etc. | 10000000 |

BOOLEAN ALGEBRA

There has been an algeb a developed that lends itself very well to the design of digital computers. This is known as Boolean algebra and is essentially an algebra consisting of only two admissive states. These states may be represented by the marks 0 to 1, or they may be designated by any two conditions such as on-off or true-false. The use of Boolean algebra and symbolic logic in computer design is treated in the literature as for example: "A Symbolic Analysis of Relay and Switching Circuits," by Claude E. Shannon, Transactions of A.I.E.E., vol 57, 1938, "A Summary of Symbolic Logic and Its Practical Applications" and "Circuit Algebra Introduction" by Edmond C. Berkeley, published by Edmond C. Berkeley and Associates, 36 West 11th Street, New York, New York. Several examples will be presented here since the logical design in the computer can be reduced to and is most accurately, clearly and succinctly presented by a series of logical equations in Boolean algebra. The ultimate form of these equations symbolizes mathematically the actual circuitry of the computer and may be utilized directly under the appropriate explantory instructions, which will be set forth hereinafter, in the wiring of the computer. These equations as used herein function as a useful stepping stone between the verbal statement of what is wanted of a circuit and the actual electronic construction of the circuit in that, in initial design they are used to express generic concepts, and in the ultimate form as expressed herein express not only the generic concept but the actual circuit construction and thus form a completely accurate and much more simple substitute for the now conventional wiring diagrams. A familiarity with it is necessary to obtain a complete understanding of the operation of the computer.

The capital letters A, B, C, D . . . represent the quantities in the logical equations and a component circuit. If a letter is followed by a prime (e.g. A′, B′, C′, D′ . . . ), it indicates logically that the quantity described is not "true." Thus A′ is read as "not A." "A′" indicates that the A′ output terminal of the component circuit A is at +15 volts and that its A output is at zero volts. "A" indicates that the A output of the A circuit component is at +15 volts and that its A′ output is at zero volts. In wiring the computer herein the term –A– in an equation symbolizes a connection to the A output of A and –A′– symbolizes a connection to the A′ output of A.

All equations to be presented later on are variations of two basic combinations. The first one of these is known as logical "or" combination. A statement written in Boolean algebra notation using the "or" combination is shown below:

$$D=A+B+C$$

In this notation, the + sign stands for "or." Thus the above equation is read as: D is true if A is true or if B is true or if C is true. It can also be read as: D will be at +15 volts if either A is at +15 volts or B is at +15 volts or C is at +15 volts. If any one or more of the terms A, B or C is true, D will be true.

An equation may also contain primed terms, such as: $D=A'+B+C'$. This equation is read as: D is true if A is not true or if B is true or if C is not true. If any or more of these conditions exists then D will be true.

The other combination that we have is known as logical "and" combination. These statements have the form $D=ABC$. This equaton is read as: D is true only when A is true and B is true and C is true. It can also have the meaning that D will be at a potential of +15 volts if and only if A, B and C are all at +15 volts. If any one is not at +15 volts then D will not be at +15 volts.

This combination may contain primed terms, such as $D=A'BC'$. This means that D is true only when A is not true and B is true and C is not true. This particular combination must occur simultaneously for D to be true. In the mechanization of the computer herein, it means that D will be at +15 volts only if voltages of +15 volts exist at A′ and C′, i.e. A and C are at 0 volts and +15 volts exists at B.

Thus a typical logical equation defining the operation of the computer might be:

$$K_1=(A_3M'_1+L_3)(L'_4+P_{16})$$

This is interpreted as the point $K_1$ being true either when $A_3$ is true and $M_1$ is not true, or when $L_3$ is true and $L_4$ is not true or $P_{16}$ is true at the same time. This can be broken down further to mean $K_1$ is true when:

(1) $A_3$ is true, $M_1$ is false and $L_4$ is false, or
(2) $A_3$ is true, $M_1$ is false and $P_{16}$ is true, or
(3) $L_3$ is true and $L_4$ is false, or
(4) $L_3$ is true and $P_{16}$ is true.

If the equation were expanded it would appear as:

$$K_1=A_3M'_1L'_4+A_3M'_1P_{16}+L_3L'_4+L_3P_{16}$$

LOGIC

The methods of realizing electrically the logic equations presented in Boolean algebra form give rise to the extensive use of germanium diodes. By means of this diode logic the equations defining the operation of the computer can be reduced to electronic form.

Figure 6:
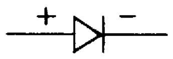

The symbol for the germanium diode or germanium crystal rectifier is shown in FIGURE 6. Current (convention current flow) will flow only in the direction of the arrow when the voltage polarities are shown. More exactly, the diode has a resistance of about two hundred ohms in the direction of current flow or forward direction. In the other direction with polarity of the applied voltage reversed, the resistance is about four hundred thousand ohms.

Figure 7:
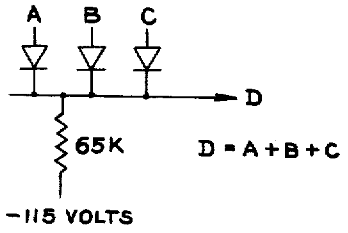

As an example, the mechanization of the first equation previously presented will be shown. This equation was $D=A+B+C$. The electrical equivalent of this equation is shown in FIGURE 7. In the computer logic all variables are represented by a voltage of +15 volts or of +0 volts. In the circuit of FIGURE 7. so long as either A, B, or C is at +0 volts, D will be at +0 volts. This is because all the diodes will be conducting and, since their forward resistance is very low compared to the 65K resistor, D will essentially be at the same potential as A, B and C, or +0 volts. It is common terminology to say that the 65K resistor has pulled D down to +0 volts, hence it is referred to as "pull down" resistor.

If A is now made to be +15 volts, D will go to +15 volts also. This is because A is essentially a low impedance source and is capable of supplying more current than the 65K resistor can drain off. The diodes in series with B and C will prevent current from flowing back into these sources. Thus D will be at +15 volts if either A or B or C is at +15 volts. This circuit is known as an "or" gate and will be high (+15 volts) if any of its inputs is high.

The other basic type of circuit used is the "and" gate. Its output is high only if all of its inputs are high. The translation of the equation $D=ABC$ to electrical form is accomplished by the network shown in FIGURE 8.

If A, B and C are at +0 volts, then D will be at +0 volts. This is because the diodes associated with A, B and C will be conducting and since their resistance in the forward direction is very small compared to the 130K resistor, D will be essentially at +0 volts. If A is now increased to +15 volts, D will not change but will remain at +0 volts. This is because the diodes connected to B and C will still be conducting and will continue to drain off enough current so that D will not be able to rise above +0 volts. The diode connected to A will prevent current from coming in. The same condition will exist if B is also raised to +15 volts along with A. The diode connected to C will be conducting and will hold D at +0. Now, however, if A, B and C are all raised to +15 volts enough current will be supplied through the 130K resistor to allow D to rise to +15 volts. Because of this action the 130K resistor is referred to as the "pull-up" resistor. It is thus seen that D will be high only if A <u>and</u> B <u>and</u> C are high.

Figure 9:
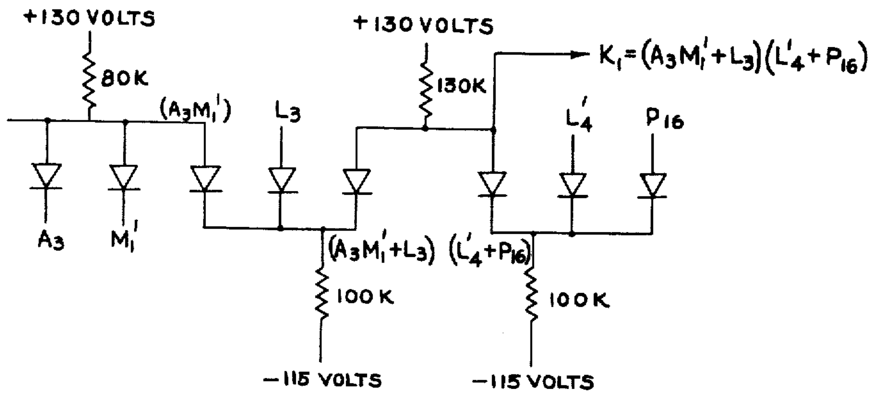

The computer consists of many combinations of "or" and "and" gates. To illustrate how these combinations are formed the gates needed to simulate the equation $$K_1=(A_3M'_1+L_3)(L'_4+P_{16})$$

are shown in FIGURE 9. The logical product $A_3M'_1$ is formed in one "and" gate and combined in an "or" gate with $L_3$ to give $A_3M'_1+L_3$. $L'_4$ and $P_{16}$ are combined in another "or" gate to give $L'_4+P_{16}$. The two quantities $(AM'_1+L_3)$ and $(L'_4+P_{16})$ are then combined in an "and" gate to provide the final form of $$(AM'_1+L_3)(L'_4+P_{16})$$

To simplify the presentation of the rather complex circuitry of this computer, extensive use of symbols will be made herein. It is to be understood however that the symbols used, except as otherwise specifically explained, represent actual circuit components. Specifically, therefore, whenever an equation in the form $\underline{D}=\underline{A}+\underline{B}+\underline{C}$ is used herein, it is to be understood that $\underline{D}$ represents a controlled circuit such as a flip-flop, a driver or the like, in its "on" condition and that A, B and C are signals from the outputs of circuits $\underline{A}$, $\underline{B}$ and $\underline{C}$, respectively, when in their "on" condition. The presence of a "+" sign between any two symbols or groups of symbols constitutes herein a symbolic representation of an output buss connected through a 65K ohm or other suitable resistor to −115 volts or any other suitable negative potential source and through separate diodes to sources of the signals represented by the two symbols or groups of symbols joined by that "+" sign. Thus the equation $$\underline{D}=\underline{A}+\underline{B}+\underline{C}$$

not only means that the $\underline{D}$ circuit will be turned "on" when either an A, B, or C signal is produced but is used herein to actually represent the necessary wiring and connecting components of the circuit, and has been and is used in the actual wiring of the computer instead of the usual types of wiring diagrams to produce said circuit by persons of ordinary skill in the art. The symbol $\underline{D}'$ denotes a controlled circuit D in its "off" condition. The symbols A′, B′ and C′ represent the output signals from the circuits $\underline{A}$, $\underline{B}$ and $\underline{C}$ respectively when in their "off" condition.

Figure 8:
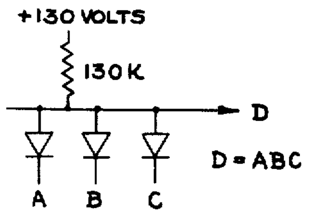

An expression in the form $\underline{D}=ABC$ as used herein represents to persons of ordinary skill in the art, a circuit of the type shown in FIGURE 8 wherein the potential on a D buss connected directly to the "on" input of a $\underline{D}$ circuit is controlled jointly by a 130K ohm or other suitable value resistor connected to a +130 volt or other suitable voltage direct current power source and diodes individually connecting the D buss to sources of the A, B and C signals.

This symbolic presentation has been utilized in the production of the computer and herein because it fully defines the actual circuit elements of the computer and greatly simplifies the presentation from that which would be necessary if the wiring to each of the many thousands of diodes were shown in the form of a conventional wiring diagram.

Considered from the point of view of an individual constructing the computer, when he is given the equation $\underline{D}=\underline{A}+\underline{B}+\underline{C}$, he must form an "or" gate as illustrated in FIGURE 7. To do this, he must: (1) connect the cathodes of each of three diodes in common to one end of a 65K ohm resistor, (2) connect the opposite end of that resistor to a source of −115 v. potential, (3) connect the plates of the three selected diodes individually to sources of the signals A, B and C respectively, which will be individually at +15 v. for those of $\underline{A}$, $\underline{B}$ and $\underline{C}$ which individually are in the A, B, C (that is "on") conditions and at OV for those of $\underline{A}$, $\underline{B}$ and $\underline{C}$ which are in the A′, B′ or C′ (that is "off") conditions, and (4) form a connection between the common diode connection to the 65K resistor and the controlled circuit D which may be the "on" input terminal of a component circuit such as a flip-flop, the input terminal of a driver, an output diode of another gate, etc. The sources of the A, B and C signals may be busses carrying the signals, the actual A, B and C output terminals of the component circuits $\underline{A}$, $\underline{B}$ and $\underline{C}$ respectively as is the most convenient in wiring or the output terminal of another diode gate in the event that A, B or C equals more than a single variable.

When the individual constructing the computer is given an equation in the form $D=ABC$, he must form an "and" gate as illustrated in FIGURE 8. To do this, he must: (1) connect the plates of each of three diodes in common to one end of a 130K resistor, (2) connect the opposite end of that resistor to a source of 130 v. potential, (3) connect the cathodes of the selected three diodes individually to sources of signals A, B and C, and (4) form a connection between the common diode connection to the 130K resistor and the controlled circuit D as explained above for the "or" gate.

Figure 4:
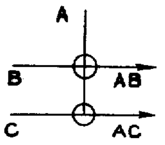
FIGURES 4 through 9 are diagrammatic illustrations of the various symbols used in the diagrammatic presentation of the circuitry of the present computer.

In order to facilitate the understanding of certain basic parts of the computer, block diagrams have been presented. In these diagrams, the junction of two wires enclosed in a small circle has been utilized as a symbolic representation of an "and" diode gate of the type illustrated in FIGURE 8. This symbolic representation is illustrated in FIGURE 4. The lines with the arrows and marked AB and AC are respectively the output leads of an AB "and" gate to which the leads A and B are connected and an AC "and" gate to which the leads A and C are connected.

Figure 5:
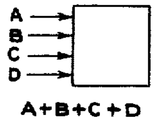

When the input signal to a component circuit such as a flip-flop or driver is through an "or" gate of the type illustrated in FIGURE 7, the symbol shown in FIGURE 5 has been utilized in the block diagram herein, the individual arrows representing the alternative inputs to the components circuit.

With the foregoing explanation, it is believed that the following detailed explanation of the computer circuitry will be quite readily understood.

LOGIC SIGNALS

A list of the logic signals is given in Table I. Following this list the logic for each signal is shown. The abbreviations F, D, O, V and G stand for flip-flop, driver, one-shot, voltage and gate, respectively. The designations in the third columns of the form (number) (letter) (*b*, *t* or number) stand for the numbered row and lettered column on the logic chassis (FIGURE 3) in which a particular unit is located. A small *b* or *t* means that the flip-flop or driver is the bottom or top one on the plug-in unit mounted at that position. One or two numbers following the letter indicate the socket pins at which the desired signal may be found. For example, A2 F 2E*b* means that flip-flop A2 is located in row 2, column E on the logic chassis and is the bottom flip-flop on the card. The actual pin connections may be found by reference to the detailed showing of the plug-in unit in FIGURES 2A to 2G and 3A to 3F.

TABLE I.—LOGIC SIGNALS

| | | | | | | | | | | | | | |
|---|---|---|---|---|---|---|---|---|---|---|---|---|---|
| A2 | F | 2Eb | Gg | F | 0Cb | N4 | F | 7Zb | t4 | V | |
| A4 | F | 2Et | Gr | O | 2A | N5 | F | 8Zt | t5 | V | |
| Ad | D | 6Ht | Gs | O | 3A | N6 | F | 8Zb | t6 | V | |
| Ae | F | 6Ct | H1 | F | 1Et | N7 | F | 9Zt | T1 | F | 2Wt |
| Al | F | 6Cb | H2 | F | 4Et | N8 | F | 9Zb | T2 | F | 2wb |
| An | F | 5Ct | H3 | F | 1Eb | O1 | F | 6Ut | T3 | F | 3wt |
| Ar | F | 5Cb | H3d | D | 2Ht | O2 | F | 6Ub | T4 | F | 3wb |
| | | | He | F | | O3 | F | 7Ut | T5 | F | 4Wt |
| Bd | D | 6Hb | It | F | | O4 | F | 7Ub | T6 | F | 4Wb |
| Be | F | | I2 | F | 5Et | O5 | F | 8Ut | Td | D | 7Hb |
| Bl | F | 4Ct | I3 | F | 5Eb | O6 | F | 8Ub | U1 | F | 5Ut |
| Bn | F | 2Ct | J1 | F | 3Et | PO | F | 9Ut | U2 | F | 5Ub |
| Br | F | 4Cb | J2 | F | 4Eb | P1 | F | 9Ub | V0 | F | 9Wt |
| | | | J3 | F | 3Eb | P32 | D | 7Ht | V1 | F | 5Zt |
| De | F | 2Cb | J3d | D | 2Hb | P33 | F | OUt | Vn | F | 5Zb |
| Dn | F | 3Ct | Je | F | | P34 | F | OUb | Vs | F | 9Wb |
| Dr | F | 5Wt | K1 | F | | Q1 | F | 1At | W1 | D | 1Ht |
| Ee | F | | K2 | F | 6Et | Q2 | F | 1Ab | Wn | D | 1Hb |
| Ed | D | 4Ht | K3 | F | 6Eb | Q3 | D | 3Ht | X1 | F | 1Ct |
| El | F | 3Cb | L1 | F | 1Zt | Q4 | D | 3Hb | X2 | F | 1Cb |
| En | F | 7Ct | L2 | F | 1Zb | Q5 | D | 5Ht | Y0 | F | OZt |
| Er | F | 7Cb | L3 | F | 2Zt | Q6 | F | OEt | Y1 | F | OZb |
| F | F | | L4 | F | 2Zb | Q7 | F | OEb | Z | F | 5Wb |
| F0' | V | OL32 | L5 | F | 3Zt | Q8 | D | 5Hb | O1 | F | 7Et |
| F1 | F | 8Ct | L6 | F | 3Zb | Q9 | F | 6Wt | On | F | 7Eb |
| F2 | F | 8Cb | L7 | F | 4Zt | Ra | F | 7Wt | φ0 | F | 1Ut |
| F3 | F | 9Ct | L8 | F | 4Zb | Rd | F | 7Wb | φ1 | F | 1Ub |
| F4 | F | 9Cb | M0 | F | 9Et | Rm | F | 6Wb | φ2 | F | 2Ut |
| F5 | F | OCt | M1 | F | 9Eb | S | V | | φ3 | F | 2Ub |
| G | V | OL30 | M4 | F | | S1 | F | OWt | φ4 | F | 3Ut |
| G0 | O | 4A | M6 | F | 8Et | S2 | F | OWb | φ5 | F | 3Ub |
| G1 | O | 5A | M7 | F | 8Eb | Sa | F | 8Wt | φ6 | F | 4Ut |
| G2 | O | 6A | Md | D | 4Hb | | | | φ7 | F | 4Ub |
| G3 | O | 7A | Mr | F | | Sm | F | 8Wb | | | |
| G4 | O | 8A | N1 | F | 6Zt | t1 | V | | | | |
| G5 | O | 9A | N2 | F | 6Zb | t2 | V | | | | |
| G6 | O | 0A | N3 | F | 7Zt | t3 | V | | | | |

F: Flipflop — t: 26, 31 — b: 22, 18
D: Driver — t: 26, 31 — b: 22, 18
O: Oneshot — 32, 17
V: Voltage
G: Gate

INPUT-OUTPUT UNIT

The input-output unit shown in FIGURE 1 is an electric typewriter with a tape punching and reading attachment, and is preferably of the kind known commercially as a "Flexowriter." Such a machine, which has a keyboard similar to that of a standard typewriter and can be so used if desired, is also provided with a tape punching and reading mechanism which may be operated independently of the typewriter or in conjunction therewith. This apparatus is herein described only briefly, since a full disclosure thereof will be found in the following U.S. Letters Patent No. 2,700,421, issued January 25, 1955, for Justification Control Tape Punch, and other patents assigned to Commercial Control Corporation, Rochester, New York. The perforated tape as used in unit 150 has six parallel rows of holes extending longitudinally of the tape. These rows are designated as 6, 1, 2, 3, 4 and 5 and are separated between the 2 row and the 3 row by a row of small feed holes. This tape code arose by expanding a normal Teletype tape which contains but five rows numbered 12.345, the . representing the small feed hole. The punching unit of the input-output unit 150 has added to it a number 6 punch to the left of the number 1, giving the tape six available rows of holes designated as follows: 612.345. A copy of the tape code used is shown below. In the following table, each numeral represents the presence of a perforation in the row of the tape designated by that numeral. For example: 612.345 represents six aligned perforations across the tape, three holes on each side of the feed hole.

| | | | | | |
|---|---|---|---|---|---|
| 612.345 | Code delete | | 12.345 | m | M |
| 6 2.345 | Lower case | | 2.345 | n | N |
| 61 .345 | | | 1 .345 | o | O |
| 6 .345 | Upper case | | .345 | p | P |
| 612. 45 | Stop | | 12. 45 | q | Q |
| 6 2. 45 | Stop | | 2. 45 | r | R |
| 61 . 45 | Stop | | 1 . 45 | s | S |
| 6 . 45 | Stop | | . 45 | t | T |
| 612.3 5 | | | 12.3 5 | u | U |
| 6 2.3 5 | | | 2.3 5 | v | V |
| 61 .3 5 | | | 1 .3 5 | w | W |
| 6 .3 5 | Line space | | .3 5 | x | X |
| 612. 5 | | | 12. 5 | y | Y |
| 6 2. 5 | Tabulator | | 2. 5 | z | Z |
| 61 . 5 | Back space | | 1 . 5 | + | = |
| 6 . 5 | | | . 5 | — | " |
| 612.34 | | | 12.34 | . | , |
| 6 2.34 | ¾ | ¢ | 2.34 | a | A |
| 61 .34 | | | 1 .34 | b | B |
| 6 .34 | ½ | ? | .34 | c | C |
| 612. 4 | | | 12. 5 | d | D |
| 6 2. 4 | ¼ | ) | 2. 4 | e | E |
| 61 . 4 | 9 | ' | 1 . 4 | f | F |
| 6 . 4 | 8 | * | . 4 | Color shift | |
| 612.3 | 7 | ! | 12.3 | g | G |
| 6 2.3 | 6 | | 2.3 | h | H |
| 61 .3 | 5 | % | 1 .3 | i | I |
| 6 .3 | 4 | $ | .3 | Space bar | |
| 612. | 3 | / | 12. | j | J |
| 6 2. | 2 | & | 2. | k | K |
| 61 . | 1 | L | 1 . | ; | : |
| 6 . | 0 | ( | . | Leader | |

When a given typewriter key is struck or the corresponding symbol is read from the punched tape, voltages appear at the output of the auxiliary relay unit 160 on the appropriate ones of the six wires leading to the computer.

A control switch 174 and a small light 176 are located to the right of the keyboard of the unit 150. A switch 178, known as the "Punch-On" switch, controls the operation of the type punch unit. The switch 174 has three positions: NORMAL, DIRECT and TAPE.

When the switch 174 is in the NORMAL position there is no connection between the unit 150 and the computer. The tape reader may read tape and cause the typewriter to type out a copy and when the "Punch-On" switch 178 is in its ON position, punch out a new tape.

When the switch 174 is on DIRECT the following events can occur:

(1) Information can be typed directly into the computer and the tape punch may or may not, under control of the "Punch-On" control 178, be set to punch out simultaneously a tape copy of the information fed to the computer.

(2) The tape reader 156 can read information from a tape 154 and this will be sent to the computer. The typewriter will simultaneously type a copy of the information recorded in the tape being read and the tape punch may or may not be set by the "Punch-On" control 178 to punch out a tape copy of that information at the same time.

(3 Information coming from the computer will be typed out by the typewriter and the tape punch may or may not, under control of the "Punch-On" control 178, be set to punch out simultaneously a tape copy of that information.

With the switch 174 in the TAPE position, the input to the computer is only from the tape reader 156 and any output from the computer operates the tape punch only. So long as this switch 174 is in this position, the typewriter section of the unit 150 is disconnected.

The small lamp 176, previously referred to, is mounted adjacent to the three position switch. This lamp is used to indicate when the particular input-output unit 150 has control of the computer in instances when more than one input-output unit is used with the computer.

INPUT-OUTPUT CONTROL 160

The input-output control 160, previously referred to, contains a group of relays interconnected with the various keys and controls in the input-output unit 150. When reading information into the computer, one group of these relays is actuated by the keys, controls, or tape reader to energize a group of six wires according to the previously described code so as to represent the character or function called for by the key, control, or tape. When the input information is read from the tape, the computer operates the relay that actuates the tape advance mechanism on the tape reader as is explained hereinafter in the section headed "100001—Read in Four Binary Bits." Thus the tape is advanced and the next character is read into the computer under control of the computer.

When information is being read out of the computer, that particular combination of relays of this group is energized which corresponds to the code for the character being read out, another group of six wires being employed for this purpose. The contacts on these relays then energize the punch magnets which result in punching the corresponding character in coded form on a tape and/or energize the translator magnets which cause the same character to be typed out as is explained hereinafter in the section entitled "100001—Read Out Four Digits."

INPUT REGISTER

The input register T (FIGURE 47) contains a group of six Flip-Flops designated $T_1$, $T_2$, $T_3$, $T_4$, $T_5$ and $T_6$ (found in positions W-2 through W-4 of FIGURE 3) that receive their inputs from six input lines which are selectively energized by the unit 150 through the control unit 160. They will each assume a state corresponding to the presence or absence of a voltage on their respective input lines. The Flip-Flops of the T register in the input stage assume a configuration corresponding to a binary code representation of the character being read by the data input-output device 150.

As an example, if the number 5 is typed on the keyboard or read from the tape there will be voltages on lines 1, 3 and 6. These voltages in turn will supply inputs to Flip-Flops $T_1$, $T_3$, and $T_6$. Thus, assuming that all Flip-Flops are initially cleared, Flip-Flops $T_1$, $T_3$ and $T_6$ will be true or "on" and Flip-Flops $T_2$, $T_3$ and $T_4$ will be false or "off." The number 5 is now in the computer ready to be used. The manner in which the T register is controlled, and the manner in which it controls the computer are described hereinafter in the section headed "100001—Read in Four Binary Bits."

MEMORY SECTION

Figures 10, 11:
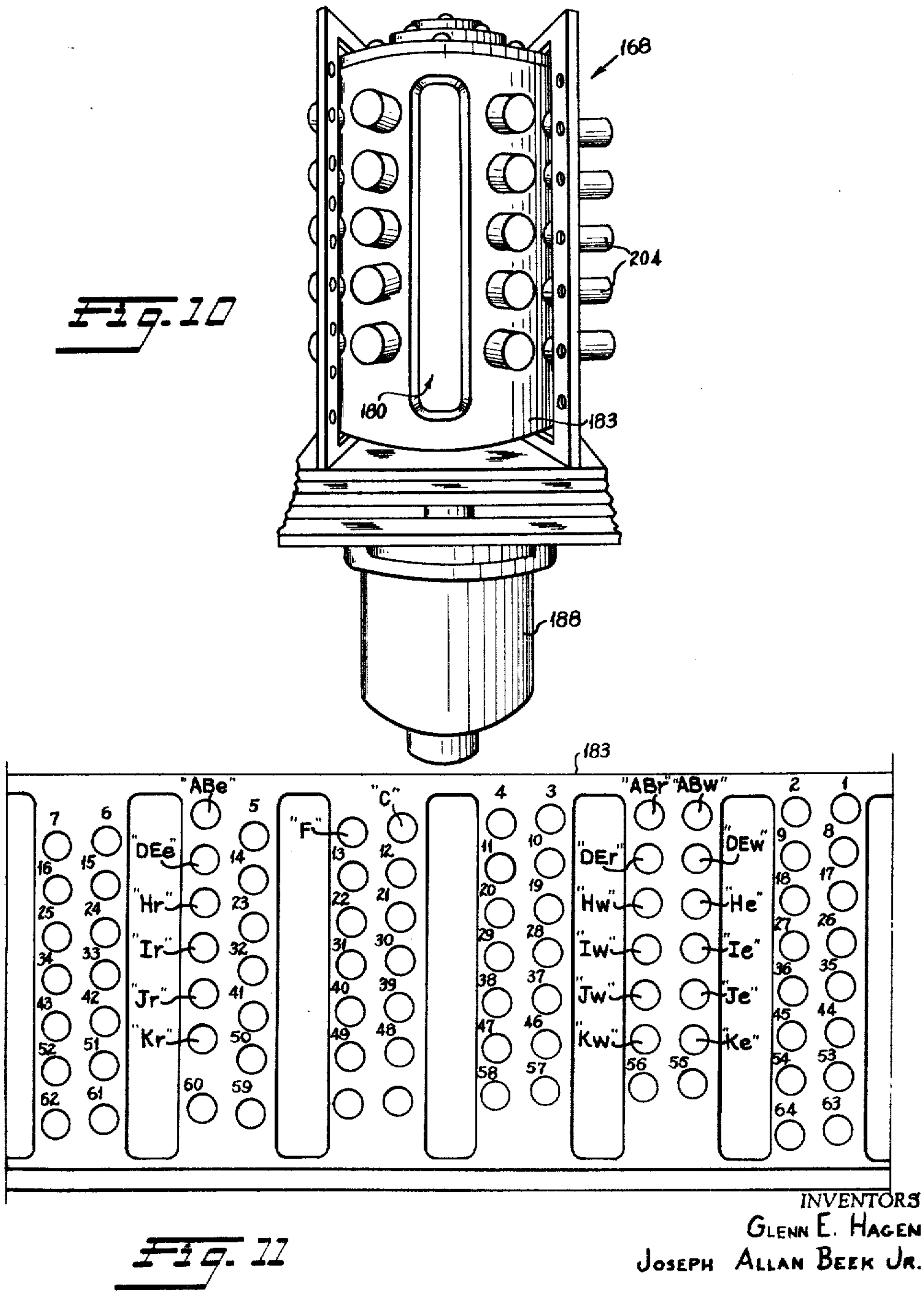
FIGURE 10 is a perspective view of the magnetic drum type recording unit of the present computer.
FIGURE 11 is a development of the exterior surface of the electromagnetic head mounting shell which is disposed about the magnetic drum and illustrating the location of the several electromagnetic heads relative to the drum.

The memory section 164 (FIGURE 1) includes the magnetic storage drum 180, means for storing or recording information on the drum, means for recovering or sensing the information that has been stored on the drum and the associated amplifying and pulse forming circuitry. A larger view of the magnetic storage device is shown in FIGURE 10.

Figure 12:
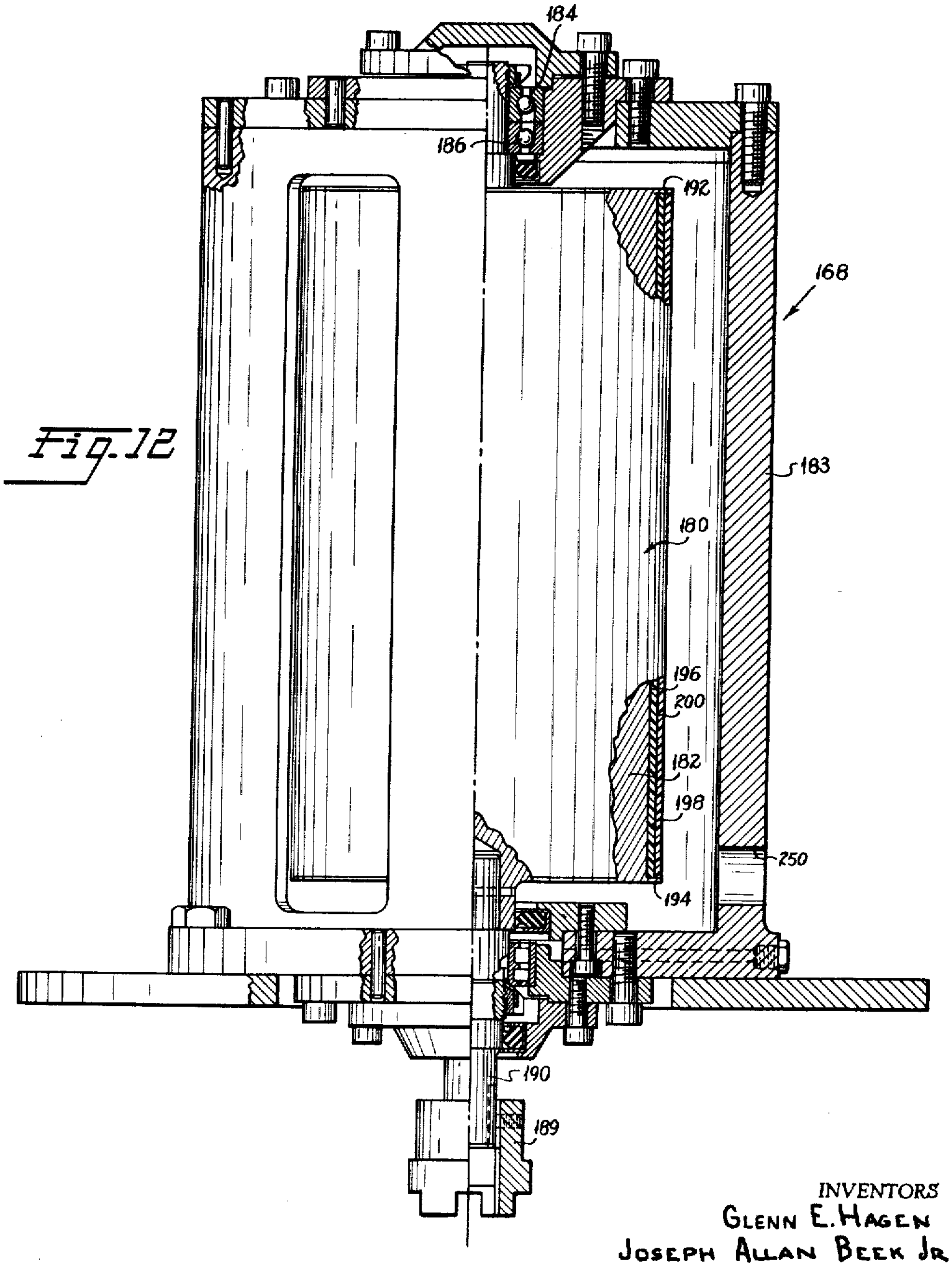
FIGURE 12 is an elevational view partially in section of the magnetic drum type storage unit showing in detail the construction of the record surface on the drum.

Physically, the drum 180, best shown in FIGURE 12, consists of an aluminum base cylinder 182 which is suspended within a hollow cylindrical housing or shell 183 from the top wall thereof by precision combined radial and thrust anti-friction bearings 184 and 186, cylinder 182 in the actual physical embodiment of the present invention being six inches in diameter and eleven and one-half inches long. During computer operation, drum 180 is rotated at a constant speed of 3450 revolutions per minute by an induction motor 188 (FIGURE 10). Motor 188 is drive coupled by a coupling 189 to a downwardly extending shaft 190 fixed coaxially to the lower end of drum 180 (FIGURE 12).

DRUM STRUCTURE

In manufacture, the outer surface of the cylinder 182 is machined so that a concentricity is maintained to within one ten-thousandths of an inch, radially extending flanges 192 and 194, each approximately twelve-thousandths of an inch in radial height, being provided at each axial extremity of the drum 182. The surface 196 of cylinder 182 intermediate flanges 192 and 194 is coated, as by spraying, to a thickness slightly greater than ten-thousandths of an inch with an epoxy resin to form a machinable non-conductive layer upon the surface 196 of the drum 180. The preferred epoxy resin is that known as Epon 828 sold by the Shell Chemical Corporation of 500 Fifth Avenue, New York 18, New York and 100 Bush Street, San Francisco, California. After this epoxy resin has hardened, it is machined to a thickness of ten-thousandths of an inch. This forms a thin insulating layer 198 upon the drum surface 196. A dispersion of iron oxide particles in a suitable binder such as shellac is applied over the insulating layer 198 to form a layer 200 approximately fifteen ten-thousandths of an inch thick constituting a recording medium of sufficiently high coercivity to retain magnetization of a discrete portion thereof for a practically indefinite duration until erased or another magnetic field is applied thereto. After this dispersion has dried, the surface of the drum is polished to provide a uniform cylindrical surface. The magnetic dispersion used is similar to the type used on conventional magnetic recording tapes. In the prior art drum structures, it has been found extremely difficult to provide a magnetizable coating of uniform thickness along the entire length of the drum, the coating tending to taper to a relatively thin layer in the region adjacent each end of the drum. It has been discovered that, by the provision of the radially extending flanges 192 and 194 at each end of the section of the drum surface to be coated, a dispersion of uniform thickness can be provided along the entire length of the drum and thus provide a uniform recording medium over the entire length of the drum.

A further improved aspect of the recording drum of the present computer resides in the provision of the non-conductive layer 198 intermediate the conductive base cylinder 182 and the magnetic dispersion layer 200. The effect of this intermediate insulating layer is to eliminate, to a large extent, the distortion and loss of strength of a recorded signal heretofore resulting from the eddy currents in the metallic base of the drum. As a result of this improved construction, a recorded signal on the periphery of the drum will produce a much sharper signal sensed by a reading head than the signals heretofore achievable with drums constructed in accordance with prior art teachings.

*Magnetic Head Mounts and Drum Layout*

The recording surface of the drum 180, formed by the dispersion layer 200, is effectively divided into 72 axially spaced parallel annular strips (FIGURE 59) upon which signals can be recorded. Each of such strips is known as a record track and the location of each such track longitudinally of the drum 180 is defined by the location of the associated reading and recording heads. Associated with certain of these tracks are read, record and erase heads; with others, a read head; and with others a dual purpose read-record head. Each of such heads consists of coil of fine wire wound upon a magnetic core of high permeability. The specific characteristics of these heads are chosen in accordance with the intended use in accordance with the conventional practice of the art. In reading a change of polarization of the layer 200 from one direction to the other will induce current flow in a sensing head in one direction and a reverse change in polarization will induce the opposite direction of current flow, one indicative of a change from binary zeros to ones and the other from ones to zeros. In recording, the passage of current through the coil in one direction will produce one direction of magnetization of the layer 200 under the head and reversal of current will reverse the magnetization one direction of current flow and the corresponding magnetization is indicative of a binary 1 and the opposite a binary 0. These heads are each mounted in an adjustable head mount which may be either of an axially adjustable type as shown in FIGURES 13 and 14, or a combination axially and transversely adjustable type as shown in FIGURES 15 and 16.

*Axially Adjustable Head Mount*

Referring to FIGURES 13 and 14 wherein the axially adjustable head mount 204 is illustrated, the head mount 204 is shown to comprise a generally cylindrical body member 206 provided at one end with a transverse end wall 208 and at the opposite end with a reduced portion forming a cylindrical piloting surface 210 terminating in a radially extending shoulder 212. Within the bore 214 of this body member 206 is mounted a generally cylindrical member 218 received therein in a sliding fit for axial movement relative to the body member 206. The member 218 is restrained against rotational movement by the engagement of the heads 220 of axially aligned screws 222 and 224, which are received within a threaded through aperture 226 radially of the member 218, with axially extending elongated apertures 228 and 230 formed through the wall of the member 206. The configuration of these apertures 228 and 230 are both of the form shown in FIGURE 14 as to aperture 228. The heads 220 of the screws 222 and 224 slide within the elongated apertures 228 and 230, respectively, to guide the member 218 within the wall 214 of the member 206 for free axial movement while preventing rotation thereof. The axial position of the internal member 218 within the wall 214 of the member 206 is controlled by a screw 232 which is threaded into the tapped end hole 234 at the end of the internal member 218 and which extends through a non-threaded aperture 236 through the end wall 208 of the member 206. A compression spring 238, which abuts at one end against the internal face of end wall 208 of the member 206 and at its opposite end against the adjacent end face of the internal member 128, biases the internal member 218 toward the open end of the member 206. The axial position of the internal member 218 relative to the member 206 is controlled by a nut 240 threaded upon the enlarged threaded portion of the screw 232 externally of and in abutment with the external end face of the end wall 208 of the member 206. By this construction, if it is desired to withdraw the internal member 218 further into the member 206 toward the end wall 208 thereof, the nut 240 is rotated to withdraw the screw 232 through the aperture 236 to thereby further compress the spring 238. If it is desired to allow the internal member 218 to move further away from the end wall 208, reverse rotation is imparted to the nut 240.

The magnetic head, previously described and which may be of the recording, reading, erasing or reading-recording type, is mounted against the face 242 of the end portion of the internal member 218 by a screw passing through the threaded aperture 244 to engage the core of the head. The electrical connecting wires from the head coil extend along the internal member 218 in the longitudinally extending groove 246 formed on the internal member 218 and through the side aperture 228 for connection to the appropriate associated electronic amplifying circuits. When this head mount is mounted in this operating position relative to the drum 180, the common axis of the external member 206 and the internal member 218 is substantially normal to and intersects an axis of rotation of the drum 180.

Referring to FIGURE 12, it has been previously indicated that the drum 180 is mounted within a cylindrical support or shell 183. This shell 183 is provided with a plurality of through apertures 250, the axes of which are normal to and intersect the axis of rotation of the drum 180 when mounted for rotation within shell 183. FIGURE 11 is a development of the external surface of the shell 183 showing the location of all of the apertures 250, the apertures as shown in FIGURE 11 having been assigned reference symbols indicative of the actual function in the computer of the head to be mounted therein as will be explained in detail hereinafter. Within each of these apertures is mounted a head mount of the type shown in FIGURES 13 and 14 or the type shown in FIGURES 15 and 16 with a head of a type appropriate to the assigned function mounted thereon and disposed adjacent the peripheral surface of the layer 200 of the drum 180. As to the head mount type 204, shown in FIGURES 13 and 14, it is the cylindrical surface 210 which is received with a snug piloting fit within the apertures 250 to the point which the annular shoulder 212 abuts against the external surface of the shell 183. Each mount is secured in position by a set screw (not shown). FIGURE 10 shows the shell 183 with various head mounts mounted in their operative position in the various mounting apertures 250 thereof at the location shown in the development view shown in FIGURE 11.

*Radially and Axially Adjustable Head Mount*

The radially and axially adjustable head mount 252, shown in FIGURES 15 and 16, comprises an external hollow cylindrical member 254 having at one end a transverse end wall 256 apertured at 258 coaxial with its bore 260 and a reduced portion defined by the cylindrical piloting surface 262 and the radially extending annular abutment face 264 at the other end. An internal member 266 having an axially extending bore 268 is slidably received within the bore 260 of the external member 254 for axial movement therein. Internal member 266 is provided with an end wall 270 having a central threaded aperture 272 into which is received the reduced threaded end portion of an adjusting screw 274. The screw 274 extends through the non-threaded aperture 258 for longitudinal sliding movement therein and is provided with a nut 276 threaded on the enlarged portion thereof externally of the end wall 256. A compression spring 278 is compressed against the internal face of the end wall 256 of the member 254 and the external face of the end wall 270 of the internal member 266 to bias the internal member 266 away from the end wall 256 of the member 254. The position of the internal member 266 axially of the member 254 is controlled by the nut 276 on the screw 274 in the same manner that the nut 240 controls the axial position of the internal member 218 of the mount shown in FIGURES 13 and 14.

Member 254 is provided with aligned longitudinally extending elongated apertures 280 and 282 at diametrically opposed sides thereof in which are slidably received the heads of screws 284 and 286 which are mounted in coaxial threaded apertures through the cylindrical wall of the internal member 266. The engagement of the heads of these screws 284 and 286 with the elongated apertures 280 and 282 respectively restrains the internal member 266 against rotation relative to external member 254. A magnetic head is attached, by a screw (not shown) extending through the threaded aperture 288 to engage the core thereof, against the planar face 290 in a manner similar to that in which a head is attached to the head mount shown in FIGURES 13 and 14 as explained previously. The surface 290 is formed on a movable member 292 which has a stem 294 of a diameter substantially smaller than that of the bore 268 of the internal member 266 and which extends within that bore 268 and pivoted therein upon a pivot pin 296 mounted diametrally of member 266 adjacent its open end.

The opposite end of the stem 294 is disposed between the opposed ends of the screws 284 and 286 whereby the pivoted position of the member 292 about the pivot pin 296 can be controlled by the cooperative adjustment of screws 284 and 286 within their respective threaded apertures. The lead wires to the head extend through the aperture 280, and aligned aperture 297 in member 266 and through the bore thereof to the head. This head mount 252 is aligned on the shell 183 (FIGURE 12) by the piloting engagement of the reduced portion 262 within one of the apertures 250 and the abutment of face 264 against the external face of the shell 183 in the same manner as the head 204 is received therein as previously described. Heads 252 are likewise each secured in this aligned position by a set screw (not shown).

As thus mounted relative to the drum 180, adjustment of the nut 276 on the head mount 252 or of the nut 240 on the head mount 204 will effect movement of the recording head mounted on these mounts radially of drum, that is toward or from the periphery of the drum. In addition, in the head mount 252 cooperative adjustment of the screws 284 and 286 will effect displacement of the recording head circumferentially of the drum to a limited extent.

*Drum Layout*

As has been indicated the surface of the magnetic recording drum 180 is divided into a total of seventy-two distinct annular record tracks of which the position on the drum 180 is defined by the location of one or more head mounts. The actual physical location of these tracks which is arbitrarily assigned, is best shown in FIGURES 11 and 59.

On one of these tracks are recorded eleven hundred and twenty equally spaced pulses. The pulses recorded in this track are known as the clock channel. It is these pulses which control the timing of operation of all circuit actuations throughout the machine. The track of the clock channel is indicated at 290 in FIGURE 59 and is located in alignment with a reading head supported in the aperture marked "C" in FIGURE 11.

Each track upon the periphery of the drum is capable of recording eleven hundred and twenty pulses although, as will be apparent, this total capacity is not utilized in certain tracks. These eleven hundred and twenty pulses are divided into sixteen groups of seventy successive pulses each. Each of these sixteen groups of seventy successive pulses is denominated as a word pair and the time interval for the occurrence of these seventy clock pulses is known as one word time. For each sixteen word pair channel, the individual word pairs are identified by the numbers 0 to 15, in binary 0000 to 1111, as is indicated in FIGURE 60.

It should be noted that the term "track" as herein used means an annular strip upon the drum periphery which has a possible storage capacity of sixteen word pairs and that the term "channel" is a unit of quantity of data equal to sixteen word pairs of information. Specifically one channel may be recorded in certain instances on a single track but one channel constitutes a unitary group of sixteen word pairs irrespective of whether or not it is recorded in a single track.

A second one of the tracks upon the drum which is known as the "F" track or timing track is shown at 291 in FIGURE 59. The "F" track is effectively divided into sixteen sections of one word time in length. In the "F" channel, the last four pulse spaces of the seventy allocated to each one word time space contain a record of the word pair designation (0000 to 1111) of the next succeeding word pair. This is symbolically presented in FIGURE 18, the P34, E34, P33 and E33 pulse times of the zero word pair containing 0, 0, 0, and 1, the corresponding pulse times of the first word pair containing 0, 0, 1, 0, etc. Referring to the timing chart (FIGURE 20) wherein the "F" channel is shown, it will be noted that the seventy pulses of the clock channel which are allocated to each one word time interval are denominated alternately as "E" and "P" pulses numbered E0 to P34. In the "F" channel a pulse is recorded at P8, P16, P24 and P32. These four pulses are the last pulses of syllables 3, 2, 1 and 0 respectively of each word pair, it being understood that each word contains four syllables of eight pulses each. The signals recorded in clock and timing tracks 290 and 291 are basic timing and control signals which are never modified. For this reason, once the signals have been recorded on these two tracks, read heads are mounted in the apertures 250 of FIGURE 11 marked "F" and "C." The manner in which these signals are utilized in the control of the computer will become evident as the description proceeds.

Referring again to FIGURES 11 and 59, two further tracks 292 and 293, designated the AB and DE tracks are allocated for the purpose of high speed data storage. Associated with the AB track is a read head $AB_r$, a record head $AB_w$, and an erase head $AB_e$. As will be explained in more detail hereinafter, the read head $AB_r$ is coupled to the record head $AB_w$ so that signals read from the drum by the read head are re-recorded by the record head. The spacing between the heads $AB_w$ and $AB_r$ is such that a digit-representing signal from the read head $AB_r$ appearing at any given reference point in the associated circuit at a given pulse time of one word time will be recorded on the drum by the record head $AB_w$ at a position such that it will read again by the read head $AB_r$ in time to be fed to that given reference point at the same given pulse time of the next succeeding word time under normal operation. The DE track is provided with a read head $DE_r$, a record head $DE_w$ and an erase head $DE_e$ similarly relatively spaced. Because of this spacing of the heads and the recirculation of the signals indicated diagrammatically in FIGURE 62, one word or 35 pulses is normally contained in the recirculating section comprising the track segment between the read and record heads and the feed back circuit connecting the read head to the record head. These 35 pulses make one complete trip through the loop each word time, and every pulse appears at the reference point once each word time. Accordingly, these tracks and their associated circuitry are referred to as one word time recirculation sections and also as the high speed memory section.

Four tracks 294, 295, 296 and 297 (FIGURE 59) are allocated for the purpose of intermediate speed memory. These tracks have been designated H, I, J and K, respectively. The read heads H*r*, I*r*, J*r* and K*r* are spaced approximately 180° apart, to be exact 179°40′ apart, from the corresponding record heads H*w*, I*w*, J*w*, and K*w*, respectively. Each track at any one time can contain slightly less than eight word pairs of information extending over one-half of the length of that track between the record and the read heads. The H track and the I track are combined together in what is known as the H—I recirculating or working channel, the H and I tracks, together with the associated circuits which will be explained hereinafter, containing the complete sixteen word pairs of a signal channel. The J and K tracks are similarly combined to form the J—K working channel containing a maximum of sixteen word pairs with the associated circuits, approximately eight complete word pairs on each of the two tracks. As will be explained subsequently, a digit of a given word pair is available from the H—I or J—K channels at any given reference point in the associated circuits once during each revolution of the drum. As is explained in the detailed description which follows, it is in the H—I and J—K channels that the control signals for orders and addresses required for immediate access to control the step-by-step operation of the computer in the performance of a problem as well as the greater portion of the data upon which the calculations will be performed in a complex problem are stored.

The remaining sixty-four tracks of the drum shown in FIGURE 59, the apertures for the head mounts of which are designated 1 through 64 in FIGURE 11, are allocated for the purpose of slow-speed storage. Each such track is capable of storing a complete sixteen-word pair channel and each is provided with a single dual-purpose record-read head. As is explained in the detailed description to follow, when it is desired to use data recorded in any one of these sixty-four channels, the data recorded in such channel is first transferred into the intermediate speed storage unit of the H—I or J—K channels. Data is never used directly from the slow-speed storage in computation.

Figure 17:
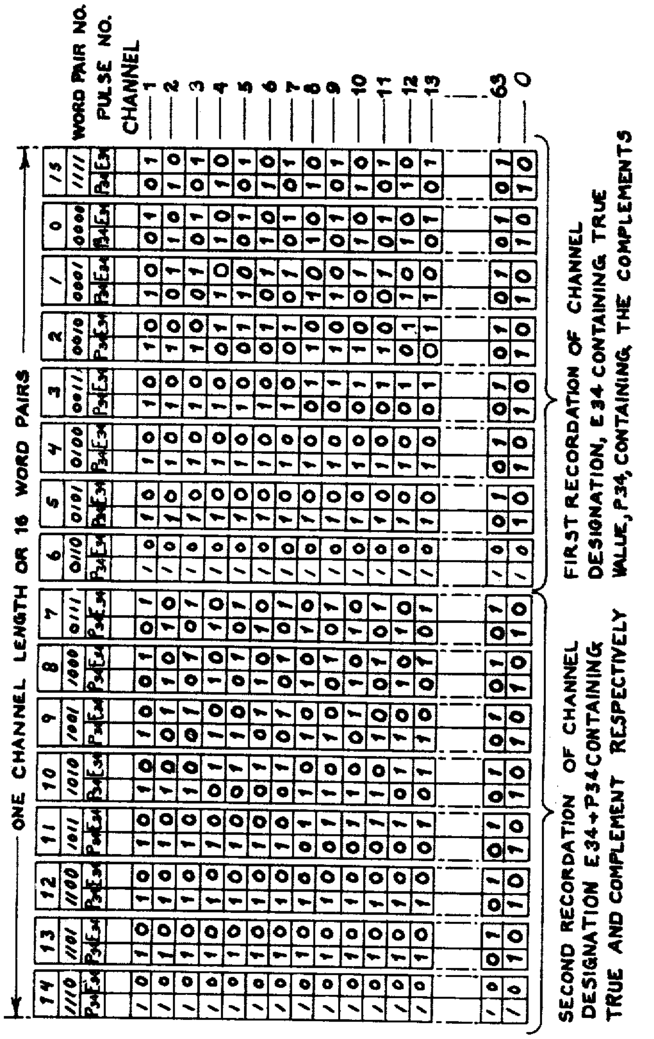
FIGURE 17 is a diagrammatic representation of the manner in which the channel identification digits are recorded in the tracks of the permanent memory section of the storage unit.

These sixty-four channels are identified by a corresponding channel identification number recorded on the track as a part of each word pair. This is illustrated by FIGURE 17. The E34 pulses of fourteen word pairs of each of these sixty-four channels are utilized to record in sequence, starting with the E34 pulse of word pairs zero and eight, the seven binary digits of the true value of the channel identification number. This seven-digit number is recorded once in the E34 pulses of word pairs 0 to 6, and again in the E34 pulses of word pairs 8 to 14. The complement of the number recorded in the E34 pulses is recorded in the P34 pulses of the corresponding word pairs. The E34 and P34 pulses of word pairs fifteen and seven contain the same digits as E34 and P34 of word pairs zero and eight, respectively, in each of the sixty-four channels. This double recording of the channel identification numbers permits the numbers to be read twice during each drum revolution. In FIGURE 17, the top line gives the word pair number in decimal form, the second line the binary equivalent thereof and the following lines the successive channel identification digits of channels 1 through 13, 63 and 0 as they appear in the E34 and P34 pulse times of the successive word pairs 0 to 6 and 8 to 14. These recorded identifying numbers are utilized in the manner described hereinafter in the selection of a desired channel.

TIMING LOGIC

The master timing device in the computer is known as the clock. The clock completely occupies the one track 290 on the drum 180 and consists of 1120 evenly spaced pulses recorded on that track. The signal from the clock track in amplified and shaped form is shown on the line marked "C" of the timing chart, FIGURE 20. All operations are initiated by the fall or trailing edge of a clock pulse. Since time progresses from right to left in the chart of FIGURE 20, the trailing edge of the clock signal is the transition from a high to a low value. All timed operations within the machine are synchronized by the trailing edge of a clock pulse.

Figure 20:
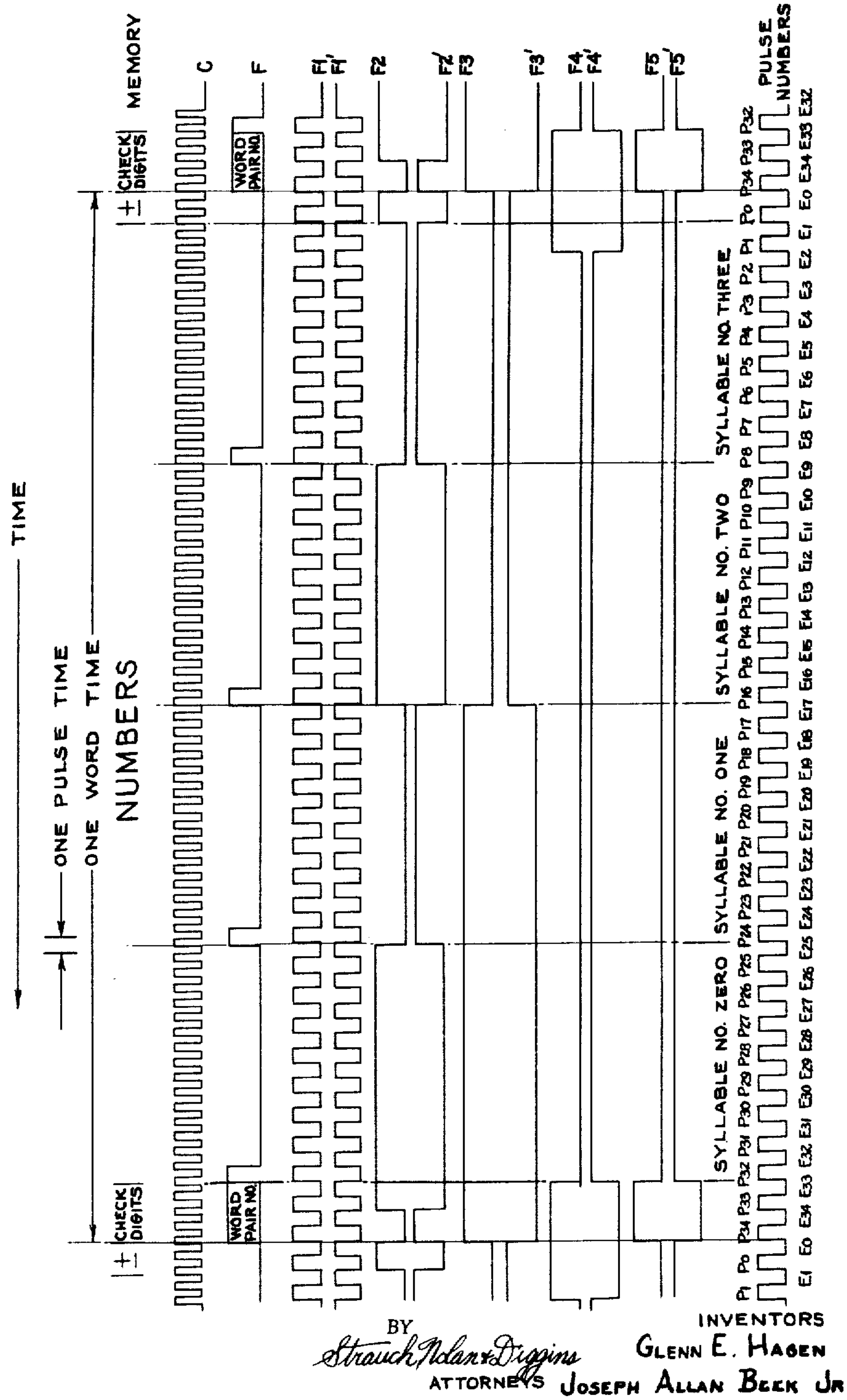
FIGURE 20 is a pulse chart illustrating the basic timing of the computer.
Figure 21:
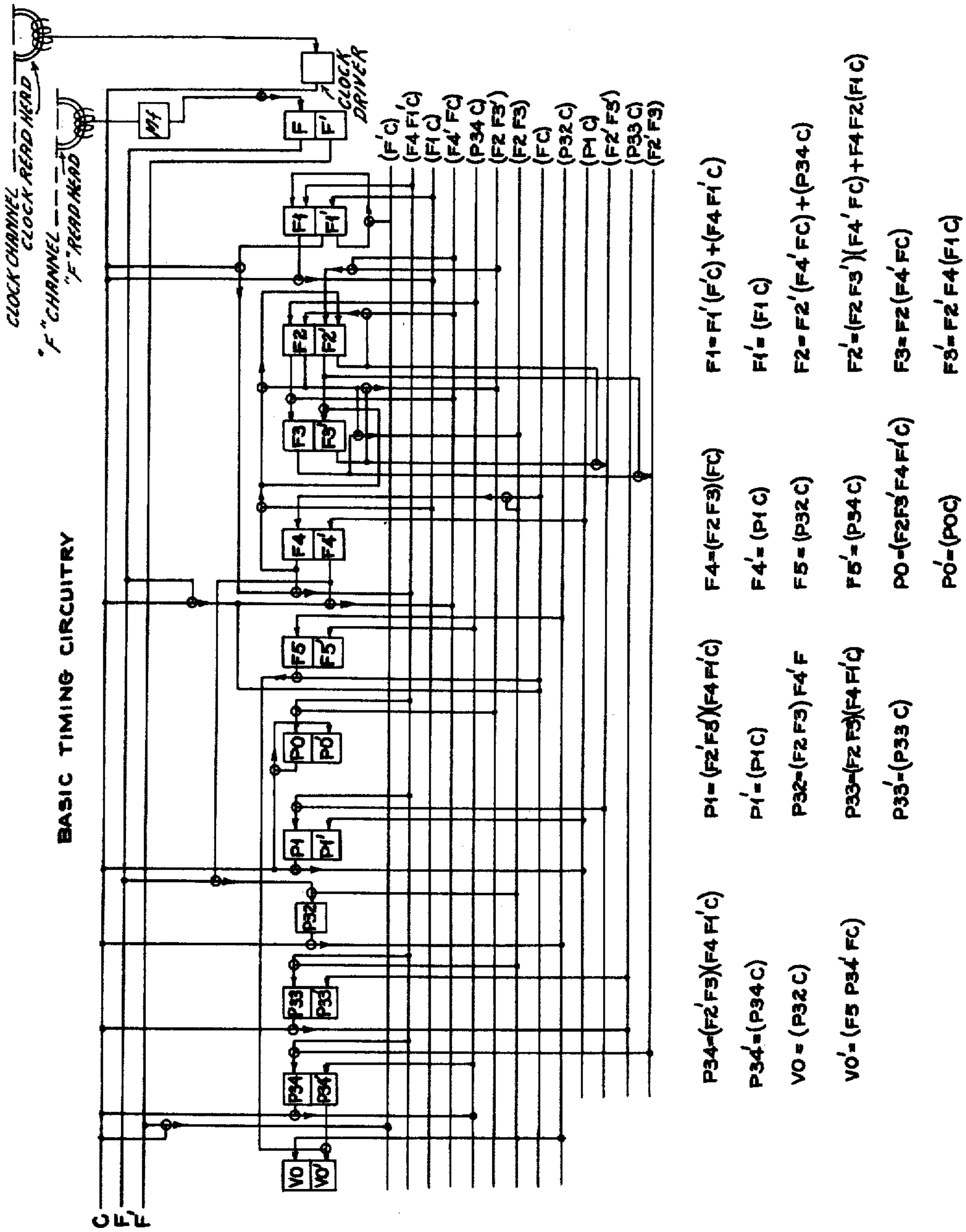
FIGURE 21 is a schematic and symbolic presentation of the basic timing circuitry of the present computer.

It is also necessary to have some means to distinguish one syllable from another, to identify the beginning and end of words, the sign digit and to separate the successive digits of each word pair. Therefore, the extra timing track 291 is provided which establishes the orientation of the drum. This timing channel, the signal of which for a period of slightly over one word time interval is shown at "F" in FIGURE 20 is the F channel previously referred to. The F-counter associated with this channel consists of six flip-flops $\underline{F}$, $\underline{F1}$, $\underline{F2}$, $\underline{F3}$, $\underline{F4}$ and $\underline{F5}$ (FIGURE 21).

*F Channel Logic*

The F channel logic encompasses the clock and F channels, flip-flops $\underline{F_1}$, $\underline{F_2}$, $\underline{F_3}$, $\underline{F_4}$, $\underline{F_5}$, $\underline{P_0}$, $\underline{P_1}$, $\underline{P_{33}}$, $\underline{P_{34}}$, and the $\underline{P_{32}}$ driver. The flip-flops referred to, as well as others hereinafter mentioned, preferably comprise a well known form bi-stable trigger circuit such as is shown in FIGURE 3A–1 wherein a pair of flip-flop circuits is illustrated. The flip-flop provides a true or "on" side and false or "off" side, each side having an input and an output, the circuit being arranged so that an input pulse applied to the "on" input will turn the flip-flop "on" providing an "on" or true output (+15 volts) and zero output from the false or "off" side. When "on," the flip-flop will remain in that state until an input pulse is applied to the "off" input. When "off," the flip-flop will provide an "off" or false output (+15 volts) and zero output from the "on" or true side. The flip-flop will remain in its "off" state until an input pulse is applied to the "on" input.

The flip-flops used in the instant computer respond only to negative-going input pulses, and are for that reason gated to the clock. When the coincidence conditions required by the input gating obtain in a given pulse time, a positive pulse is applied by the gating to the associated input terminal. Since the flip-flop responds only to negative going pulses, it does not operate at that given pulse time, but is operated at the end of that given pulse time by the negative-going pulse resulting from the "fall" of the clock signal. Thus, the new state of the flip-flop begins with the pulse time next following the given pulse time, and, as a consequence, signals are delayed one pulse time by each flip-flop through which they are passed.

The driver referred to, as well as other drivers used in the computer, comprises a well known form of pulse amplifier such as that shown in FIGURE 3B–1 wherein a pair of driver circuits is illustrated. The driver provides a single input and a pair (true or "on" and false or "off") of outputs, and the operation of the circuit is such that when the input is true or "on" (+15 volts), the driver will deliver a signal (+15 volts) at the true output and zero signal at the false output, whereas when the input is false or "off" (zero volts), the driver will deliver a signal (+15 volts) at the false output and zero signal at the true output. The output signals are coexistent with the input signals from which they are derived; hence, the drivers are not gated to the clock and the signals are not delayed as they are by a flip-flop. The timing chart, FIGURE 20, shows graphically the interval during which each F flip-flop is "on" at lines F, $F_1$, $F_2$, $F_3$, $F_4$ and $F_5$, "off" at lines F', $F_1'$, $F_2'$, $F_3'$, $F_4'$ and $F_5'$, and on the bottom line the letter designations E0 through P34 given to each pulse time. The "P" pulses are the digits of one of two biplexed words and the "E" pulses are the digits of the other word of the two biplexed words. As will be explained in detail later, alternate pulse times are utilized to record the digits of two distinct numbers so that in any given single word time space on the memory drum, two separate thirty-two digit numbers are recorded, the "P" pulses being utilized for one word and the "E" pulses for the other. This is the basis for the expressions biplexed words and word pairs. Since the least significant digits of a number must be read first and yet are on the right hand end, time moves from right to left on this chart.

The clock channel is represented by the dashed line so designated in FIGURE 21 where the clock read head is shown connected to a clock driver or pulse forming amplifier. The signal C in FIGURE 20 is the signal that is obtained at the output of the clock driver shown in FIGURE 21. The input flip-flop of the F channel is designated by $\underline{F}$, and since it receives its information directly from F channel read circuitry its logic is such that its output signal merely presents an amplified and shaped record of the signal recorded in the F channel represented by the dashed line so designated in FIGURE 21. The F channel read head is connected to an amplifier $\underline{Mf}$ which is, in turn connected to the input flip-flop $\underline{F}$.

The equations:

$$\underline{F}=F'M_fC$$
$$\underline{F'}=FM_f'C$$

define the input circuits to the on and off sides of the $\underline{F}$ flip-flop respectively.

$\underline{F_1}$ functions primarily to separate the biplexed words, producing signals F1 and F1' which are on during the "P" and "E" pulses, respectively. The gating circuits for controlling the inputs to $\underline{F1}$ are shown in FIGURE 21 and are defined by:

$$\underline{F1}=F1'F'C+F4F1'C$$
$$\underline{F1'}=F1C$$

The basic logic for $\underline{F_1}$ is very simple: when it is on, it turns off on the next C signal, and when it is off, it turns on on the next C signal. In order to ensure that $\underline{F_1}$ will start in phase with the $\underline{F}$ flip-flop and be on at the same times that $\underline{F}$ is on; i.e., during the "P" pulses, the F' signal is included in the logic for $\underline{F_1}$ so that if F is on, $\underline{F_1}$ cannot be turned on in the following pulse time. Furthermore, since during the word pair numbers recorded in E33 to P34, $\underline{F}$ may be in any phase depending on what word pair number is being read off, $\underline{F_1}$ is caused to operate independently of $\underline{F}$ during this time. As is apparent from FIGURE 20, this time interval is characterized by $\underline{F_4}$ being on. Accordingly, the signal $F_4$ is combined with signals $F_1'$ and C in the second term for $\underline{F1}$ so that when $\underline{F_4}$ is on, $\underline{F_1}$ operates normally regardless of the condition of $\underline{F}$.

Flip-flop $\underline{F_2}$ is turned on and off in the middle of a word and is used in part to define the syllables of each one word time interval. The gating circuits for controlling the inputs to $\underline{F2}$ are also shown in FIGURE 21 and are defined by:

$$\underline{F2}=F2'F4'FC+P34C$$
$$\underline{F2'}=F2F3'F4'FC+F4F2F1C$$

The F3′ signal, which is on during P16 but off during P32, is included in the logic for F2′ in order that F2 will stay on during P33 to permit its use in separating the check digits. The second term is added in the logic for F2′ to turn off $F_2$ after $P_{33}$ and $P_0$, during which times F4 is on. Signal F1 is included in this term to prevent $F_2$ from being triggered off at the end of $E_{33}$ and $E_0$.

The $P_{34}C$ term is added to the $F_2$ logic in order to turn $F_2$ on at the end of P34.

Flip-flop $F_3$ is used to separate the two halves of a word. The input gating circuits for F3 are shown in FIGURE 21 and are defined by:

$$\underline{F3}=F2F4'FC$$

$$\underline{F3'}=F2'F4F1C$$

F3 goes on in the middle of a word when F2 and F both occur, and goes off at the end of the word at the first $F_1$ after $F_2$ goes off. Signals F4 and F4′ are included to keep $F_3$ from going off during syllable number zero. This term will give another "off" trigger to $F_3$ at the end of $P_1$, but as it is already off, further "off" triggers have no effect.

Flip-flop $F_4$ is used to designate the check and sign digit period from E33 to P0 and the first pulses (E1 and P1) of syllable number three. The input gating circuits are shown in FIGURE 21 and defined by:

$$\underline{F4}=F2F3FC$$

$$\underline{F4'}=P1C$$

Flip-flop F4 goes on at the end of P32 (defined by the signals F2F3F), and off at the end of P1.

Flip-flop $F_5$ defines the interval (E33 to P34) when the word pair number is being read off the drum. It comes on at the end of $P_{32}$ and goes off at the end of $P_{34}$. The input circuits are shown in FIGURE 21 and defined by:

$$\underline{F_5}=P_{32}C$$

$$\underline{F_5'}=P_{34}C$$

A number of individual pulse times (i.e., pulse times P0, P1, P32, P33, and P34) are used frequently enough in the control of the computer to warrant the use of individual pulse forming units comprising flip-flops P0, P1, P33, P34, and driver P32 which are on only for the corresponding pulse time. The circuits for controlling flip-flops P0, P1, P33 and P34 are shown in FIGURE 21 and defined by:

$$\underline{P_0}=F_2F_3'F_4F_1'C$$

$$\underline{P_0'}=P_0C$$

$$\underline{P_1}=F_2'F_3'F_4F_1'C$$

$$\underline{P_1'}=P_1C$$

$$\underline{P33}=F2F3F4F1'C$$

$$\underline{P33'}=P33C$$

$$\underline{P34}=F2'F3F4F1'C$$

$$\underline{P34'}=P34C$$

A driver is used to indicate the $P_{32}$ pulse time since there is no simple distinctive combination of F flip-flops that can be used to trigger a flip-flop on only during $P_{32}$. However, since the F flip-flop is turned on during $P_{32}$, the F signal is combined with signals F2, F3 and F4′ to provide a pulse out from the driver P32 only during pulse P32. FIGURE 21 shows the circuits controlling the operation of the P32 driver, which circuits are defined by:

$$\underline{P_{32}}=F_2F_3F_4'F$$

These circuit components and their input signals through the circuits shown in FIGURE 21 and defined by the foregoing logic equations constitute the basic timing circuitry of the computer.

ONE WORD RECIRCULATING REGISTERS

As has been indicated, the digits recorded in the AB and DE tracks are available at a given reference point, once during each one word time interval. Each of these tracks actually contains the digits of two separate numbers biplexed together, that is the lowest order digit of one number is recorded between the lowest and the next to the lowest denominational order digits of the other number. Referring to the timing chart, FIGURE 20, this means that the digits of one number are recorded in pulse spaces $P_1$ to $P_{32}$ and of the other number in pulse spaces $E_1$ to $E_{32}$.

The AB and DE tracks, together with their respective heads are recirculating circuits previously mentioned and described in detail shortly hereinafter, together provide four registers known as A, B, D and E that are capable of holding only one word each, the "E" pulses of the AB track being the A register, the "P" pulses the B register, the "E" pulses of the DE track being the D register and the "P" pulses the E register. The A and B and D and E registers are, therefore, respectively biplexed. The basic reason for this biplexing is the minimum possible spacing between heads about the drum periphery. The size of the heads is such that they must be mounted on at least one inch centers. Since a single 35 pulse word occupies a physical space of slightly more than half an inch when recorded on the drum surface, the required one inch center spacing results in wasting approximately half of the available recording space in drums utilized in accordance with prior practice. It has been discovered that a substantially complete utilization of available storage can be achieved by biplexing two numbers together prior to recording upon the drum. This means that in the single track constituting the A—B register each digit of A is followed by the corresponding denominational digit of B. Thus it is possible to maintain an optimum digit density of the order of 60 or 70 pulses per inch on the entire available storage surface with 35 digit words and heads spaced apart approximately one word space, despite the fact that the heads must be mounted on at least one inch centers as is necessary with the presently available head sizes. These registers are known as recirculating registers because the value stored is constantly re-recorded upon the surface of the drum at one word length distance from the point at which it is being read.

Figure 22:
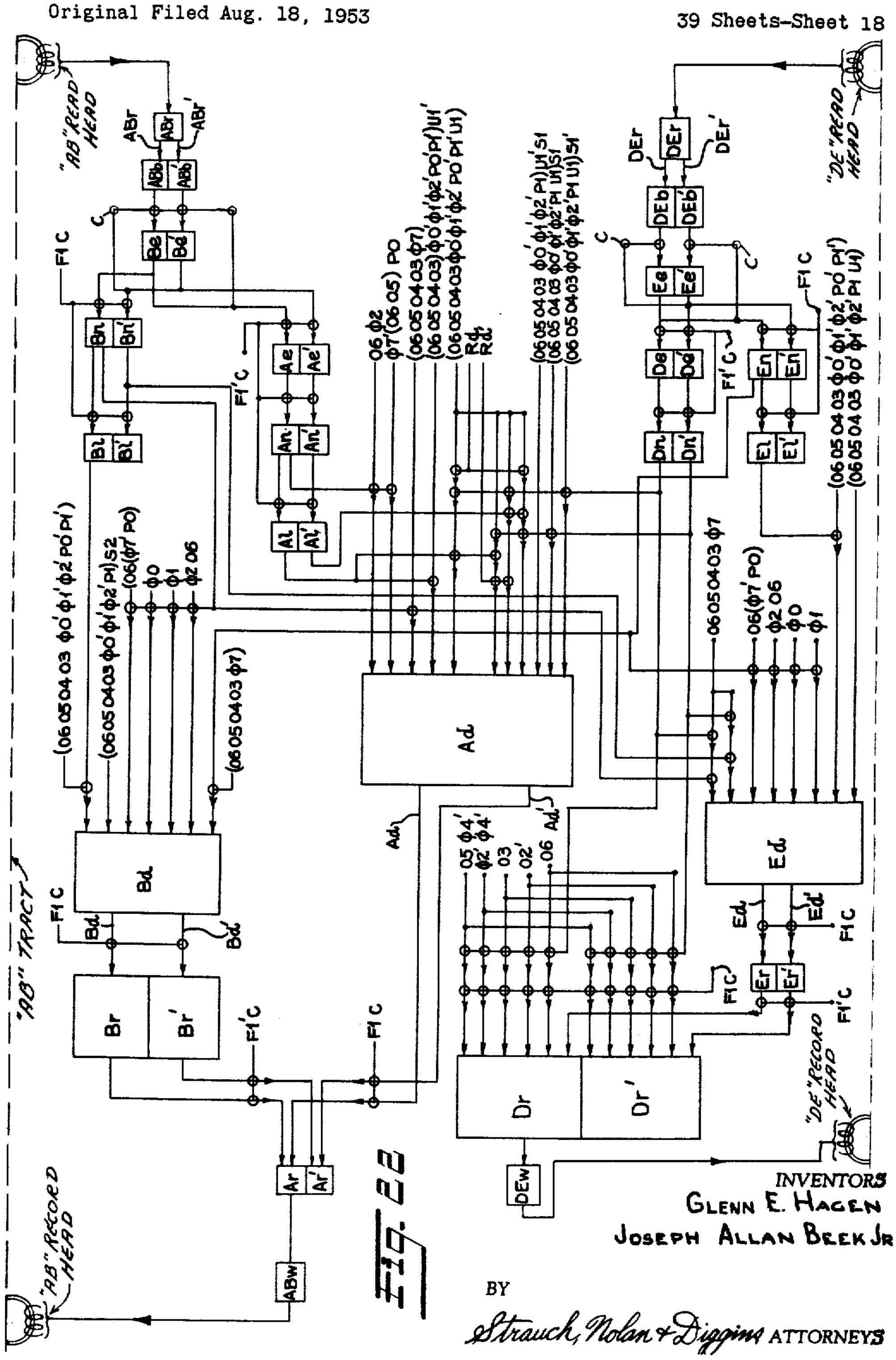
FIGURE 22 is a schematic presentation of the AB and DE recirculation channels constituting the A, B, D and E registers, the circuitry for normal recirculation and division operation only having been illustrated therein.

As has been indicated, registers A and B are biplexed together. By referring to the block diagram (FIGURE 22) it can be seen that the word pair in track AB is read by the AB read head through the read amplifier AB*r* from the drum in serial fashion; first a digit of A (the "E" pulses) and then a digit of B (the "P" pulses). These digits then go through flip-flops $AB_b$ and $B_e$ to the AB debiplexer, consisting of flip-flops $B_n$ and $A_e$. As is shown in FIGURE 22, B*n* is gated to the clock and to the signal F1, and therefore can be operated only by B*e* and B*e*′ signals which occupy the "P" pulses (see FIGURE 20). In a like manner, A*e* is gated to the clock and to the signal F1′, and therefore can be operated only by B*e* and B*e*′ signals which occupy the "E" pulses. A*e* and B*n* thus separate the biplexed signals in track AB into individual words out of phase by one clock pulse time. As will be explained in detail shortly, word A then flows through the A circuits where the number A is operated upon digit by digit depending on what operation is desired. If A is not to be modified, it flows out of the A circuits unchanged and into the AB biplexer, flip-flop A*r*, where it is again combined with B which has undergone the same procedure through the B circuits. As is shown in FIGURE 22, flip-flop A*r* is gated to the clock and to signal F1 as to the digits of A, and is also gated to the clock and to the signal F1′ as to the digits of B. Thus $\underline{Ar}$ will pass the digits of A during the "E" pulse times, and will pass the digits of B during the "P" pulse times. The biplexed word pair signals delivered by $Ar$ are then recorded through the record amplifier $AB_w$ on the drum. The contents of the AB register pair are constantly being recirculated at the rate of once every word time or sixteen times each drum revolution, being changed if a change is required or remaining as is if neither A nor B is to be changed. The D and E registers operate in a similar manner; that is, D and E are biplexed upon the single track D—E and recirculated during each word time interval. As pointed out hereinbefore, words A, B, D and E are referred to as the fast storage of the computer since they are available every word time.

More particularly the A—B recirculation circuits shown in FIGURE 22 not only make available the current digit of each word but the previous digit and the following digit as well. This is because these digits are used in the arithmetical operations. To achieve all this the digits as read from the drum are separated into two streams, each one being passed through a chain of flip-flops.

$\underline{B_e}$ is the flip-flop that presents the information that is being read from the AB track. At the end of a "P" pulse (at times FIC) a new digit of A is placed in $\underline{B_e}$ from the buffer flip-flop $\underline{AB_b}$, and $\underline{B_e}$ steps to $\underline{B_n}$, and $\underline{B_n}$, is stepped through $\underline{B_d}$ into $\underline{B_r}$. Only the straight recirculation is presented here, the control during particular computations being set forth hereinafter. In such computations, it is oftentimes necessary to shift the digits in the B register, in which event they are routed through the flip-flop $\underline{B1}$ to driver $\underline{Bd}$, as shown, thus interposing a one-digit delay and lengthening the recirculation time by one digit. At the end of the "E" pulses (at times FI′C) a new digit from the AB track is read into $\underline{B_e}$. The digit in $\underline{B_e}$ steps to $\underline{A_e}$, $\underline{A_e}$ to $\underline{A_n}$, and $\underline{A_n}$ through $\underline{A_d}$ to $\underline{A_r}$. If shifting to the digits in the A register is required, $\underline{Ae}$ is used to control $\underline{Ad}$ to shorten the recirculation time by one digit, or the digits from $\underline{An}$ are routed through flip-flop $\underline{A1}$, to driver $\underline{Ad}$, as shown to lengthen the recirculation time by one digit.

During P pulses (flip-flop F1 "on"), the current digits are in $\underline{A_n}$ and $\underline{B_n}$. The recirculation of the B register is effected by the circuits of FIGURE 22 which are defined by:

$$\underline{B_e}=B_e'AB_bC$$
$$\underline{B_e'}=B_eAB_b'C$$
$$\underline{B_n}=B_eF_1C$$
$$\underline{B_n'}=B_e'F_1C$$
$$\underline{B_d}=\phi_0B_n+\phi_1B_n$$
$$\underline{B_1}=B_nF_1C$$
$$\underline{B_1'}=B_n'F_1C$$
$$\underline{B_r}=B_dF_1C$$
$$\underline{B_r'}=B_d'F_1C$$

The recirculation of the A register is effected by the circuits of FIGURE 22 which are defined by:

$$\underline{A_e}=B_eF_1'C$$
$$\underline{Ae}=B_e'F_1C$$
$$\underline{A_n}=A_eF_1'C$$
$$\underline{A_n'}=A'_eF_1'C$$
$$\underline{A_d}=\phi_0A_n+\phi_1A_n$$
$$\underline{A_1'}=A_n'F1'_1C$$
$$\underline{A_r}=A_dF_1C+B_rF1'_1C$$
$$\underline{A_r'}=A_d'F_1C+B_r'F_1'C$$

In the above equations the signals $\phi0$ and $\phi1$ are sequence control signals supplied by the sequence register hereinafter described and serve to define two of the various operating sequences of the machine. During the other sequences the recirculation is controlled by the order in the order register O, the construction and operation of which is described later. The input circuits to $\underline{Ad}$, $\underline{Bd}$, $\underline{Dr}$, and $\underline{Ed}$ shown in FIGURE 22 are those peculiar to the dividing operation.

$\underline{A_r}$ is the flip-flop whose contents are being recorded on the drum and hence receives its information from both $\underline{A_d}$ and $\underline{B_r}$.

At this point it should be noted that all pulse times shown in FIGURE 20 are indicated with $\underline{A_n}$, $\underline{B_n}$, $\underline{D_n}$, or $\underline{E_n}$ as the reference point, that is a digit referred to herein as recorded in pulse $E_1$ would appear at $\underline{A_n}$ at $E_1$ time by FIGURE 20.

The recirculation of the D and E registers is effected in a similar manner by means of the circuitry shown on FIGURE 22 and defined by:

$$\underline{Ee}=Ee'DEbC$$
$$\underline{Ee'}=EeDEB'C$$
$$\underline{De}=EeF1'C$$
$$\underline{De'}=Ee'F1'C$$
$$\underline{Dn}=DeF1'C$$
$$\underline{Dn'}=De'F1'C$$
$$\underline{En}=EeF1C$$
$$\underline{En'}=Ee'F1C$$
$$\underline{El}=EnF1C$$
$$\underline{El'}=En'F1C$$
$$\underline{Ed}=\phi0En+\phi1En$$
$$\underline{Er}=EdF1C$$
$$\underline{Er'}=Ed'F1C$$
$$\underline{Dr}=ErF1'C+\phi2'\phi4'DnF1C$$
$$\underline{Dr'}=Er'F1'C+\phi2'\phi4'Dn'F1C$$

H, I, J AND K RECIRCULATION

Figure 24:
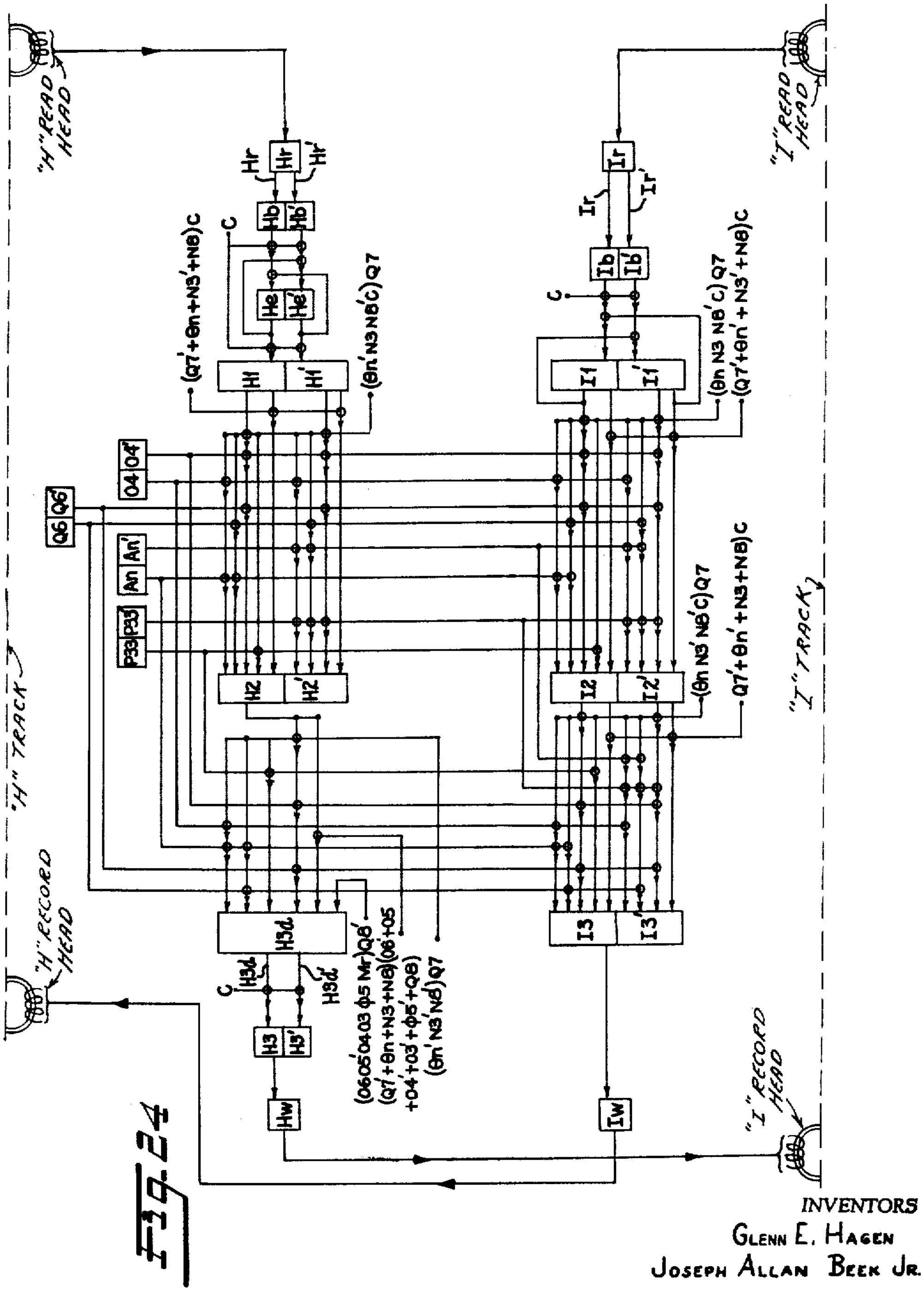
FIGURE 24 is a schematic illustration of the HI recirculation circuitry.
Figure 25:
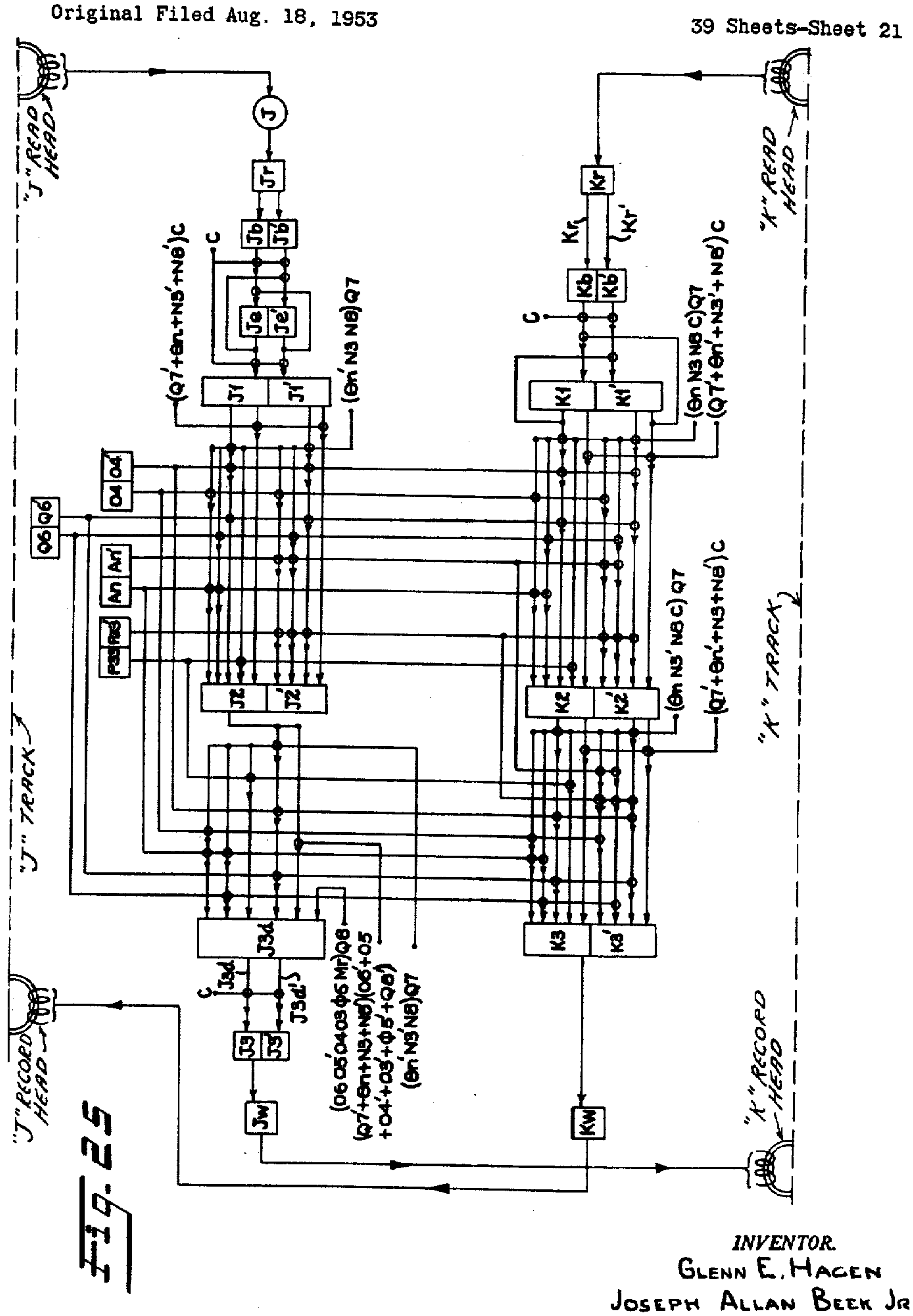
FIGURE 25 is a schematic illustration of the JK recirculation circuitry.

The words in the H, I, J and K lines are being constantly recirculated. Since it may be required to operate on the two words which are in opposite biplex phase, computations are carried out only during the P pulse times; the E pulse times are only used for stepping information from one flip-flop to another. As illustrated in FIGURES 24 and 25, the I and K channels each require only three flip-flops, $\underline{I_1}$, $\underline{I_2}$, $\underline{I_3}$ and $\underline{K_1}$, $\underline{K_2}$, and $\underline{K_3}$. The inputs from the read heads in these channels go directly to the first flip-flops in the chains, $\underline{I_1}$, $\underline{K_1}$, respectively. During a normal recirculation when there is no computation occurring that involves I or K the contents of these lines are merely stepped from the input flip-flops $\underline{I_1}$ and $\underline{K_1}$ to the next flip-flops $\underline{I_2}$ and $\underline{K_2}$ and from there to the output flip-flops $\underline{I_3}$ and $\underline{K_3}$. The contents of $\underline{I_3}$ and $\underline{K_3}$ are constantly being recorded on tracks of the drum through record amplifiers $I_w$ and $K_w$, respectively, which may be of a conventional construction such as shown in FIGURES 2D–1 and 2G.

The H and J recirculating lines are essentially the same as the I and K lines except that H and J are the stations that are used when a channel is copied into or out of a working channel from the main memory in the manner hereinafter described. That is, the driver $\underline{H_{3d}}$ is the input station for the H—I channel when reading in information from the main memory, and $\underline{J_{3d}}$ performs the corresponding function for the J—K channel. One additional flip-flop and the drivers $\underline{H_{3d}}$ and $\underline{J_{3d}}$ are required in the H and J recirculating lines respectively for this reason.

The basic recirculation for the I and K lines are shown in FIGURES 24 and 25, and the logic for the I line is set out below; the logic for K is similar.

$$\underline{I_r}=I$$
$$\underline{I_b}=I_r$$
$$\underline{I_b'}=I_r'$$
$$\underline{I_1}=I_bI_1'C$$
$$\underline{I_1'}=I_b'I_1C$$
$$\underline{I_2}=(Q_7'+\theta_n'+N_3'+N_8)I_1C$$
$$\underline{I_2'}=(Q_7'+\theta_n'+N_3'+N_8)I_1'C$$
$$\underline{I_3}=(Q_7'+\theta_n'+N_3+N_8)I_2C$$
$$\underline{I_3'}=(Q_7'+\theta_n'+N_3+N_8)I_2'C$$

$\underline{I_1}$ is the flip-flop that follows the signal being read from the I read head. The contents of $\underline{I_1}$ will be stepped into $\underline{I_2}$ unmodified provided one of the following signals is present:

(1) $Q_7'$; $Q_7$ is the flip-flop that is on whenever any information in the working channels is to be altered. Therefore, if $Q_7$ is off there will be recirculation only.

(2) $\theta_n'$; If this term is present it means that information is desired from the H or J recirculating line, hence the I and K lines should recirculate normally.

(3) $N_3'$; $N_3'$ appears in this term to cause the unmodified contents of $I_1$ to be stepped into $I_2$ during the P pulses.

(4) $N_8$; If $N_8$ is present it means that the I recirculating line is not included in the address and therefore, should recirculate normally.

The control and operation of flip-flops $\underline{Q_7}$, $\underline{\theta_n}$, $\underline{N_3}$, and $\underline{N_8}$ are described in later portions of this specification, in column 44, line 7 et seq. ($Q_7$; under $Q_7$ flip-flop), column 39, line 67, et seq. ($\theta_n$; under Permanent Memory Recording Control), column 31, line 70 et seq. ($N_3$, $N_8$; under N Register).

The contents of $\underline{I_2}$ will be stepped into $\underline{I_3}$ during straight recirculation under the same conditions as enumerated above with the exception that $N_3$ is required instead of $N_3'$. The reason is that the words are operated on only during P pulse times, hence during the P pulses the digits of one of the biplexed words will always be in $\underline{I_2}$ and the digits of the other word will be $\underline{I_3}$. Now, if $\underline{N_3}$ is on, $N_3$, during the P pulse times, it is possible to modify the contents of $\underline{I_2}$ since $N_3$ appears in the $\underline{I_2}$ logic for all other terms except the one for straight recirculation. However, in the $\underline{I_3}$ logic, $N_3$ appears only in the term concerned with normal recirculation and hence during the P pulses, with $N_3$ on, the contents of $\underline{I_3}$ are not modified. If $\underline{N_3}$ is off, $N_3'$ however, $\underline{I_3}$ can be modified during the P pulse times while $\underline{I_2}$ will merely receive the pulses stepped in from $\underline{I_1}$.

As was mentioned previously an extra flip-flop and a driver are incorporated in the recirculating lines for H and J. The logic for the H recirculating line is presented below. The logic for J is similar.

$$\underline{H_r}=H$$
$$\underline{H_b}=H_r$$
$$\underline{H_b'}=H_r'$$
$$\underline{H_e}=H_e'H_bC$$
$$\underline{H_e'}=H_eH_b'C$$
$$\underline{H_1}=H_eC$$
$$\underline{H_1'}=H_e'C$$
$$\underline{H_2}=(Q_7'+\theta_n+N_3'+N_8)H_1C$$
$$\underline{H_2'}=(Q_7'+\theta_n+N_3'+N_8)H_1'C$$
$$\underline{H_3d}=(Q_7'+\theta_n+N_3+N_8)(O_6'+O_5+O_4'+O_3'+\varphi_5'+Q_8)H_2$$
$$\underline{H_3}=H_{3d}C$$
$$\underline{H_3'}=H_{3d}'C$$

$\underline{H_e}$ is the flip-flop that contains the information being read from the drum. Since $H_1$ is gated to the clock, the contents of $\underline{H_e}$ are stepped into $\underline{H_1}$ on each clock pulse. The contents of $\underline{H_1}$ are stepped into $\underline{H_2}$ in a manner similar to that for I and K. $\underline{H_2}$, however, is used to trigger the $\underline{H_{3d}}$ driver. This unit was used to simplify the logic since the H line is used in the copy channel orders. This is shown by the term $O_6O_5'O_4O_3\varphi_5M_rQ_8'$. The construction and operation of the order register O, the sequence register $\varphi$, flip-flop $\underline{Q_8}$, and the permanent memory read circuitry, from which these signals are derived, is explained in a later portion of this specification. The recirculation logic for $\underline{H_{3d}}$ contains the terms that were explained for I and in addition the term $(O_6'+O_5+O_4'+O_3'+\varphi_5'+Q_8)$. This last term is the opposite of $O_6O_5'O_4O_3\varphi_5M_rQ_8'$ and hence includes the case when $O_6O_5'O_4O_3\varphi_5M_rQ_8'$ is not present. Thus, there will be straight recirculation as long as one or more of the terms $Q_7'$, $\theta_n$, $N_3$ and $N_8$ is present and a copy channel order is not being carried out.

By reference to FIGURE 24, it is apparent that the contents of a main memory channel can be selectively read into the HI channel through $\underline{H_{3d}}$ under control of the input circuit $(O_6O_5'O_4O_3\varphi_5M_r)Q_8'$ where $M_r$ (FIGURE 46) is the output of flip-flop connected to the selected one of the sixty-four main memory track heads, $O_6O_5'O_4O_3$ is the setting of the order register controlling the copying of a permanent memory channel into a working channel, $\varphi_5$ is the setting of the sequence register $\varphi$ at sequence 5, the sequence in which this operation is performed, and $Q_8'$ controls the entry into the HI working channel rather than the JK channel. The manner in which a particular main memory head is selected is described hereinafter, under the section, "Start Routine, Channel Checking and Selection, and No Address System."

From FIGURE 25, it is apparent that a selected permanent memory channel is similarly copied into the JK working channel under control of the input circuit $$(O_6O_5'O_4O_3\varphi_5M_r)Q_8$$

Copying of information from the high speed memory, registers A, B, C and D, into the working channels H—I and H—K is effected selectively from flip-flop $\underline{A_n}$, (see FIGURE 22), through flip-flop $\underline{H_2}$ or driver $\underline{H_{3d}}$ in the H recirculation, flip-flops $\underline{I_2}$ or $\underline{I_3}$ in the I recirculation, flip-flop $\underline{J_2}$ or driver $\underline{J_{3d}}$ in the J recirculation, or through flip-flops $\underline{K_2}$ or $\underline{K_3}$ in the K recirculation, depending on the particular order, sequence, etc. as is explained hereinafter.

FLIP-FLOP REGISTERS

Several other registers are used that are not recirculating registers recorded on the drum but instead the information is stored in a series of flop-flops. Flip-flop registers are used in these instances principally for simplicity and ease of maintenance. The ensuing brief general description of the functioning of these registers is followed by a detailed explanation of their construction and mode of operation.

The ORDER REGISTER or O register (FIGURE 27) consists of a string of six flip-flops (O–1 to O–6 in section U–6 to U–8 of the logic chassis, FIGURE 3). Each order is represented by a six digit binary number. The order register O is made to contain the order that the computer is carrying out at the present time.

The ADDRESS REGISTER or N register (FIGURE 29) (flip-flops N–1 to N–8 in sections Z–6 to Z–9 of the logic chassis, FIGURE 3) is used when carrying out an order which requires a source of or depository for data other than those which are inherent characteristics of the order to store the address in the storage unit of such additional data and by comparison with the storage unit identification numbers previously described to indicate that the address of the desired data has been found. An address refers to either a word or a syllable in one of the two working channels HI or JK or to one of the sixty-four channels of the main memory. Since there are thirty-two words (16 word pairs), each word consisting of four syllables, per channel, in each of the HI and JK working channels, and since there are two working channels HI and JK, a syllable address must be capable of defining any one out of a possible 256 positions in the two working channels. Since 256 is equal to $2^8$, eight flip-flops are used. Flip-flop $\underline{N_3}$ indicates which of the two biplexed words in the word pair is desired and $N_1$ and $N_2$ denote the specified syllable in the word.

The ORDER-ADDRESS REGISTER or L register (FIGURE 26) is used to hold the address in the HI or JK working channels of the next unit of control data, whether it be an order or an address. In other words, it tells the computer where to go to pick up its next unit of control data. It is also an eight flip-flop register, $L_1$ through $L_8$, since it must be able to define the address of any of the 256 syllables in the two working channels. The computer will normally proceed through the addresses in sequence looking for its orders until it comes to a skip order which then causes it to break sequence and take its next order from some other syllable in the working channels.

The SEQUENCE REGISTER or $\phi$ register (FIGURE 28) is a flip-flop register consisting of flip-flops $\underline{\phi_0}$ to $\underline{\phi_7}$. In carrying out any order established on the order register O the computer goes through a varying number of stages depending on the nature of the order in each of which a different set of operations are performed. The flip-flops of the sequence counter $\phi$ control the operation in each of these stages.

*L Register*

The L or order-address register consists of flip-flops $L_1$ through $L_8$. This register counts; therefore, after picking up each order it modifies itself to identify the address of the succeeding order, as is explained hereinafter.

Figure 19:
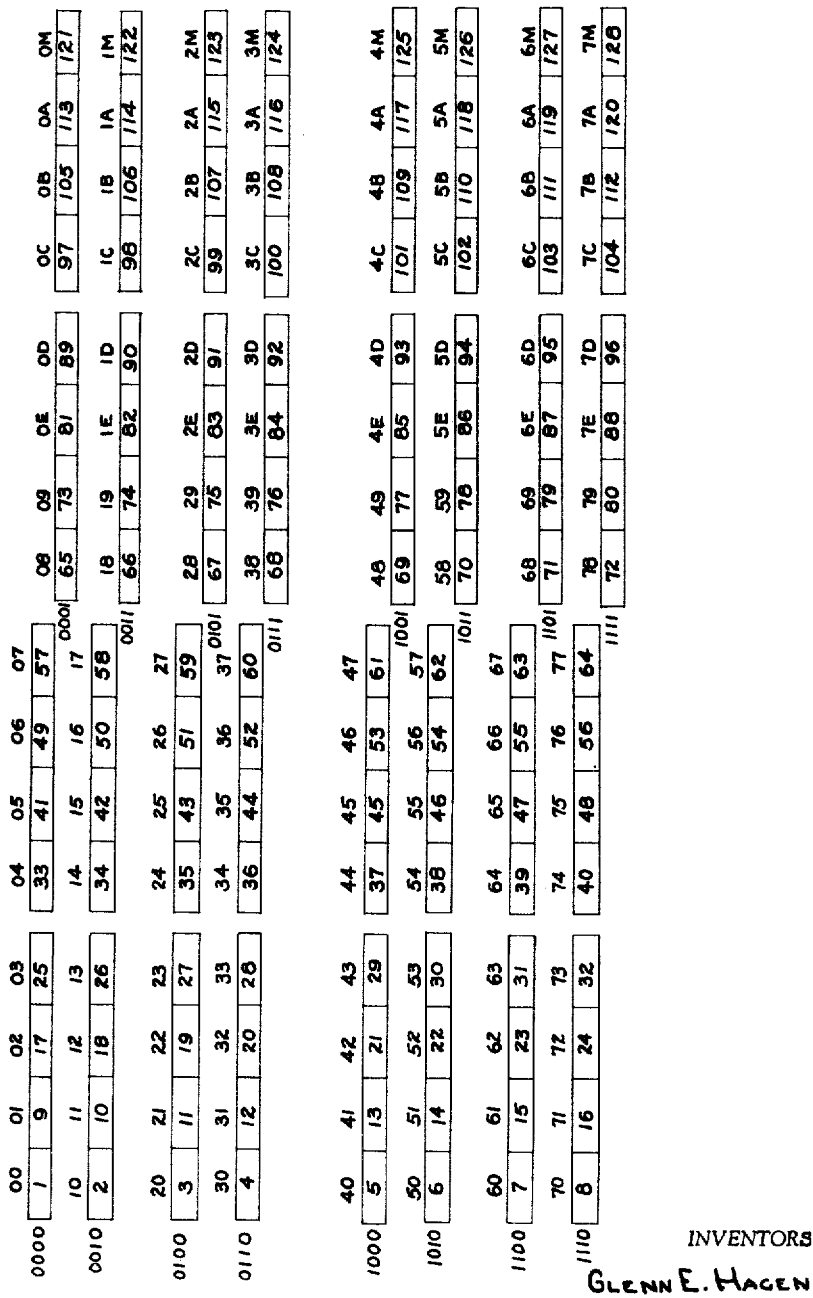
FIGURE 19 is a diagrammatic illustration of the word pair location of the several compartments of intermediate speed storage and their identification address numbers.

A sample coding sheet is shown in FIGURE 19. Each small box represents an eight-digit syllable of one word of a word pair; each group of four boxes represents the four syllables making up a thirty-two digit word of a word pair. Words side by side on the same level in FIGURE 19 are biplexed together and, therefore, have the same word pair number. The digits of the left-hand word of each such pair of aligned words may be found in the E pulses and the right-hand word in P pulses. The binary numbers on the left-hand margins indicate the word pair number and the hexadecimal numbers above the boxes indicate the syllable numbers. Thus, syllables 68 to 6*m* are in word pair 1101. As will be described hereinafter in detail under order-succession, the syllables are used one after another down the left-hand column, then down the 01, 11, 21, 31 . . . column, and so on across the page. The syllable numbers given in FIGURE 19 are based on the assumption that the working channel HI or JK, whichever FIGURE 19 is assumed to depict, is in the master position (a condition which will be explained presently). If it is in the slave, the syllable numbers are 80 (hexadecimal) larger than the syllable numbers shown in FIGURE 19: thus, syllable number 13 shown in FIGURE 19 for the master corresponds to syllable number 93 in the slave; 57 in the master corresponds to b7 in the slave, etc.

FIGURE 60 illustrates diagrammatically the parts of the syllable numbers which identify each of the sixteen words of a given channel, and FIGURE 61 shows the parts of the syllable numbers which identify each of the sixteen syllables within any given pair of word pairs; the complete syllable number consists of the word identifying part followed by the syllable identifying part.

Since the syllable boxes are numbered hexadecimally, flip-flops $L_1$ through $L_4$ (FIGURE 26) denote the right hand digit and flip-flops $L_5$ through $L_8$ denote the left hand digit. Thus if $L_8$, $L_7$, $L_6$, $L_5$, $L_4$, $L_3$, $L_2$, and $L_1$ are, respectively, in the states $L_8'$, $L_7$, $L_6'$, $L_5$, $L_4'$, $L_3'$, $L_2$, $L_1$ indicative of the binary number 01010011, then the next order is going to come from syllable 53.

Since the orders are taken sequentially in the order of the vertically aligned syllables in FIGURE 19, that is 00 to 70, to 71, etc. when it is desired to count to the next order location or address, the left hand digit changes first, i.e., syllable 63 is the syllable that follows 53. This means that $L_5$ is the least significant counting digit. The signal that makes the L register count is $Q_1FC$. (The logic for Q will be given later.) Upon the occurrence of this signal, $\underline{L_5}$ goes on, $L_5$, if it is off, $L_5'$, and off, $L_5'$, if it is on, $\underline{L_5}$.

$$\underline{L_5}=(Q_1FC)L'_5$$
$$\underline{L_5'}=(Q_1FC)L_5$$

Since the L register advances itself, whenever $\underline{L_5}$ goes off, $L_5'$, it is time for $L_6$ to change.

$$\underline{L_6}=(Q_1FC)L_5L_6'$$
$$\underline{L_6'}=(Q_1FC)L_5L_6$$

Likewise, when $\underline{L_5}$ and $\underline{L_6}$ both go off it is time for $\underline{L_7}$ to change.

$$L_7=(Q_1FC)L_5L_6L_7'$$
$$L_7'=(Q_1FC)L_5L_6L_7$$

$L_1$ is next in the chain after $L_7$. This continues through $L_4$.

$$L_1=(Q_1FC)L_5L_6L_7L_1'$$
$$L_1'=(Q_1FC)L_5L_6L_7L_1$$
$$L_2=(Q_1FC)L_5L_6L_7L_1L_2'$$
$$L_2'=(Q_1FC)L_5L_6L_7L_1L_2$$
$$L_3=(Q_1FC)L_5L_6L_7L_1L_2L_3'$$
$$L_3'=(Q_1FC)L_5L_6L_7L_1L_2L_3$$
$$L_4=(Q_1FC)L_5L_6L_7L_1L_2L_3L_4'$$
$$L_4'=(Q_1FC)L_5L_6L_7L_1L_2L_3L_4$$

Control never passes to the slave except by skipping, therefore, $\underline{L_8}$ never changes during counting.

To summarize, the meaning of the different L flip-flops is listed below:

| | | |
|---|---|---|
| $L_1$ | Least significant digit | Indicates syllable number. |
| $L_2$ | Most significant digit | |
| $L_3$ | Word is found in P pulses | Denotes which one of the two biplexed words has been selected. |
| $L_3'$ | Word is found in E pulses | |
| $L_4$ | Least significant digit | Indicates word pair number. |
| $L_5$ | Next to least significant digit | |
| $L_6$ | Next to most significant digit | |
| $L_7$ | Most significant digit | |
| $L_8$ | Master channel in J—K, slave in H—I | Indicates which working has been selected. |
| $L_8'$ | Master channel in H—I, slave in J—K | |

The logic given above for the L register is not complete. The register has three other operations:

(1) When the start switch is thrown, the L register is cleared to all zeros so that the first order obeyed in the start channel will be in syllable 00. This is effected by applying a signal SC to the "off" inputs of all the L flipflops as is shown in FIGURE 26, the signal S being produced by operation of the start switch.

(2) When a skip order is given, the new order address is read into the address register (N register) and then transferred to the L register in a manner which is explained in detail subsequently. The signal that effects the transfer of the contents of the N register to the L register is $O_6O_5O_4'\phi_4F_5'$. It operates through the gating circuits shown in FIGURE 26 and defined by:

$$\underline{L_i}=(O_6O_5O_4'\phi_4F_5')N_iC$$
$$\underline{L_i'}=(O_6O_5O_4'\phi_4F_5')N_i'C$$

(where *i* has all values from 1 to 8).

(3) During the four pulses when the word pair number is being read off the drum as later described, the four word pair number digits of the L register ($L_4$, $L_5$, $L_6$ and $L_7$) are circulated. In this way only one of them, $L_4$, need be compared with the word pair number to identify the designated word. The circuits controlling this action are also shown in FIGURE 26 and defined by:

$$\underline{L_4}=L_5(F_5C)$$
$$\underline{L_4'}=L_5'(F_5C)$$
$$\underline{L_5}=L_6(F_5C)$$
$$\underline{L_5'}=L_6'(F_5C)$$
$$\underline{L_6}=L_7(F_5C)$$
$$\underline{L_6'}=L_7'(F_5C)$$
$$\underline{L_7}=L_4(F_5C)$$
$$\underline{L_7'}=L_4'(F_5C)$$

*O Register*

Figure 35:
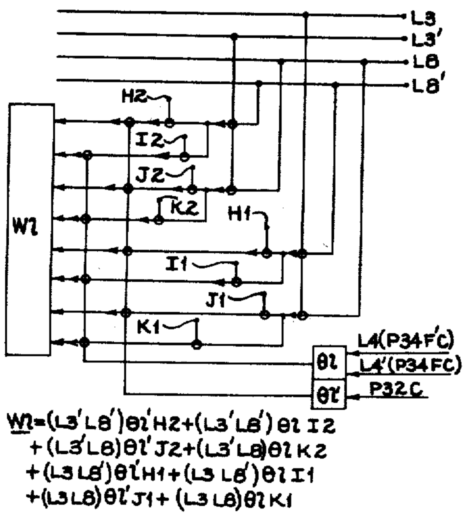
FIGURE 35 illustrates the control circuits for the $\underline{\theta_1}$ flip-flop and the $\underline{W_1}$ driver.

The order register (FIGURE 27) consists of six flip-flops $\underline{O_1}$ through $\underline{O_6}$. The successive digits of an order number are entered into the O register via $\underline{O_6}$ and successively stepped to the next adjacent flip-flop to fill the register. Informaton read off the drum is fed to $O_6$ from the $\underline{W_1}$ driver (FIGURE 35). The first two digits that are stepped into the order register go completely through it and are lost, so the actual order digits are those which occupy the six most significant digits of the syllable. The order register fills during sequence $\phi_0$. The signal to fill the order register O is $Q_1\phi_0C$.

$$\underline{O_{(i)}}=O_{(i+1)}(\phi_0F_0'Q_1C)$$
$$\underline{O_{(i)}'}=O_{(i+1)}'(\phi_0F_0'Q_1C)$$

where *i* goes from 1 to 5.

$$\underline{O_6}=W_1(\phi_0F_0'Q_1C)$$
$$\underline{O_6'}=W_1'(\phi_0F_0'Q_1C)$$

For $O_6$.

When the start switch is thrown, the code for the "read channel into master" order is set in the order register by the signal S so that the start routine stored in channel 5 will be copied into the master. This order code is 101111, corresponding to a setting of O6O5'O4O3O2O1 of the O register.

Figure 28:
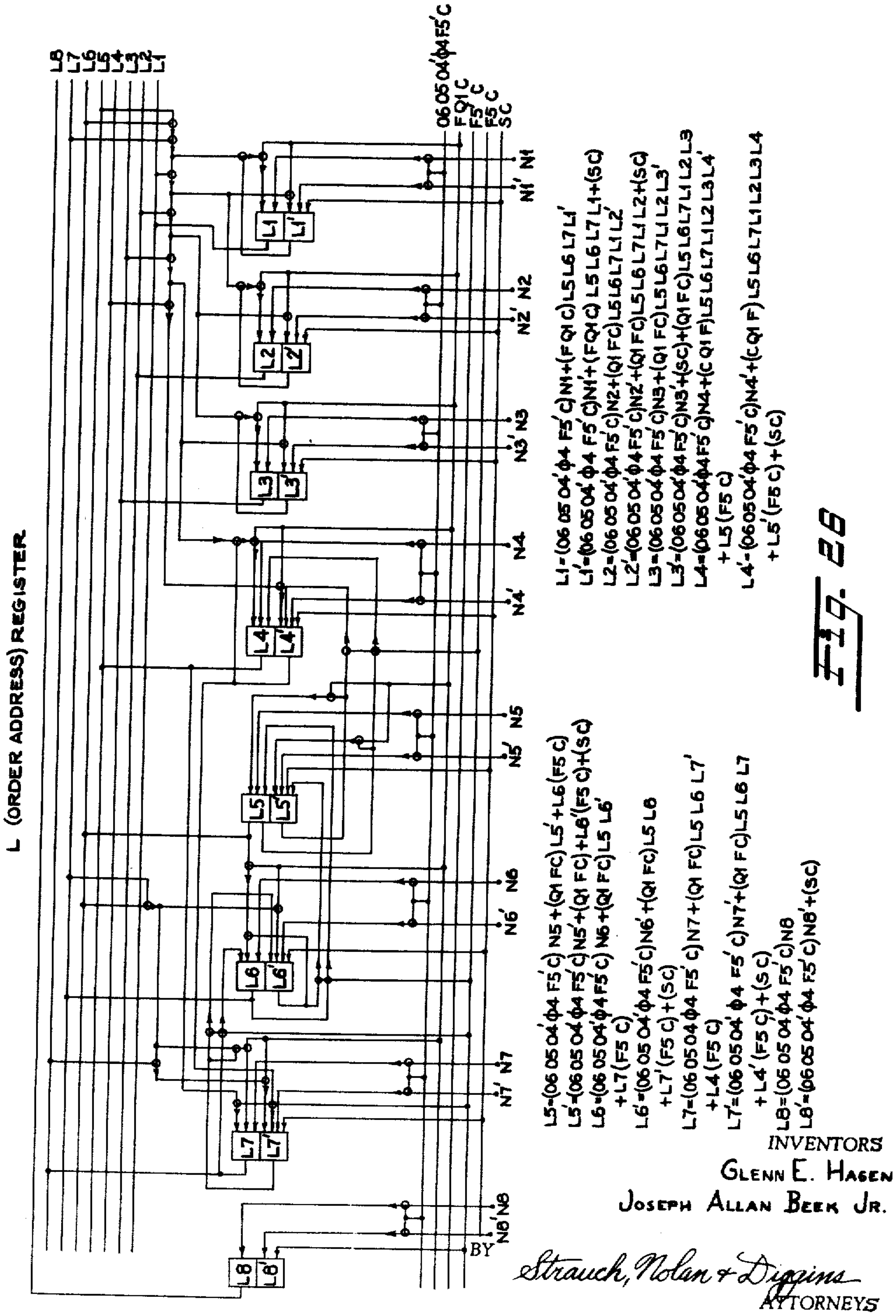
FIGURE 28 is a schematic and symbolic illustration of the $\phi$ or sequence register.
Figures 27, 28:
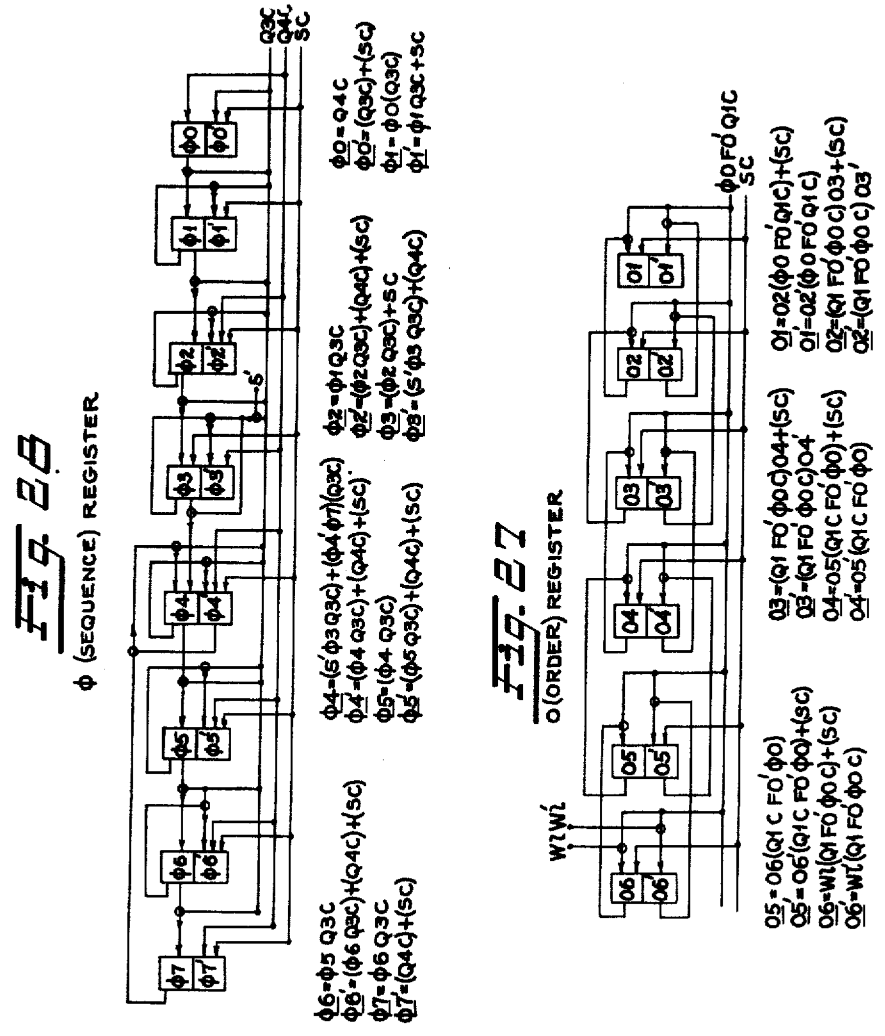
FIGURE 27 is a schematic and symbolic illustration of the circuitry of the O or order register.

The input circuit for this purpose is shown in FIGURE 27 and defined by:

$$\underline{O_{(i)}}=SC$$

For *i*=1, 2, 3, 4, and 6.

$$\underline{O_i'}=SC$$

For *i*=5.

*N Register*

The N or address register (FIGURE 29) consists of flip-flops $\underline{N_1}$ through $\underline{N_8}$ and is utilized to store the eight digits of the address of data required in the performance of the order established in the order register O (FIGURE 27) when data, the address of which is not an inherent characteristic of the order, is required or a depository for data, the address of which is not an inherent characteristic of the order is required. The N register fills from one end—the digits are fed into $\underline{N_8}$ from the drum and stepped along to the other flip-flops. The signal that it is time for this stepping to take place is $Q_1\phi_2C$ which will be explained later. This signal occurs during the eight P pulses of each syllable. The controlling circuits are shown in FIGURE 29, and those controlling all the N flip-flops except $N_8$ are defined by:

$$\underline{N_{(i)}}=N_{(i+1)}(\phi_2F_0'Q_1C)$$
$$\underline{N_{(i)}'}=N_{(i+1)}'(\phi_2F_0'Q_1C)$$

The logic of the input circuit for $\underline{N_8}$ is somewhat more complex. The time when the first seven pulses are being read into the N register is designated by the occurrence of F'. The logic for $\underline{N_8}$ during this time is:

$$\underline{N_8}=W_1(\phi_2F'Q_1C)$$
$$\underline{N_8'}=W_1'(\phi'F'Q_1C)$$

$\underline{W_1}$ (FIGURE 35) is the driver that is used to read off the master working channel, HI or JK, the syllable selected by the L register.

The last digit to be stepped in is the one that is to remain in $\underline{N_8}$ to show whether the desired address is in the HI channel or the JK channel. The address as recorded on the drum only indicates whether the data sought is in the master or slave which may be either HI or JK. If the address data is located in HI, and this data indicates that the numeric data sought is in the slave, it is in JK. If this data indicates that the numeric data sought is in the master channel, it is in HI. If the address data is in JK, the meaning of the master-slave indication is the opposite. If a zero has been recorded, it is read as being in the master; if a one has been recorded it is read as being in the slave. This master vs. slave notation must therefore be translated to show whether the HI or JK channel is the master or the slave. To accomplish this, reference is made to $\underline{L_8}$ as this last digit is read in. If this digit as read is a zero, $W_1'$, signifying master, then $\underline{N_8}$ is set the same as $L_8$.

$$\underline{N_8}=W_1'L_8(\phi_2FQ_1C)$$
$$\underline{N_8'}=W_1'L_8'(\phi_2FQ_1C)$$

If this digit is a one, $W_1$, signifying slave, then $\underline{N_8}$ is set the opposite of $\underline{L_8}$.

$$\underline{N_8}=W_1L_8'(\phi_2FQ_1C)$$
$$\underline{N_8'}=W_1L_8(\phi_2FQ_1C)$$

Of the eight pulses when $Q1\phi2C$ occurs, the last one is only one during which F also occurs, so F is used as the signal to make this comparison with $\underline{L_8}$.

Like the L register, the N register must recirculate four digits during $F_5$ to identify the desired address. Flip-flops $\underline{N_4}$, $\underline{N_5}$, $\underline{N_6}$ and $\underline{N_7}$ contain the digits identifying the word pair number. The recirculating circuits are shown in FIGURE 29 and defined by:

$$\underline{N_4}=N_5(F_5C)$$
$$\underline{N_4'}=N_5'(F_5C)$$
$$\underline{N_5}=N_6(F_5C)$$
$$\underline{N_5'}=N_6'(F_5C)$$
$$\underline{N_6}=N_7(F_5C)$$
$$\underline{N_6'}=N_7'(F_5C)$$
$$\underline{N_7}=N_4(F_5C)$$
$$\underline{N_7'}=N_4'(F_5C)$$

The N register has another function which requires a recirculation. When a search is being made for a channel of the sixty-four main memory channels, the address must be compared with the recorded channel identification digits (FIGURE 17). The circuits which provide this recirculation are also shown in FIGURE 29 and defined by:

$$\underline{N_i}=N(i+1)(\phi_5'V_0'Q_2P_{32}C)$$
$$\underline{N_i'}=N(i+1)'(\phi_5'V_0'Q_2P_{32}C)$$

For $i$ between 1 and 6.

$$\underline{N_7}=N_1(\phi_5'V_0'Q_2P_{32}C)$$
$$\underline{N_7'}=N_1'(\phi_5'V_0'Q_2P_{32}C)$$

For $N_7$.

To simplify timing seven digits are circulated instead of just the six that are required. The signal that causes this stepping in Q2V0'C. One step is made each word time when $\overline{P32}$ goes off. A detailed explanation for this is given under the logic for V0.

This stepping does not occur when the computer is in sequence $\phi 5$. The regular four digit stepping which occurs each word time during F5 continues to take place between each of the individual steps of the seven digit stepping.

The start routine is permanently stored in channel 5, hence when the start switch is thrown, the N register set to $N_8'N_7'N_6'N_5'N_4'N_3'N_2'N_1$ indicative of 00000101 so that the start routine will be copied out of channel 5 of the main memory. This is again accomplished during $V_0F_3'$ as may be seen from the circuitry shown in FIGURE 29 which is defined by:

For $i$=1 and 3. $\underline{N_i}=(SV_0F_3'C)$ $\underline{N_i'}=(SV_0F_3'C)$

For $i$=2, 4, 5, 6, 7 and 8.

*Channel Layout, Order Succession*

As has been indicated, each word is broken down into four parts, each eight digits long, which are called syllables. In operation, the control of the machine will go from one syllable to the next succeeding order-storing syllable in a regular fashion, as explained in reference to the order-address register L (FIGURE 26 and FIGURE 19). When an order which requires an address for its performance is encountered, the syllable which otherwise would have contained the next order is used as the address. The location next after that contains the next order. For example, in reference to FIGURE 19, if box 00 contains an order which requires an address, syllable 10 will be read as an address into the N register rather than as an order into the O register. The next order to be entered into the O register will be from syllable 20. Thus space is used for addresses only when addresses are needed.

The machine cannot carry out one order and pick up another one at the same time, so the normal spacing of orders is every alternate word. This is the reason for taking the orders from the word pairs in the order 0000, 0010, 0100, etc. rather than 0000, 0001, 0010, etc. Frequently, the order can be carried out during the intervening word, so this arrangement makes for maximum speed. When there is an address, it is often possible to arrange the problem so that the address will refer to a word which will be available immediately after the address itself. When this can be done it saves 1/120 of a second each time the order is used.

As has been pointed out, the drawing illustrating the order in which the various syllables are normally selected in a working channel is FIGURE 19. For clarity, words which are biplexed together are shown one beside the other. The numbers in the syllable boxes show in what sequence the syllables normally are selected as order and addresses. The syllables are taken in sequence 00, 10, 20, . . . 70, 01 . . . 71, 02 . . . 72, etc.

The syllable numbers shown in FIGURE 19 define by the first digit (the first three binary bits) a particular pair of word pairs, and by the second digit (the last four binary bits) a particular syllable of those two word pairs. FIGURES 60 and 61 illustrate the physical locations of the words in the channel and the locations of the syllables in the words.

The first time around the drum the first syllables, 00 to 70, of ¼ of the words in the channel are read. The intervening words may be used for storing the numbers that are operated on, so control is maintained in the words already referred to and the ones biplexed with them. Therefore, the next set of syllables used consists of the second syllables 01 to 71 of the words already used. When all four syllables 00 to 70 in these words have been used, control is switched to the words biplexed with them and finally to the alternate words.

*Master and Slave Channels*

The two working channels HI and JK are referred to as the master and the slave. The syllables of any words of these channels may be utilized to store orders or addresses or parts of word length numerical data. The exact manner in which the next succeeding order is located in these working channels has been explained fully hereinbefore under the section entitled "L Register." These designations, master and slave, refer not to *position* but to *condition*. The channel HI or JK, from which the machine will take its next order is the master; the other is the slave. As is explained hereinfater, a "skip" order can cause the machine to take its next order from the slave; in this case, the slave becomes the master and the master becomes the slave, even though each one stays in the same recirculating register it was in previously. In the normal process of going from one order to the next, the machine will not interchange master and slave. When it has used up all the orders in the master, it will simply start over.

The master-slave relationship is useful when a computing routine needs to have access to various pieces of information scattered throughout the memory. In such a situation, the orders are so arranged as to select the channel containing the desired information and copy into the working channel the information designated by the address. Also, no special circuitry is required to place new information in the machine, since channel normally contains a routine which will fill any arbitrarily selected channel with information from input data source. As will be explained, control is usually switched from master to slave when a whole sub-routine is stored in a separate channel—the square-root computing routine, for example. In this case, control is temporarily shifted to the sub-routine, but a skip order is inserted at the end of the sub-routine to transfer control back to the main routine when the sub-routine is completed.

*Limited-Access System*

In the operation of the machine it is very often the case that information is required for a period of time that is contained in only one or two channels. Therefore, two channels are provided that are known as "working channels." A working channel is held in the two recirculating registers, HI and JK. The use of these channels simplifies the construction of the machine greatly because several tubes and a number of other components are required to hold any channel in the memory ready for instant use. By limiting operation to a consideration of only one or two working channels at a time and providing means (hereinafter described) for exchanging data between these working channels and the main memory channels, the size of the computer is materially reduced.

As will be explained in detail, each of the sixty-four main memory channels has only one head associated with it which is used both for reading and recording. Whenever it is desired to copy a channel in or out of the main memory, the appropriate head is selected by a stepping switch and connected to the reading and recording circuitry. This particular channel is then copied into one of the working channels under control of the (O6O5'O4O3ϕ5M*r*)

circuit previously referred to in reference to FIGURES 24 and 25. Computing is done on information from a selected main memory channel only after it is placed in a working channel. If any changes are to be made in the information contained in the channel it is also done at this time in the manner described hereinafter. The changes are made and the channel is copied back into the main memory. If no changes are to be made and it is merely desired to refer to information stored in the channel from time to time, it need not be copied back in. That is, the information in the main memory is copied, not removed. Information in the main memory can however be altered when desired through the circuitry shown in FIGURE 46, the construction and operation of which is described hereinafter. When utilization of the copy of this data which appears in the working channels is complete, it is simply obliterated by the recording operation used when another channel is copied into that working channel. When the operation of copying information in or out of the main memory is completed, the circuitry is disconnected from the stepping switch and from the read-record head as well, as is hereinafter set forth in detail.

This system, which will be referred to as a "limited-access" system, has other advantages. Except when it is definitely desired to make changes in a channel of the main memory, the maintenance of the permanently stored information is never dependent on any electronic circuit. A failure in circuits may produce a wrong answer to the problem at hand—or more likely no answer at all will be produced—but when the failure is repaired the original data will still be properly recorded and the problem can be run again.

*Orders and Addresses—The No-Address System*

There are 41 different orders that the machine is capable of carrying out. An order refers to a basic operation that the computer is required to perform and is stored in the O register (FIGURE 27) during the time when it actually controls the computer's operation. An address which, for control of the computer, is stored in the N register (FIGURE 29), is the location in the computer's memory, main or intermediate, where information is stored. When an instruction is to be given to a computer it is common practice to have this instruction consist of an order for the machine to carry out followed by one or more addresses giving the location of the information needed to carry out the order. To obtain the most efficient utilization of memory space in this computer no particular compartments have been assigned for order and address storage. Addresses are interposed between adjacent order compartments only when required. Since many orders (such as multiply and divide) require no address at all, a great deal of space is saved by having addresses only when they are needed. Thus, if a particular order requires no address, the next succeeding control word syllable will be sensed as the next succeeding order and if the particular order does require an address, the next succeeding control syllable will be sensed as an address and the following syllable as the next order. In this manner, it is not necessary to utilize storage space for an address unless an address actually exists.

Six binary digits are required to define the forty-one possible orders. To some extent individual digits convey certain information about the order. These cases are:

| O register setting | Order No. | |
|---|---|---|
| O6'O5' | 00**** | There is no address, and the order takes only one word time to complete. |
| O6'O5 | 01**** | There is an address, but when it has been located, the operation takes only one word time. |
| O6O5'O4' | 100*** | Orders involving tape. |
| O6O5'O4 | 101*** | Orders involving channel copying. |
| O6O5O4' | 110*** | Skips. |
| O5O3 | *1*1** | |
| O6'O5'O4'O3O2O1 | 000111 | Orders which could turn on the overflow. |
| O3O2'O1 | ***100 | |
| O6O5O4 | 111*** | There is no address, but the order takes several word times. |

NOTE.—* indicates that any desired digit may be present.

A list of the various orders is given below. The binary number again is the code for that order when it is used in the computer. However, since these binary numbers are placed on the tape most easily by hitting certain pairs of characters on the Flexowriter, the orders are usually designated simply by these characters as shown in the table below. A, B, D and E are the words in the recirculating registers. W is the word in the working channel whose position is given by the address. M is a channel number given by the address.

ORDERS WHICH DO NOT REQUIRE AN ADDRESS AND TAKE ONLY ONE WORD TIME TO COMPLETE

| O register | Binary designation | Octal designation | Code | |
|---|---|---|---|---|
| O6'O5'O4' O3'O2'O1' | 000000 | 00 | -- | Blank—do nothing until next order. |
| O6'O5'O4' O3'O2'O1' | 000001 | 01 | −V | Reverse "Z-counter," that is, if $z=1$, make it 0, if $z=0$, make it 1. This $z$-counter is called the "overflow" but that term is not entirely descriptive of its functions. When $z=1$, the overflow is said to be "on," if $z=0$, the overflow is "off." |
| O6'O5'O4' O3'O2O1' | 000010 | 02 | −R | Reverse the sign of A. (If there is a + number in A, make it −; if there is a − number in A, make it +.) |
| O6'O5'O4' O3'O2'O1' | 000011 | 03 | −P | Make A positive. |
| O6'O5'O4' O3O2'O1' | 000100 | 04 | LK | If A is not zero, then make $z=1$. If A is zero, then do nothing to $z$. |
| | 000110 | 06 | LT | Make A an exact copy of D, that is, reprodu e in A the number which is in D. |
| O6'O5'O4' O3O2O1 | 000111 | 07 | LN | If A is negative, then make $z=1$, if A is positive or zero, do nothing to $z$. |
| O6'O5'O4' O3'O2'O1 | 001000 | 10 | ZZ | Exchange the numbers in A and B. |
| O6'O5'O4' O3'O2'O1 | 001001 | 11 | ZV | Exchange the numbers in A and E. |
| O6'O5'O4 O3'O2O1' | 001010 | 12 | ZD | Exchange the numbers in A and D. |
| O6'O5'O4 O3'O2O1 | 001011 | 13 | KA | Complement A, that is replace each one by zero and each zero by one including the sign digit. |
| O6'O5'O4 O3O2'O1' | 001100 | 14 | YK | Reduce the number in A by one, ignoring sign, that is if A is +10, change it to +9, if A is −5, change it to −4. If the new A is zero, then make $z=1$. |
| O6'O5'O4 O3O2'O1 | 001101 | 15 | YH | Clear A, that is, change the number in A to zero. The sign digit is made a 1 to show +0. |
| O6'O5'O4 O3O2O1' | 001110 | 16 | JR | Shift A and B right one digit. That is, shift each digit in A and each digit in B except the sign digits right one position, the last digit to the right in A becomes the first digit to the left in B, the first digit to the left in A becomes zero, the last digit to the right in B is lost. |
| O6'O5'O4 O3O2O1 | 001111 | 17 | JN | Shift A and B left one digit. That is, shift each digit in A and each digit in B except the sign digits left one position, the first digit to the left in B becomes the last digit to the right in A, the first digit to the left in A is lost and the last digit to the right in B becomes zero. |

ORDERS WHICH DO NOT REQUIRE AN ADDRESS AND TAKE SEVERAL WORD TIMES TO COMPLETE

| O register | Binary designation | Octal designation | Code | |
|---|---|---|---|---|
| O6O5O4 O3'O2'O1 | 111001 | 71 | AX | Multiply D by E, store product in B. Actually since the product may be more than 10 decimal digits (32 binary digits), A and B are considered as double length number 64 binary digits long and the answer is stored in the double length position AB. Any number previously in A is considered as a positive number (regardless of its sign) and added to the product EXD. The final answer has the sign of EXD. Mathematically this can be expressed as EXD, EXD+A, EXD. Any number previously in B goes to E and the number originally in E is lost. |
| O6O5O4 O3'O2O1' | 111010 | 72 | AR | Shift A right one syllable (8 binary digits). Digits leaving the right-hand end come back in the left-hand end. The sign digit does not shift. |
| O6O5O4 O3O2'O1' | 111100 | 74 | M— | Divide the double length number in AB by the number in D. Since the quotient will be stored in E, if the quotient is too large to be stored in E, this division will not be performed, but will make $z=1$. The remainder is stored in A and the number previously in E goes to B. |

ORDERS WHICH DO NOT REQUIRE AN ADDRESS AND INVOLVE TAPE

| O register | Binary designation | Octal designation | Code | |
|---|---|---|---|---|
| O6O5'O4 O3'O2'O1 | 100001 | 41 | T4 | Copy from tape into the four farthest positions to the right in A the binary form of the decimal digit punched on tape. |
| O6O5'O4' O3O2O1 | 100111 | 47 | SC | Punch on tape the last six binary digits to the right in A. This order is used to take letters, etc. from the computer. |

ORDERS WHICH ARE FOLLOWED BY THE ADDRESS OF A SYLLABLE AND WHEN THE ADDRESS HAS BEEN LOCATED THE OPERATION TAKES ONLY ONE WORD TIME

| O register | Binary designation | Octal designation | Code | |
|---|---|---|---|---|
| O6'O5O4' O3'O2'O1 | 010001 | 21 | XW | Copy a designated syllable into A. The syllable will occupy the same relative position in A that it occupied in its original word. It is not necessary that A be cleared previously. The other three syllables in A are left unchanged. |
| O6'O5O4' O3'O2O1 | 010011 | 23 | XA | Copy a syllable of A into a specified syllable. The syllable of A which is copied is that syllable of A which occupies the same relative position as the specified syllable. This order is used when entering numbers from the Flexowriter tape (or from the Flexowriter direct) to the computer. |
| O6O5'O4' O3'O2O1' | 100010 | 42 | TS | Read tape for + or − and make the sign of A correspond. |
| O6O5'O4' O3'O2O1 | 100011 | 43 | TC | Copy from tape into the six farthest positions to the right in A the binary form of the typewriter letter or symbol punched on tape. This order is used when storing typewritten material, names, addresses, etc. in the computer. |
| O6O5'O4 O3O2'O1 | 100101 | 45 | S4 | Punch on tape the last four binary digits to the right in A and punch position six on tape. This order is used to take numbers from the computer. |
| O6O5'O4' O3O2O1' | 100110 | 46 | SS | Punch on tape the sign of the number in A. |

ORDERS WHICH ARE FOLLOWED BY THE ADDRESS OF A SYLLABLE AND ARE SKIP ORDERS

| O register | Binary designation | Octal designation | Code | |
|---|---|---|---|---|
| O6O5O4' O3'O2O1' | 110010 | 62 | CS | If $z=1$, take the next order from the specified syllable, otherwise continue in the original list of orders. This leaves $z=0$. |
| O6O5O4' O3'O2O1 | 110011 | 63 | PP | Take the next order from the specified syllable. |

ORDERS WHICH ARE FOLLOWED BY THE ADDRESS OF A WORD AND WHEN IT HAS BEEN LOCATED REQUIRE ONLY ONE WORD TIME

| O register | Binary designation | Octal designation | Code | |
|---|---|---|---|---|
| O6'O5O4' O3O2'O1' | 010000 | 20 | XL | Compare the number in A with the number in the specified word. Leave a one in A whenever there is already a one in A and the corresponding position in the specified word has a one, otherwise, put zero in A. |
| O6'O5O4' O3O2'O1 | 010100 | 24 | W— | Add the number in the specified word to A and change the sign of the sum. Leave answer stored in A. If the sum exceeds the capacity of A, make $z=1$, that is turn on overflow—it is this application which gives the $z$-counter its name. The number in the specified word is not changed. |
| O6'O5O4' O3O2'O1 | 010101 | 25 | WW | Subtract the number in the specified word from A and change the sign of the answer. Leave answer stored in A. If the capacity of A is exceeded, turn on overflow (make $z=1$). |
| O6'O5O4' O3O2O1' | 010110 | 26 | WS | Subtract the number in the specified word from A. Leave answer stored in A. If the capacity of A is exceeded, turn on overflow (make $z=1$). |
| O6'O5O4' O3O2O1 | 010111 | 27 | WA | Add the number in the specified word to A. Leave answer stored in A. If the capacity of A is exceeded, turn on the overflow (make $z=1$). |
| O6'O5O4 O3'O2'O1' | 011000 | 30 | HL | Copy the specified word into A only in those digits in which there is a 1 in D. Leave the rest of A alone. |
| O6'O5O4 O3'O2'O1 | 011001 | 31 | HH | Copy the number in the specified word into A. |
| O6'O5O4 O3'O2O1' | 011010 | 32 | HD | Copy the number in the specified word into D. |
| O6'O5O4 O3O2'O1 | 01101 | 33 | VA | Exchange the numbers in A and the specified word. (Note: All of the orders, followed by a word address, leave the number in the specified word unchanged except, of course, the VA order.) |
| O6'O5O4 O3O2'O1' | 011100 | 34 | UK | Make $z=1$ if the number in A is less than the number in the specified word. |

ORDERS WHICH ARE FOLLOWED BY THE ADDRESS OF A CHANNEL

| O register | Binary designation | Octal designation | Code | |
|---|---|---|---|---|
| O6O5'O4 O3'O2O1' | 101010 | 52 | RS | Copy the instructions and/or numbers which are now in the slave channel into the specified memory channel. |
| O6O5'O4 O3'O2O1 | 101011 | 53 | RM | Copy the instructions and/or numbers which are now in the master channel into the specified memory channel. |
| O6O5'O4 O3O2O1' | 101110 | 56 | QS | Copy the specified channel into the slave channel. |
| O6O5'O4 O3O2O1 | 101111 | 57 | QM | Copy the specified channel into the master channel. |

$\phi$ Register

Figure 31:
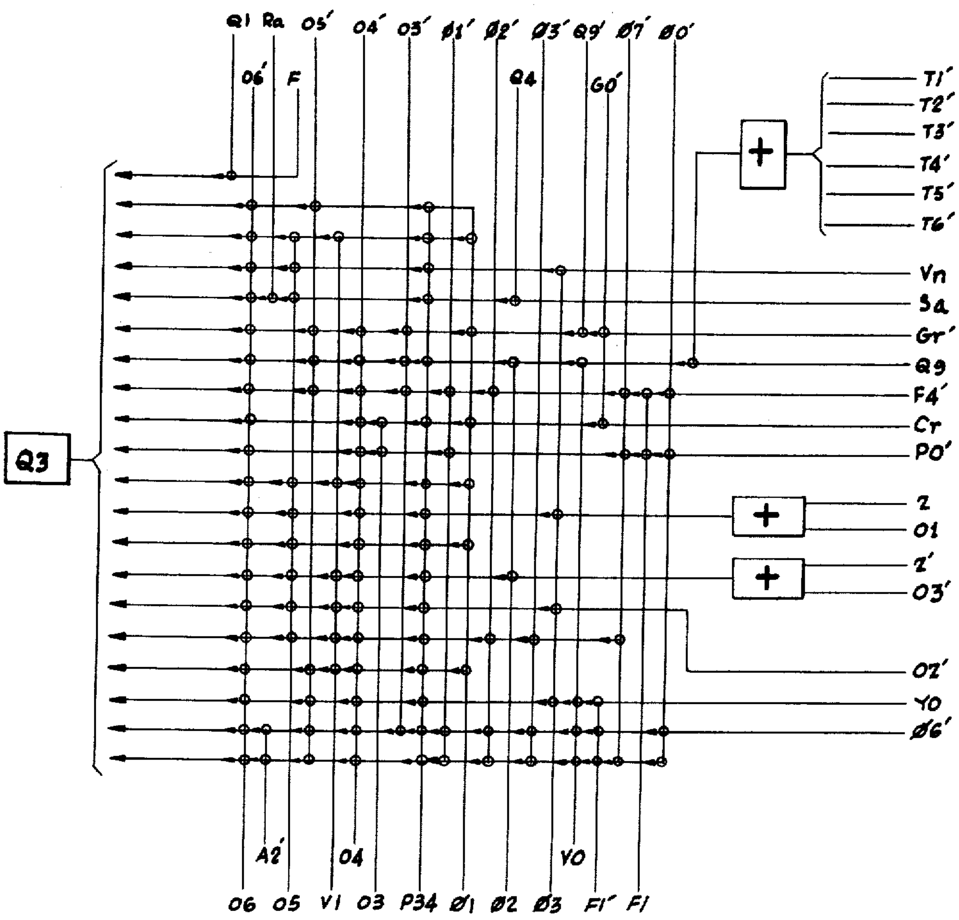
FIGURE 31 illustrates the input circuit to the $\underline{Q_3}$ driver circuit.

The $\phi$ or sequence register (FIGURE 28) consists of the eight flip-flops $\underline{\phi_0}$ to $\underline{\phi_7}$. The sequence register is advanced by the $\underline{Q_3}$ driver (FIGURE 31). The logic for $\underline{Q_3}$ is best explained in conjunction with the detailed explanation of each order and is presented at that point.

Figure 34:
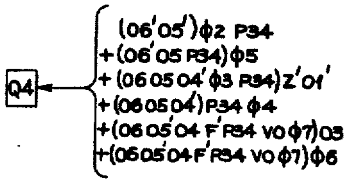
FIGURE 34 illustrates the input circuit to the $\underline{Q_4}$ driver.

The signal that resets the sequence register to $\phi_0$ is $Q_4C$, see FIGURE 34.

$$\underline{\phi_0}=Q_4C$$

$$\underline{\phi_i}'=Q_4C$$

For all $i$ from 2 to 7.

The $\underline{\phi_1}$ flip-flop need not receive a reset signal since it will always already be off when the reset signal is given. The only operation the computer performs in sequence $\phi_0$ is to look for its next order under control of the L register (FIGURE 26) and enter it into the order register O (FIGURE 27). As the last digit of the order is read in, $Q_3$ changes the sequence to $\phi_1$. $\phi_1$ is a sequence in which the computer merely idles.

$$\underline{\phi_0}'=Q_3C$$

$$\underline{\phi_1}=\phi_0Q_3C$$

Upon the occurrence of the next $Q_3C$ pulse the $\phi$ register is stepped to $\phi_2$.

$$\underline{\phi_1}'=\phi_1Q_3C$$

$$\underline{\phi_2}=\phi_1Q_3C$$

Upon the next $Q_3C$ signal the computer goes from $\phi_2$ to $\phi_3$.

$$\underline{\phi_2}'=\phi_2Q_3C$$

$$\underline{\phi_3}=\phi_2Q_3C$$

The computer may be reset from any sequence except $\phi_1$. Hence, if no reset signal is received, the computer will proceed to sequence $\phi_4$ upon receipt of the next $Q_3C$ signal.

$$\underline{\phi_3}'=S'\phi_3Q_3C$$

$$\underline{\phi_4}=S'\phi_3Q_3C$$

The S' is included for the following reason; rather than stop the machine in sequence $\phi_1$, as do the stop switch and alarm flip-flops, the start switch starts the machine in sequence $\phi_3$, which is an idle sequence in the "read channel into master" routine. This is shown in the logic as:

$$\underline{\phi_3}=SC$$

$$\underline{\phi_i}'=SC$$

For $i=0, 1, 2, 4, 5, 6$ and 7.

If the computer were left in sequence $\phi_1$, it would pick up the address after the start switch was released, thereby ignoring the 5 that the start switch put in the address register. Therefore, the S' keeps the computer locked in sequence $\phi_3$ until the start switch has been returned to the "run" position at which time S' is high.

The computer can then leave $\phi_4$ and proceed through the other sequences so long as no reset order is received.

$$\underline{\phi_4}'=\phi_4Q_3C$$

$$\underline{\phi_5}=\phi_4Q_3C$$

$$\underline{\phi_5}'=\phi_5Q_3C$$

$$\underline{\phi_6}=\phi_5Q_3C$$

$$\underline{\phi_6}'=\phi_6Q_3C$$

$$\underline{\phi_7}=\phi_6Q_3C$$

It is possible for the computer to go back to $\phi_4$ from $\phi_7$, if, while at $\phi_7$, the next pulse received is a $Q_3C$ instead of a $Q_4C$ reset pulse. This is shown in the logic for $\phi_4$ as:

$$\underline{\phi_4}=\phi_4'\phi_7Q_3C$$

PERMANENT MEMORY RECORDING CONTROL

The $\underline{M_d}$ driver (FIGURE 30) is a driver that comes on whenever a copy channel order is given. These orders are denoted by $O6O5'O4O3'$. The first term takes into account the condition when the computer is in sequence $\phi_6$ and the second term is for $\phi_7$.

$$\underline{M_d}=O6O5'O4O3'\phi_6\phi_7'+O6O5'O4O3'\phi_7\phi_4'\phi_5'\phi_6'$$

$\underline{M_0}$ is the flip-flop that records zeros in the main memory. Information is recorded in a selected channel of main memory from the $\underline{H_e}$ or $\underline{J_e}$ flip-flops of the HI and JK working channels during an order that requires information to be taken from the working channels and recorded in the main memory. $\underline{Q_8}$ is the driver that determines whether the information is to come from the master or slave.

$$\underline{M_0}=H_e'Q_8'M_dP_{32}'F_5'C+J_e'Q_8M_dP_{32}'F_5'C$$

$$\underline{M_0}'=H_eQ_8'M_dP_{32}'F_5'C+J_eQ_8M_dP_{32}'F_5'C$$

There are also terms that permit setting up the gates at $P_{34}$ so that the sign digit may be copied. These terms are:

$$\underline{M_0}=H_e'Q_8'M_dP_{34}C+J_e'Q_8M_dP_{34}C$$

$$\underline{M_0}'=H_eQ_8'M_dP_{34}C+J_eQ_8M_dP_{34}C$$

The terms:

$$\underline{M_0}=N_1'M_d'P_{33}C+N_1M_dF_5F_2'F_1'C$$

$$\underline{M_0}'=N_1M_dP_{33}C+N_1'M_dF_5F_2'F_1'C$$

are used to copy in the channel identification numbers (FIGURE 17), described previously, from the N register.

There are two terms used to clear out any "ones" that might have been recorded in the check digit positions. These are:

$$\underline{M_0}=M_dP_{32}C+M_dF_5F_2F_1'C$$

Figure 42:
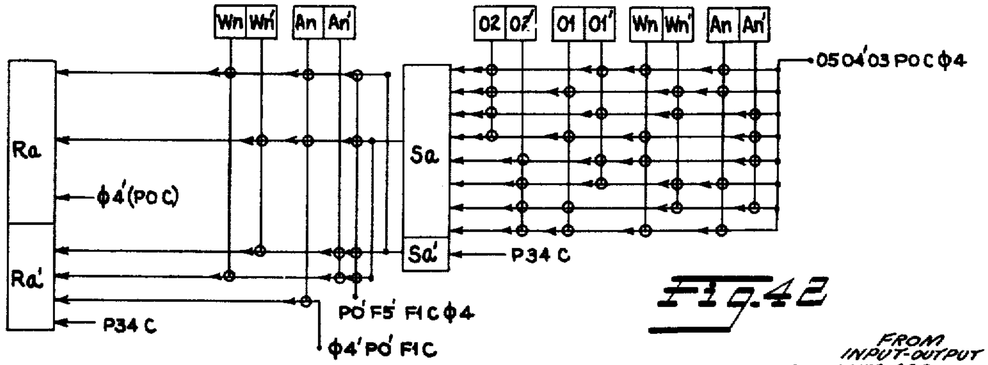
FIGURE 42 illustrates the control circuits for and interrelation of the $\underline{S_a}$ and $\underline{R_a}$ flip-flops.

$\underline{M_1}$ is the flip-flop that records ones in the main memory through $M_1w$ (FIGURE 42). Since, when $\underline{M_0}$ is on, $\underline{M_1}$ must be off and, when $\underline{M_1}$ is on, $\underline{M_0}$ must be off, the logic for $\underline{M_1}$ is the exact opposite of that for $\underline{M_0}$. There is one exception. The term $M_d'C$ appears in both the $\underline{M_0}'$ and $\underline{M_1}'$ logic to turn off the flip-flops when $\underline{M_d}$ is off. To simplify the presentation, only the input circuits from the HI channel have been illustrated in FIGURE 30.

Figure 36:
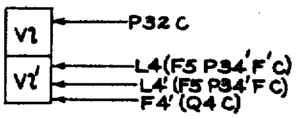
FIGURE 36 illustrates the control circuit for the $\underline{V_1}$ flip-flop.

$V_1$:

$\underline{V_1}$ (FIGURE 36) is used as the comparison flip-flop to show when coincidence is obtained between the word pair number recorded in one-half a working channel and digits $L_4$, $L_5$ and $L_6$. Only three digits are required since eight word pairs are handled by each of the four recopying stations H, I, J and K (FIGURES 24 and 25). Since the word pair digits in the L register are being recirculated once every word time during $F_5'$, comparison is made between $\underline{L_4}$ and $\underline{V_1}$. $\underline{V_1}$ is turned on at the end of $P_{32}$ and goes off at any disagreement during the first three pulses.

$$\underline{V_1}=P_{32}C$$

$$\underline{V_1}'=L_4F'F_5P_{34}'C+L_4'FF_5P_{34}'C$$

$F_5P_{34}'$ takes care of the fact that comparison is made during $E_{33}$, $P_{33}$, and $E_{34}$ but not during $P_{34}$. If there is a one in $\underline{L_4}$ and a zero in $\underline{F}$ then the first term in the expression for $\underline{V_1}'$ will turn off $\underline{V_1}$. If there is a zero in $\underline{L_4}$ and a one in $\underline{F}$ then the second term will supply the off trigger. One other term is added to the $V_1'$ logic input circuit.

$$\underline{V_1}'=F_4'Q_4C$$

This term is used to assure that $\underline{V_1}$ will not be on in the middle of a word if a reset order is given. If $\underline{V_1}$ were on, $V_1$, when the computer reset to sequence $\phi_0$, the computer might interpret this to mean that coincidence has been made and would interpret the digits being read off the drum as the next order.

$\theta_1$:

$\underline{\theta_1}$ (FIGURE 36) is the flip-flop that distinguishes between the two halves of the working channels when searching for an order. If $\underline{\theta_1}$ is on, it means that the order is to be read from either the I or K read head.

The digit in $\underline{L_4}$ is compared with F during $P_{34}$. If the two digits are not alike $\underline{\theta_1}$ will be turned on indicating I or K. $\underline{\theta_1}$ is turned off at $P_{32}$, therefore, if it remains off during $P_{34}$ this specifies the H or J head.

$$\underline{\theta_1}=L_4F'P_{34}C+L_4'FP_{34}C$$
$$\underline{\theta_1}'=P_{32}C$$

Figure 40:
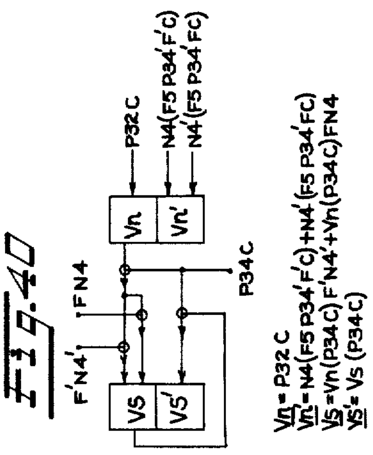
FIGURE 40 illustrates the input control circuits to the $\underline{V_n}$ and $\underline{V_8}$ flip-flops.

$V_n$:

Flip-flop $\underline{V_n}$ (FIGURE 40) performs the same function in conjunction with the N register that $\underline{V_1}$ performs for the L register.

$$\underline{V_n}=P_{32}C$$
$$\underline{V_n}'=N_4F'F_5P_{34}'C+N_4'FF_5P_{34}'C$$

Figure 41:
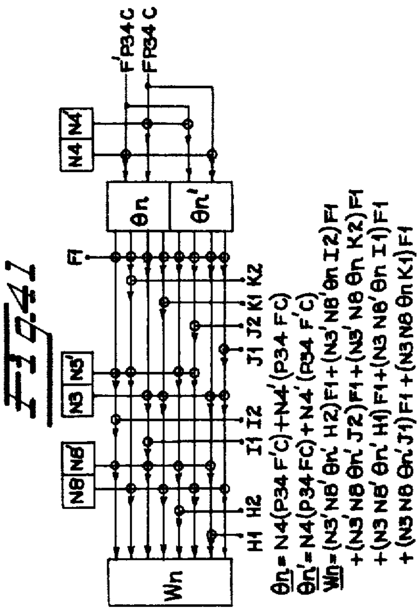
FIGURE 41 illustrates the input circuits to the $\underline{\theta_n}$ flip-flop and the $\underline{W_n}$ driver.

$\theta_n$:

The $\underline{\theta_n}$ flip-flop (FIGURE 41) again performs a function for the N register analogous to that performed by $\underline{\theta_1}$ for the L register.

$$\underline{\theta_n}=N_4F'P_{34}C+N_4'FP_{34}C$$
$$\underline{\theta_n}'=N_4FP_{34}C+N_4'F'P_{34}C$$

The $\underline{\theta_n}'$ logic is slightly different from that of $\underline{\theta_1}'$ since $\underline{\theta_n}$ will be definitely turned off during $P_{34}$ if coincidence is made instead of being turned off at $P_{32}$ and just remaining off as in the case of $\underline{\theta_1}$. This is because the state of $\underline{\theta_n}$ must be definitely established during $F_5$ since it is used elsewhere in the logic.

$V_s$:

$\underline{V_s}$ (FIGURE 40) is the flip-flop that provides a trigger to an oscilloscope when used in displaying the word selected by a scope selector. Since $\underline{V_n}$ comes on at the end of every word time it will not do for the scope trigger because, when displaying a word in the working channel, a trigger is desired only when the word in the address register is about to come under the read head. The logic for $\underline{V_s}$, as shown below, yields an output only when $\underline{V_n}$ is still on at $P_{34}$ indicating coincidence has been established. $\underline{V_s}$ goes off at the end of $P_{34}$.

$$\underline{V_s}=V_nP_{34}CF'N_4'+V_nP_{34}CFN_4$$
$$\underline{V_s}'=V_sP_{34}C$$

$V_0$:

During the search for a particular channel when the seven digits in the N register are recirculating, each digit in N must be compared with one particular digit recorded in the channel. To make sure that each N digit is compared with the correct recorded digit, it is necessary for $Q_2$ to come on and go off only at certain drum orientations. To determine these, flip-flop $V_0$ (FIGURE 21) is always looking for word pair number 0000 to 1000. Hence $V_0$ comes on at $P_{32}$ and if there are zeros in $\underline{F}$ during pulse times $E_{33}$, $P_{33}$ and $E_{34}$, it will remain on throughout the next word.

$$\underline{V_0}=P_{32}C$$
$$\underline{V_0}=F_5P_{34}'FC$$

When $\underline{V_0}$ is on in $P_{34}'$, $\underline{Q_2}$ will start coming on. $\underline{V_0}$ will not be turned off until the next $F_5$ when it will go off at the end of $E_{33}$ since the word pair number following 0000 or 1000 will have a one in the $E_{33}$ pulse time. The N register will then receive only the seven required stepping pulses since $\underline{V_0}$ must be off during the recirculation of the N register.

$W_1$:

$\underline{W_1}$ (FIGURE 35) is a driver that presents the one of eight words in the working channels that has been selected by the L register.

$$\underline{W_1}=(L_3'L_8')\theta_1'H_2+(L_3'L_8')\theta_1I_2+(L_3'L_8)\theta_1'J_2+(L_3'L_8)\theta_1K_2+(L_3L_8')\theta_1'H_1+(L_3L_8')\theta_1I_1+(L_3L_8)\theta_1J_1+(L_3L_8)\theta_1'K_1$$

There are eight word pairs being read off the drum at each of the H, I, J and K stations. $\underline{L_8}$ is the flip-flop that tells whether the master channel is in HI or JK. $L_3$ means that JK is the master. $\underline{\theta_1}$ is the flip-flop that selects J from K or H from I, since $\theta_1$ means I or K and $\theta_1'$ means H or J. $\underline{L_3}$ is the flip-flop that separates the biplexed words. $L_3$ means the word is to be found in the P pulses; $L_3'$ means the word is to be found in the E pulses. Thus $\underline{W_1}$ is constantly presenting one of the four biplexed words from either the H, I, J or K read stations. Which particular word to be presented is determined by the configuration of $\underline{L_4}$, $\underline{L_5}$, $\underline{L_6}$ and $\underline{L_7}$.

$W_n$:

$\underline{W_n}$ (FIGURE 41) is a similar drive to $\underline{W_1}$ except that it presents the word selected by the N register.

$$\underline{W_n}=(N_3'N_8'\theta_n'H_2)F_1+(N_3'N_8'\theta_nI_2)F_1+(N_3'N_8\theta_n'J_2)F_1+(N_3'N_8\theta_nK_2)F_1+(N_3N_8'\theta_n'H_1)F_1+(N_3N_8'\theta_nI_1)F_1+(N_3N_8\theta_n'J_1)F_1+(N_3N_8\theta_nK_1)F_1$$

The $F_1$ terms are incorporated so that $\underline{W_n}$ will be on only every other pulse time. This is done because $\underline{W_n}$ is the driver that is used to present to an oscilloscope the word whose address is in the N register, and it is only desired to view one of the biplexed words. The scope is triggered at the required time by $V_s$.

Figure 37:
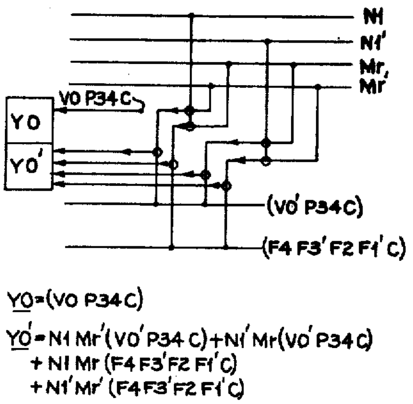
FIGURE 37 illustrates the control circuit for the $\underline{Y_0}$ flip-flop.

$Y_0$:

$\underline{Y_0}$ (FIGURE 37) is the flip-flop that is used to check the main memory against what is in the N register during the search for a channel. It is turned on at the beginning of word pair 0000 or 1000 by the $\underline{V_0}$ flip-flop.

$$\underline{Y_0}=V_0P_{34}C$$

During searching, seven of the N digits will be recirculated through $\underline{N_1}$, so when the right channel has been found $\underline{Y_0}$ will stay on for eight word times. The channel identification number digits in the main memory channels are recorded twice, once as a true number and once as the complement during the following digit time (FIGURE 17). During $P_{34}$, the output from $\underline{N_1}$ is compared with output of the main memory channel read amplifier, $\underline{M_r}$ (FIGURE 46), to determine if the digit that was recorded is the same as the one in $\underline{N_1}$. If it is not then $\underline{Y_0}$ is turned off indicating that the correct channel has not been found.

$$\underline{Y_0}'=N_1M_r'V_0'P_{34}C+N_1'M_rV_0'P_{34}C$$

During the $E_0$ the digit that is the opposite of what was in $P_{34}$ is compared with $N_1'$. This time the two should not be alike, hence, if they are, $\underline{Y_0}$ will be turned off.

$$\underline{Y_0}'=N_1M_rF_4F_3'F_2F_1'C+N_1'M_r'F_4F_3'F_2F_1'C$$

Q1–Q7:

$\underline{Q_3}$ (FIGURE 31) is the driver that is used to advance the sequence counter $\phi$. All $Q_3$ terms have been or will be explained as they occur in the descriptions. This is also true of the terms in $\underline{Q_4}$ (FIGURE 34) since it is used to reset the sequence counter to $\phi_0$. Although all terms will not be described because they are not pertinent to the discussion, the following is the complete input circuitry of $\underline{Q_1}$ through $\underline{Q_7}$.

Q1 flip-flop $$\underline{Q1}=V1(F5'F1'C)\cdot O6'O5)\phi2+(O6O5O4')\phi2 +(O6O5'O4)\phi2-\phi0\cdot(F2'F3')L1L2 -(F4'F3'F2)L1L2-(F2'F3)L1L2'-(F2F3)L1'L2'$$

$$Q1=(F1C)$$

Q2 flip-flop $$\underline{Q2}=(Y1V0P34C)Q2'Dc'Gm'$$

$$\underline{Q2'}=Y0'(Y1V0P34C)Q2+\phi1(P34C)Y1'+Q4C$$

Q3 sequence driver $$\begin{aligned}\underline{Q3}=&Q1F+(O6'O5')\phi1P34+(O6'O5)\phi1(V1P34)\\&+(O6'O5P34)\phi Vn+(O6'O5P34\phi)RaSa\\&+(O6O5'O4'O3')\phi1Q9'G0'Gr'\\&+(O6O5'O4'O3')\phi2(V0P34)Q9(T1'+T2'+T3'\\&\quad+T4'+T5'+T6')\\&+(O6O5'O4'O3')(\phi0'\phi1'\phi2')(F1F4')\phi7'\\&+(O6O4'O3)\phi1P34G0'Cr\\&+(O6O4'O3)(\phi0'\phi1')P0'F1\phi7'\\&+(O6O5O4')\phi1(V1P34)+(O6O5O4'P34\phi3)\\&\quad(Z+O1)\\&+(O6O5O4)\phi1P34+(O6O5O4V1P34)\phi2\\&\quad(Z'+O3')\\&+(O6O5O4V1P34)\phi3O2'+(O6O5O4V1P34)\\&\quad(\phi2'\phi3'\phi7')\\&+(O6O5'O4V1P34)\phi1+(O6O5'O4F'V0P34)Y0\phi3\\&+(O6O5'O4F'V0P34\phi0'\phi1'\phi2'\phi3'A2')O3'\phi6'\\&+(O6O5'O4F'V0P34\phi0'\phi1'\phi2'\phi3'A2')\phi7'\end{aligned}$$

Q4 driver $$\begin{aligned}\underline{Q4}=&(O6'O5')\phi2P34+(O6'O5\phi4P34)Ra'\\&+(O6'O5P34)\phi5+(O6'O5\phi4P34)Sa'\\&+(O6O5'O4')\phi7F1+(O6O5O4'\phi3P34)Z'O1'\\&+(O6O5O4')P34\phi4\\&+(O6O5O4)O3\phi2P34Z\\&+(O6O5O4)\phi7P0\\&+(O6O5O4V1P34)O2\phi3\\&+(O6O5'O4F'P34V0\phi7)O3\\&+(O6O5'O4F'P34V0\phi7)\phi6\end{aligned}$$

Q5 driver $$\begin{aligned}\underline{Q5}=&(O6'O5)(O4'O3')(O2O1')+O6(O4O3'O5O2'O1')\\&+(O6O5)(O4O3')(O2O1)+(O6'O5'O4'O3O1)O2'\\&+(O5O4O3)(O2'O1)+(O6O5'O4')(O2'O1')\\&+(O6O5)(O4'O3')O2'+(O5O4O3)O2\\&+(O6O5'O4)O2'+(O6O5)(O4'O3)\end{aligned}$$

Q6 flip-flop $$\begin{aligned}\underline{Q6}=&(VnF1'F5'C)(F2'F3')N1N2\\&+(VnF1'F5'C)(F4'F2F3')N1'N2\\&+(VnF1'F5'C)(F2'F3)N1N2'\\&+(VnF1'F5'C)(F2F3)N1'N2'\end{aligned}$$

$$\underline{Q6'}=(F1C)$$

Q7 flip-flop $$\underline{Q7}=(O6'O5)(O2O1)O3'\phi4(F1'C)$$

$$\underline{Q7'}=(F1C)$$

Q8:

$\underline{Q_8}$(FIGURE 31) is the driver that is used to separate the master and slave channels. For instance, on the copy channel orders when the slave is being copied into the channel, the order is 101010 and when the master is being copied in, the order is 101011. The only difference is in the least significant digit, or the one that normally appears in $\underline{O_1}$ in the order register. $L_8$ means that the master channel is in JK and the slave is HI. $L_8'$ means that master channel is in HI and the slave is in JK. $\underline{Q_8}$ will be on when a copy channel order involving the master is given and when the master is in JK or when an order involving the slave is given and when the slave is JK.

$$\underline{Q_8}=L_8O_1+L_8'O_1'$$

OVERFLOW ALARM

Figures 38, 39:
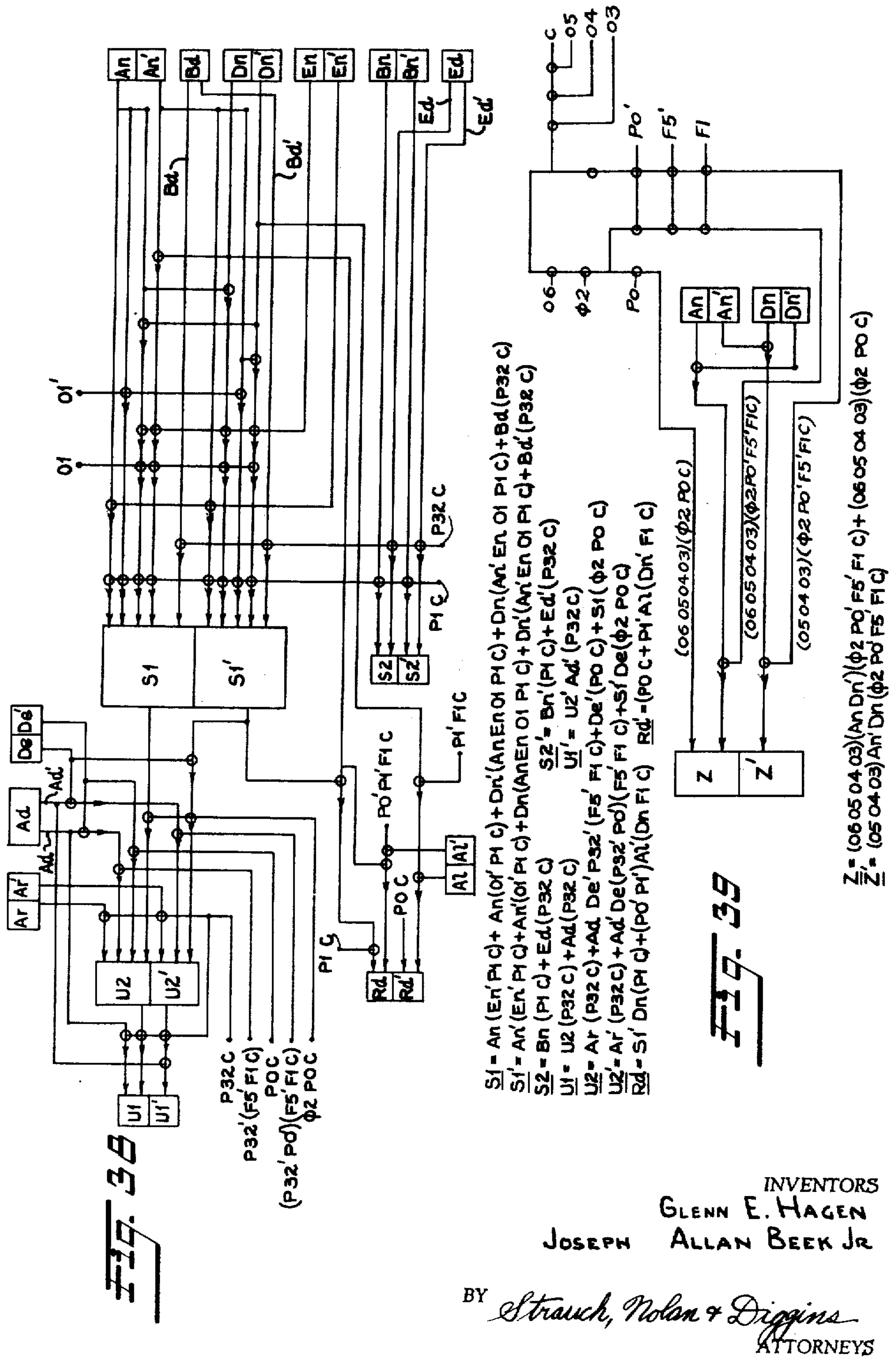
FIGURE 38 illustrates the control circuits for and interrelation of the $\underline{S_1}$, $\underline{S_2}$, $\underline{U_1}$, $\underline{U_2}$, and $\underline{R_d}$ flip-flops.
FIGURE 39 illustrates the input circuit to the $\underline{Z}$ flip-flop.

The overflow alarm flip-flop is the $\underline{Z}$ flip-flop (FIGURE 39). The overflow flip-flop is needed since there are arithmetic operations that may overflow the registers. It is also used for special purposes.

The logic for the overflow alarm relation is contained almost entirely in the $\underline{A_4}$ alarm flip-flop. This flip-flop is turned on if an order is given which could possibly turn on the overflow flip-flop $\underline{Z}$ when it is already on. The overflow flip-flop may be on as the result of an addition or a test. Ordinarily, when a situation occurs where the overflow could be turned on, a conditional skip is coded into the problem. That conditional skip will then be determined by the overflow, and if the overflow is on it will take the proper action which may consist of a scaling down process. If the conditional skip order is omitted on the assumption that the order may never turn on the overflow, but for some reason it does then the overflow alarm will be turned on since the problem will no longer be running as desired.

A list of the orders that can turn on the overflow flip-flop is given in the following Table II.

TABLE II

| Order code | Order | Effect on z | Logic |
|---|---|---|---|
| 000001 | Reverse Overflow | Changes state of z | $\underline{z}=O6'O5'O4'O2'O1\phi2P_0CZ'$<br>$\underline{z'}=O6'O5'O4'O2'O1\phi_2P_0CZ$ |
| 000100 | Check for A=0 | z=0 if A=0, z=1 if A≠0 | $\underline{z}=O6'O5'O4'O3O2'A_n\phi_2P_0'F_5'F_1C$ |
| 001100 | Check for A=1 | z=0 if A=1, z=1 if A≠1 | $\underline{z}=O5'O4O3O2'O1'\phi_2CA_nP_1$<br>$+O5'O4'O3O2'O1'\phi_2CA_nF_4'F_1$ |
| 011100 | Compare A & W | z=0 if \|A\|≧\|W\|,<br>z=1 if \|A\|<\|W\| | $\underline{z}=O6'O4O3\phi4W_nA_n'P_0'F_5'F_1C$<br>$\underline{z'}=O6'O4O3\phi4W_n'A_nP_0'F_5'F_1C$ |
| 010100 | −A+W ("ADD" orders) | z=0 if \|A+W\|≧$2^{32}-1$,<br>z=1 if \|A+W\|≧$2^{32}-1$ | $\underline{z}=O5O4'O3S_aR_a\phi4P_{34}C$ |
| 010101 | W−A ("ADD" orders) | z=0 if \|A−W\|≧$2^{32}-1$,<br>z=1 if \|A−W\|≧$2^{32}-1$ | |
| 010110 | A−W ("ADD" orders) | z=0 if \|W−A\|≧$2^{32}-1$,<br>z=1 if \|W−A\|≧$2^{32}-1$ | |
| 010111 | A+W ("ADD" orders) | z=0 if \|A+W\|≧$2^{32}-1$,<br>z=1 if \|A+W\|≧$2^{32}-1$ | |
| 110010 | Conditional Skip | z is turned off if it was on | $\underline{z'}=O6O5O4'O1'\phi4P_0C$ |
| 111100 | Divide | z=0 if \|A\|<\|D\|,<br>z=1 if \|A\|≧\|D\| | $\underline{z}=O6O5O4O3A_nD_n'\phi2P_0'F_5'F_1C$<br>$+O6O5O4O3\phi_2P_0C$<br>$\underline{z'}=O5O4O3A_n'D_n\phi_2P_0'F_1C$ |
| 000111 | Check sign of A | z=0 if A≧0,<br>z=1 if A<0 | $\underline{z}=O6'O5'O4'O3O1A_n\phi_2P_0'F_5'F_1C$<br>$\underline{z'}=O6'O5'O4'O3O1A_s\phi2P_{34}C$ |

The overflow alarm will be turned on during sequence $\phi_1$ by the following term if the "compare A and W," add or divide orders are given when Z is already on.

$$\underline{A_4}=O3O5Z\phi_1C$$

The orders "reverse overflow," "check for $A=0$" and "check for $A=1$" if, given when Z is on, will turn on the alarm flip-flop by the following term:

$$\underline{A_4}=O3O2'O1Z\phi_1C$$

$A_4$ will come on if Z is on and the order to check the sign of A is given $$\underline{Z}=O6'O5'O4'O3O1Z\phi_1C$$

The alarm flip-flop is turned off by the "restore silence button #4" on the control panel.

The complete input circuits to the $A_4$ alarm flip-flop and the Z flip-flop are as follows:

A4 flip-flop $$\begin{aligned}\underline{A4}=\,&O3O5(Z\phi1C)+O3(O2'O1)(Z\phi1C)\\&+Q5\phi0'C+(O6'O5O4)(\phi5C)\\&+(O6'O5)O3'(\phi5C)+(O6'O5')(\phi3C)\\&+O6'\phi6C+(O6'O5O4'O1'\phi4P0C)Z'\\&+(O6O5O4')(\phi5C)+\phi7(\phi6Q3C)\\&+(\phi0'\phi1'(\phi2'\phi3'\phi7')(\phi5'\phi6')\phi4'C\\&+(O6'O5'O4'O3O1)(Z\phi1C)\end{aligned}$$

$\underline{A4'}$=Restore Silence Button #4

Z flip-flop $$\begin{aligned}\underline{Z}=\,&(O6'O5'O4'O2'O1\phi2P0C)Z'\\&+O6'O5'O4'O2'An)O3(\phi2P0'F5'F1C)\\&+(O5'O4O3O2'O1'\phi2C)An'P1\\&+(O5'O4O3O2'O1'\phi2C)An(F4'F1)\\&+(O6O5O4O3)(AnDn')(\phi2P0'F5'F1C)\\&+(O6O5O4O3)(\phi2P0C)\\&+(O6'O5'O4'O3O1An)(\phi2P0'F5'F1C)\\&+(O6'O4O3)(\phi4WnAn')(P0'F5'F1C)\\&+(O5O4'O3)Sa'Ra\phi4(P34C)\end{aligned}$$

$$\begin{aligned}\underline{Z'}=\,&(O6'O5'O4'O2'O1\phi2P0C)Z\\&+(O5O4O3)An'Dn(\phi2P0'F5'F1C)\\&+(O6'O5'O4'O3O1)\phi2Ae(P34C)\\&+(O6'O4O3)(\phi4Wn'An)(P0'P5'F1C)\\&+(O6O5O4'O1'\phi4P0C)+(SC)\end{aligned}$$

START ROUTINE, CHANNEL CHECKING AND SELECTION, AND NO ADDRESS SYSTEM

In electronic calculators it is necessary, after the power to the machine has been shut off, either as a result of a power failure or intentionally as when it is shut off at the close of business of a preceding day, to provide some means whereby the status of the various component circuits such as flip-flops and the values of numbers stored in non-permanent storage devices can be definitely established prior to the initiation of a computation.

For this purpose in the present computer, a predetermined start routine of control data, including both orders and addresses is recorded in one of the channels of the permanent memory section where it will not be effected by the shut off of the power supply and means are provided whereby, upon the depression of a start switch, this start routine is automatically copied from the permanent memory into that portion of the memory unit from which control of the computer is effected and control of the computer by such start routine is established. It will be appreciated that this start routine can be stored in any predetermined portion of the permanent memory and control established accordingly. In actual practice, it has been found convenient to record the start routine in channel 5 of the permanent memory and the first order of the start routine in syllable 00, in accordance with the hexadecimal notation of FIGURE 19, of that channel.

Specifically, therefore, the depression of the start switch (the depression of the start switch S is indicated by S and its release by S') must so establish the condition of the control registers N, $\phi$, O and L that channel five will be selected from the sixty-four channels of permanent memory, copied into the HI working channel, and the order then recorded in syllable 00 selected and copied from the working channel HI into the O order register to thereby establish the succeeding operations of the machine. The manner in which this is accomplished is illustrated in FIGURE 49.

For this purpose, each of the flip-flops $L_1$ to $L_8$ of the order-address register L is set by a signal SC generated through the start switch S to its "off" condition indicative of a 0, as explained in the preceding description of the L register, so that the L register stands at 0000 0000, or hexadecimally syllable 00. Flip-flops O1, O2, O3, O4, and O6 of the order register O are set to their "on" condition and flip-flop O5 is set to its "off" condition by the signal SC, as explained in the preceding description of the O register. The condition O6 O5' O4 O3 O2 O1 of the order register O is indicative of the number 101111, which is the order which controls the machine to copy a specified channel, as established by the address register N, from the main memory into the HI channel of the intermediate speed portion of the memory drum. The flip-flops of the address register N are set by the signal SVOF3'C to the condition N1,N2'N3N4'N5'N6'N7'N8', as explained in the preceding description of the N register, indicative of the number 00000101, the binary equivalent of the decimal number 5, the number of the channel in which the start routine is recorded.

The sequence register is set by the signal SC to the condition $\phi7'\phi6'\phi5'\phi4'\phi3\phi2'\phi1'\phi0'$ as explained in the previous description of the $\phi$ register, indicative of sequence $\phi3$ which is an idle sequence in the order 101111, copy channel into HI. The sequence register will, as will be more fully explained, stay in this condition so long as the start key S is depressed. When it is released to the condition S', the sequence register will be conditioned to step from sequence $\phi3$ to sequence $\phi4$, i.e., ($\phi7'\phi6'\phi5'\phi4\phi3'\phi2'\phi1'\phi0'$), upon the reception of a control signal $Q_3C$, the timing and function of which wil be explained hereinafter.

*Channel checking and selection.*—Before copying data from a particular permanent storage channel into a working channel, it is necessary to make certain that only data from the desired channel will be obtained. This involves a check and double-check procedure, wherein stored signals indicative of an identification number of a desired channel, and the complement thereof, are compared with an identification number of a storage device to be selected. When identity as to the first signal and complementary relation to the second exists, the identification of the channel from which to copy is complete. If there is neither identity as to the first signal or complementary relation as to the second, the channel identification is incomplete and the data will not be copied out.

The first step which must be taken in establishing control over the computer is to locate the one of the sixty-four channels of permanent storage which contains the start routine. As has been explained in reference to FIGURE 17, the number of each channel is recorded in the E34 and P34 pulses of the successive word pairs of each channel and the number of each channel, a seven binary digit number, is recorded twice in its correct form in the E34 pulse times and twice in complementary form in the P34 pulse times. The signals indicative of these numbers of the channel to which the memory read flip-flop, $M_r$ (FIGURE 46), is connected establish the condition of $M_r$ at pulse times $P_{34}$ and E0 in accordance with the sense of recorded signal at pulse times $E_{34}$ and $P_{34}$ respectively, in reference to the timing chart, FIGURE 20. Thus, if a 1 is recorded, $M_r$ will be "on"

at $P_{34}$ and "off" at E0, and if a 0 is recorded, $\underline{M_r}$ will be "off" at $P_{34}$ and "on" at E0, to thereby indicate the true and complementary values of the recorded digit. The condition of the flip-flop $\underline{M_r}$ is compared with the condition of the $\underline{N_1}$ flip-flop by the $\underline{Y0}$ (FIGURE 37) comparison flip-flop under control of the circuit (F4F3'F2F1'C) to determine identity of the digits during $E_0$ pulse time and, under control of the signal $V0'P_{34}C$, to assume lack of identity between $N_1$ and the $P_{34}$ pulse time signal, it being remembered that digits 1 through 7 of the value initially established in the N register are being circulated in the N register (FIGURE 29) by the signal $\phi 5'V0'Q_2P_{32}C$ which, on each occurrence, causes each of the flip-flops $\underline{N_1}$ to $\underline{N_6}$ of the chain to assume the condition of the next succeedingly higher order flip-flop and $\underline{N_7}$ to assume the condition of $\underline{N_1}$. The circulation of the value in the N register is so timed in relation to the sensing of the recorded number on the drum that corresponding denominations of the two numbers being compared appear simultaneously at $\underline{N_1}$ and $\underline{M_r}$, the stepping of the N register occurring at $\underline{P_{32}}C$ of each word pair except the word pair during each half drum revolution which occurs immediately after the word pair in which 000 appears at pulse times $E_{33}$, $P_{33}$ and $E_{34}$ of the F channel to allow $\underline{Y0}$ to remain on.

Figure 18:
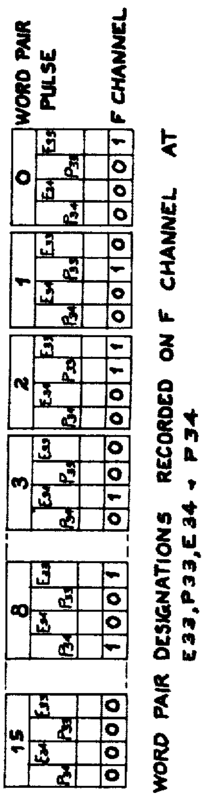
FIGURE 18 is a diagrammatic representation of the manner in which the word pair identification digits are recorded in the F channel.

As is apparent from the diagram of $\underline{Y0}$, $\underline{Y0}$ is turned "on," Y0, at $P_{34}$ of word pairs zero and eight (see FIGURES 18 and 21). $\underline{Y0}$ will be turned to its Y0' condition if the conditions of $\underline{N_1}$ and $\underline{M_r}$ are $N_1$ and $M_r'$ or $N_1'$ and $M_r$ at $P_{34}C$ under control of the circuit $V0'P_{34}C$. If during E0 of any word pair, either the condition $N_1'$ and $M_r'$ or $N_1$ and $M_r$ occurs $\underline{Y0}$ will be turned off under control of the $(F_4F_3'F_2F_1'C)$ circuit. $\underline{N_1}$ is compared with the recorded $E_{34}$ signal during $\underline{P_{34}}$ during word pairs 1 to 7 and 9 to 15 and the recorded $P_{34}$ pulse during E0. If, during this digit-by-digit comparison, the digit in $\underline{N_1}$ fails to be identical with the corresponding digit in $\underline{E_{34}}$, the true channel designation, or the opposite of the digit in $P_{34}$, the complementary channel designation, $\underline{Y0}$ will be turned to its Y0' condition.

If no such failure occurs, $\underline{Y0}$ remains in its Y0 condition after being turned "on" at $P_{34}$ of the zero or eighth word pair. If $\underline{Y0}$ remains in Y0, the channel to channel advancement of the stepping switch $\underline{SS}$ (FIGURES 46 and 49) will be terminated under control of the one-shots $\underline{G_m}$ and $\underline{D_c}$ which through a relay, not shown, controls the actuation of the motor magnet of stepping switch $\underline{SS}$ (see FIGURE 43). If $\underline{Y0}$ is shifted to Y0', the stepping switch will continue to advance to the next channel and the comparison with $\underline{N_1}$ will be repeated until the correct channel is reached.

Thus, with the N register set to the value 5 as hereinbefore described the stepping switch $\underline{SS}$ will continue to advance until channel 5 is found when $\underline{Y0}$ will remain in Y0 and the advancement of the stepping switch be terminated as a result of lack of activation of the input circuit to one-shot $\underline{G_m}$ (FIGURE 43).

Once the correct channel has been located in this manner, the calculator must be conditioned to copy the data recorded in channel 5 into the HI channel. The recording of data in the HI channel is under the immediate control of the $\underline{H_3}$ flip-flop (FIGURES 24 and 49). If $\underline{H_3}$ is in $H_3$, a 1 is recorded; if in $H_3'$, a 0 is recorded. $\underline{H_3}$ follows the condition of the $\underline{H_{3d}}$ driver circuit as is apparent from its input, $H_3=H_{3d}C, H_3'=H_{3d}'C$.

Referring to the input signals to $\underline{H_{3d}}$ (FIGURE 24), it will be noted from the input circuit $$(O6O5'O4O3\phi 5M_r)Q_8'$$

that with flip-flops $\underline{O6}$, $\underline{O5}$, $\underline{O4}$ and $\underline{O3}$ of the order register set to O6O5'O4O3 as is effected by the depression of the start switch $\underline{S}$ $\underline{H_{3d}}$ will reproduce the signal from $\underline{M_r}$ during sequence 5 ($\phi 5$) so long as $\underline{Q_8}$ remains at $Q_8'$ which it will so long as $\underline{L_8}$ and $\underline{O_1}$ are neither both on $(L_8O_1)$ or both off $(L_8O_1')$. The start switch $\underline{S}$ set $\underline{L_8}$ to $L_8'$ and $\underline{O_1}$ to $O_1$ so $\underline{Q_8}$ is off. With the exception of $\phi 5$ all circuits are now set up to copy channel 5 into the HI channel.

It will be remembered that the depression of the start switch $\underline{S}$ placed the sequence register in sequence $\phi 3$, $(\phi 7'\phi 6'\phi 5'\phi 4'\phi 3\phi 2'\phi 1'\phi 0)$ and that the release of start switch S' conditioned the sequence register $\phi$ to step to $\phi 4$ upon the receipt of the next $Q_3C$ signal.

Among the several input signals to $\underline{Q_3}$ is the signal $(O6O5'O4F'V0P_{34})Y0\phi 3$. When $\underline{Y0}$ has been allowed to remain on as a result of the location of channel 5, and with the order register at O6O5'O4, and the sequence register at $\phi 3$, a $Q_3$ signal will be produced at $P_{34}$ pulse time of the next occurring zero word pair time (F'V0). This $Q_3$ signal will, when combined with a C signal to form $Q_3C$, effect advancement of the sequence register to $\phi 4$ (FIGURE 28). Sequence 4 is an idling sequence for the initiation of operation. Upon the occurrence of the next $Q_3C$ signal, the sequence register will step from $\phi 4$ to $\phi 5$.

The input signal to $\underline{Q_3}$ which produces the next $Q_3C$ signal is $(O6O5'O4F'V0P_{34})\phi 0'\phi 1'\phi 2'\phi 3'\phi 7'$. With the order register at O6O5'O4, as it is, and the sequence register at $\phi 4$, a $Q_3$ output will occur during $P_{34}$ of the zero word pair time (F'V0) following that in which the $\phi$ register stepped from $\phi 3$ to $\phi 4$, or one drum revolution later.

With the sequence register now at $\phi 5$, the $$(O6O5'O4O3\phi 5M_r)Q_8'$$

circuit to $\underline{H_{3d}}$ is effective to cause $\underline{H_{3d}}$ and $\underline{H_3}$ to reproduce the condition of $\underline{M_r}$ and thereby copy into the HI channel the data recorded in channel 5 of the main memory. The copying of the channel takes one complete revolution of the memory drum. At the completion of that revolution, a second $Q_3$ signal will be produced as a result of the $(O6O5'O4F'V0P_{34})\phi 0'\phi 1'\phi 2'\phi 3'\phi 7'$ signal to advance the sequence register to $\phi 6$. The same signal will advance it to $\phi 7$ at the end of the next drum revolution. The sequence register will be reset to $\phi 0$ as a result of the $(O6O5O4F'P_{34}V0\phi 7)$ O3 signal turning on $\underline{Q_4}$ (FIGURE 34) to produce the $Q_4C$ signal which turns $\underline{\phi 0}$ to $\phi 0$ and turns off flip-flops $\underline{\phi 2}$ to $\underline{\phi 7}$ of the $\phi$ register (FIGURE 28).

With the channel 5 data copied in the HI channel, to complete the establishment of control over the condition of the computer, it is necessary to locate the first order of the start routine and copy this order into the O register. It will be recalled that the first order of the start routine was recorded in syllable 00 (hexadecimally in accordance with FIGURE 19) and that the L (order address) register now contains this address as a result of having been set to all zeros upon depressing the start switch S.

During $\phi 0$, a comparison is made between the order-address as set up in the L register (FIGURE 26) and the word and syllable numbers and, when the correct word and syllable is reached, the data recorded in that word and syllable is read into the order register through $\underline{O_6}$.

The data recorded in the H portion of the $\underline{HI}$ channel is sensed by the read head of the H channel, which controls the condition of the $\underline{H_6}$ flip-flop (FIGURE 25) in accordance therewith. Thus, if a zero is sensed by the read head, $\underline{H_e}$ is in condition $H_e'$; if a one is sensed, $\underline{H_e}$ is in condition $H_e$. This condition of $\underline{H_e}$ exists in $\underline{H_1}$ during the next P pulse under control of the circuits $H_eC$ and $H_e'C$ controlling the inputs to $\underline{H_1}$. The condition of $\underline{H_1}$ flip-flop exists in $\underline{H_2}$ during the next P pulse under control of the circuits $\underline{H_2}=(Q_7'+\theta_n+N_3'+N_8)H_1C$ and $\underline{H_2}'=(Q_7'+\theta_n+N_3'+N_8)H_1C$, the $Q_7$ being the controlling diode connection in each of these equations.

It will be recalled that the entry of data into the O register (FIGURE 27) is effected by initial entry into $\underline{O_6}$ and sequentially stepping the value of $\underline{O_6}$ and the other flip-flops to the next succeeding lower order flip-flop under control of a signal $\phi 0F0'Q_1C$. The signal to $\underline{O_6}$ which effects entry into $\underline{O_6}$ is $W_1(Q_1F0'\phi 0C)$.

Figure 33:
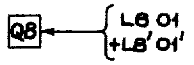
FIGURE 33 illustrates the input circuit to the $\underline{Q_8}$ driver.

Referring to the input signals to $\underline{W_1}$ (FIGURE 33) it will be noted that the $\underline{W_1}$ driver will reproduce the output signal from $\underline{H_2}$ so long as the condition $(L_3'L_8')\theta_1'$ is maintained, the controlling circuit being $$\underline{W_1}=(L_3'L_8')\theta_1'H_2$$

$\underline{\theta_1}$ is turned off at $P_{32}C$ of each word pair and will be turned on at $P_{34}C$ if either the condition $L_4F'$ or $L_4'F$ exists at that time. $\underline{L_4}$, it will be remembered by reference to FIGURE 26, will at $P_{34}$ time contain the digit which originally appeared in $\underline{L_7}$ before the circulation $\underline{L_7}$–$\underline{L_6}$–$\underline{L_5}$–$L_4$ was initiated during $\underline{F_5}$ under control of the C signal. Thus, $\underline{L_7}$ having been turned to the $L_7'$ condition by the start signal, $\underline{L_4}$ will be in condition $L_4'$ during $P_{34}$ of each word time, $\underline{\theta_1}$ will be in its $\theta_1'$ condition for all word pairs having a zero recorded in the $P_{34}$ position of the F channel on the drum due to the lack of coincidence between $L_4'$ and F at $P_{34}$ to turn $\underline{\theta_1}$ to $\theta_1$. With $\underline{L_3}$ and $\underline{L_8}$ in their $L_3'$ and $L_8$ conditions, respectively, the output of $\underline{H_2}$ will appear at the output of $\underline{W_1}$ for these word pairs, that is word pairs zero to seven.

Figure 32:
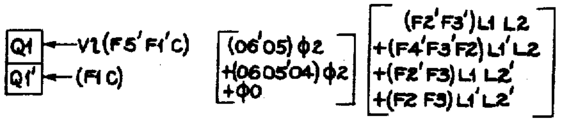
FIGURE 32 illustrates the input circuit to the $\underline{Q_1}$ flip-flop.

As is apparent from FIGURE 27, this output of $\underline{W_1}$ will be transmitted to $\underline{O_6}$ only when $\underline{Q_1}$ is in the $Q_1$ condition. Referring to FIGURE 32, $\underline{Q_1}$ will be in its $Q_1$ condition when the signal $$V_1(F5'F1'C)[(\phi 0)][(F2F3)L1'L2']$$

appears at its "on" input.

$\underline{V_1}$ (FIGURE 36) is the flip-flop which compares the digits originally set up in $\underline{L_6}$, $\underline{L_5}$, and $\underline{L_4}$ with the signals recorded in the F channel at $E_{33}$, $P_{33}$ and $E_{34}$ of each word pair, the digit originally in $\underline{L_4}$ appearing at the output of $\underline{L_4}$ during $E_{33}$, the digit originally in $\underline{L_5}$ appearing at the output of $\underline{L_4}$ during $P_{33}$, and the digit originally in $\underline{L_6}$ appearing at the output of $\underline{L_4}$ during $E_{34}$. $\underline{V_1}$ is turned on at $P_{32}C$. So long as the signal at the output of $\underline{L_4}$ is in agreement with the $\underline{F}$ signal, $\underline{V_1}$ will remain on. If any of the three digits compared is in disagreement, $\underline{V_1}$ will be turned to the $\underline{V_1}'$ condition as is indicated by the input term $V_1'=L_4(F_5P_{34}'F'C)+L_4'(F_5P_{34}'FC)$. It is thus seen that the $\theta_n$ term appearing in the control of $\underline{W_1}$ and the $V_1$ term appearing in the control of $\underline{Q_1}$ combine to define the correct word pair number as set up in $\underline{L_7}$, $\underline{L_6}$, $\underline{L_5}$, and $\underline{L_4}$.

Flip-flops $\underline{L_1}$ and $\underline{L_2}$ are the syllables of the order-address and for syllable zero, they are in the $L_1'$ and $L_2'$ conditions. The coincidence of $F_2$ and $F_3$ define syllable zero as is most readily seen by reference to the timing chart, FIGURE 20. The circuit $(F_2F_3L_1'L_2)$ controls the input to $\underline{Q_1}$ (FIGURE 32).

From the foregoing it is apparent that $\underline{Q_1}$ will be in its $Q_1$ condition during $\phi 0$ for the zero syllable of all word pairs on which the three least significant digits are zero, that is during word pair 0000 and 1000.

When this $Q_1$ signal is combined during $\phi 0$ with the $W_1$ signal, which, as pointed out above, occurs only during those word pairs having a zero in the most significant digit with the $L_8'L_4'L_3'$ condition prevailing in the input term $W_1(Q_1F_0'\phi 0C)$ to $\underline{O6}$, it is apparent that, with the L register set to all zeroes, the output of $\underline{H_e}$ is transmitted to $\underline{O6}$ only for the zero syllable of word pair 0000.

Returning to FIGURE 27, it is apparent that, while the $\phi 0F_0'Q_1$ condition is maintained, each successive C signal is effective to step the first condition established in $\underline{O6}$ by $W_1$ and $W_1'$ to a succeedingly lower denominational order of the O register until all eight digits of the order have been stepped into the O register. The two least significant digits are stepped through the O register and ultimately lost as they are not used.

The order recorded in syllable zero of word pair 0000 of the start routine which now appears in the HI channel is HD, "copy the number in the specified word into the D register." This order appears in binary form as 011010 and establishes the O register in the condition O6'O5O4O3'O2O1' when it is read in as described above.

As has been described hereinbefore, an order may require an address of data before it can be performed or it may not require an address of data; that is all addresses of the data involved in the performance of the order may or may not be an inherent characteristic of the order.

If th order is one which requires an address, the next number which would normally be read as an order must be read as an address and established in the N (address) register. As has been explained hereinbefore, having started with an order in the zero syllable of word pair 00, the next order would normally appear in the zero syllable of word pair 10.

Since this order address expressed in hexadecimal form is 10 (FIGURE 19), this will appear as 0001 0000 and is represented in the L register by the condition $$L_8'L_7'L_6'L_5L_4'L_3'L_2'L_1'$$

When the F pulse occurred at $P_{32}$ at the end of syllable zero of word pair 0000 indicating completion of transfer of the order into the O register, the sequence register was advanced to condition $\phi_1$. That F pulse combined with the $Q_1$ condition of $\underline{Q_1}$ to produce through the circuit $Q_1F$ a $Q_3$ condition of $\underline{Q_3}$ (FIGURE 31) which at the next C signal combined with the then existing $\phi_0$ condition through the circuit $\phi_0(Q_3C)$, to shift $\underline{\phi_1}$ to its $\phi_1$ condition (FIGURE 28).

This same $FQ_1C$ signal is effective through the circuit $(Q_1FC)L_5'$ at the input of $\underline{L_5}$ to shift $\underline{L_5}$ to the $L_5$ condition to establish 0001 0000 as the address of the next control data. The address of the first order in syllable 00 of word pair 0000 was one which required an address for its performance.

If syllable 10 is to be read as an address, the sequence register (FIGURE 28) must be turned to condition $\phi_2$ during which time syllable 10 will be read into the N register through $\underline{N_9}$.

As has been pointed out, those orders which do require an address for their performance are distinguished by their three most significant digits. If an order is in one of the following forms:

01****
101***
110*** an address is required. These three possible forms of the three most significant digits. If an order is in one of the dicated respectively by the conditions O6'O5, O6O5'O4 and O6O5O4' of the order register. The order register, it will be recalled, is now standing at O6'O5O4O3'O2O1' as a result of the reading in of the first order of the start routine from syllable 00 of word pair 0000. The condition 01**** therefore exists and an address is required.

It will be recalled that at the completion of the entry of order number into the order register O, the sequence register was stepped from $\phi_0$ to $\phi_1$. Since the O register is now in an O6'O5 condition, the order in the order register does require an address and the sequence register will be stepped to $\phi_2$. The input circuits to $\underline{\phi_1}'$ and $\underline{\phi_2}$ which effect this are both in the form $\phi_1Q_3C$.

$\underline{Q_3}$ will be turned on through the circuit $$(O6'O5)\phi_1(V_1P_{34}).$$

$\underline{V_1}$, it will be recalled, is turned on at $P_{32}C$ time of each word pair and will remain on for each word pair in which the three least significant digits of the word pair identification number appearing at $E_{33}$, $P_{33}$, and $E_{34}$ are identical with the values in $\underline{L_6}$, $\underline{L_5}$ and $\underline{L_4}$ before the $L_7$–$L_6$–$L_5$–$L_4$ circulation is initiated. Since the L register was stepped $L_8'L_7'L_6'L_5L_4'L_3'L_2'L_1'$ indicative of syllable zero of word pair 0010 $\underline{V_1}$ will remain on for word pairs 1010 and 0010.

It is thus apparent that with the O register set at O6'O5 and the sequence register at $\phi_1$, $\underline{Q_3}$ will be turned to its $Q_3$ condition during $P_{34}$ for word pairs 1010 and 0010. This $Q_3$ signal will, with the sequence register at $\phi_1$ turn $\underline{\phi_1}$ to $\phi_1'$ and $\underline{\phi_2}$ to $\phi_2$.

The controlling circuits for entry of the number recorded at address 10 (FIGURE 19), syllable zero of word pair 0010, into the N register (FIGURE 29) as the address of the number required to perform the order standing in the order register are $\underline{N_8}=W_1(\phi_2F_0'F'Q_1C)$ and $$\underline{N_8}'=W_1'(\phi_2F_0'F'Q_1C)$$

The $Q_1$ condition of this circuit is controlled by the circuit $\underline{Q_1}=V_1(F_5'F_1'C)[(O6'O5)\phi_2][(F_2F_3)L_1'L_2']$ (FIGURE 32). As has been pointed out before, the $$[(F_2F_3)L_1'L_2']$$

portion of this signal limits the production of the $Q_1$ output signal to the zero syllable of each word and, since $\underline{L_7}$ remained in the $L_7'$ condition so that, at $P_{34}$, $\underline{L_4}$ will be in the $L_4'$ condition due to the $L_7$–$L_6$–$L_5$–$L_4$ circulation, $\underline{V_1}$ will remain on for those word pairs having a 0 in the most significant digit of their designating numbers. $\underline{Q_1}$ will therefore produce a $Q_1$ output for the E pulses of the zero syllable of word pairs 0000 to 0111 during $\phi_2$ and, for those pulse times, $\underline{N_8}$ will reproduce the signal applied to it from $\underline{W_1}$.

The controlling $\underline{W_1}$ input circuit is $\underline{W_1}=(L_3'L_8')\theta_1'H_2$. $\underline{H_2}$, it will be recalled, reproduces the P pulses read from the HI channel and $\underline{\theta_1}$ compares the order address digits originally set up in $\underline{L_6}$, $\underline{L_5}$, and $\underline{L_4}$ with the word pair number signals recorded in channel F during $E_{33}$, $P_{33}$, and $E_{34}$ and since $\underline{L_6}$, $\underline{L_5}$ and $\underline{L_4}$ were set to the condition $L_6'$, $L_5L_4'$, $\theta_1$ will remain off for word pairs 0010 and 1010.

It is apparent therefore, that the signal read from the drum and appearing at the output of $\underline{H_2}$ will appear at the output of $\underline{W_1}$ only for word pairs 0010 and 1010. Since $\underline{N_8}$ will follow this signal during the E pulses (F') of the zero syllable of word 0000 to 0111 during $\phi_2$, $\underline{N_8}$ will only receive during the E pulse transfer times the signals indicative of the digits recorded in the P pulses of the zero syllable of word pair 0010. The $F_0'Q_1C$ signal appearing at this time during $\phi_2$ is applied to the inputs of the flip-flops of the N register steps the values thus entered into $\underline{N_8}$ through the several flip-flops until all eight digits of this syllable have been entered into the N register.

With both the O and N registers set up in this manner, the calculator will then proceed to $\phi_3$ to copy the word pair from the source specified by the setting of the N register into the D register in accordance with the order HD standing in the O register. The $FQ_1C$ signal, which occurs at the end of the syllable during which the data recorded in syllable zero of word pair 0010 was read into the N register, turns $\underline{L_6}$ on and turns off $\underline{L_5}$ to establish the next order address as $L_8'L_7'L_6L_5'L_4'L_3'L_2'L_1'$ indicative of syllable zero of word pair 0100, that is address 20 (FIGURE 19).

If the order set up in the O register had required no address, there will be no $Q_1$ signal during $\phi_2$ as is apparent from the input equation $$\underline{Q_1}=V_1(F_5'F_1'C)(O6'O5)\phi_2+(O6O5O4')\phi_2 +(O6O5'O4)\phi_2+(O6O5O4')\phi_2+\phi_0(F_2'F_3')L_1L_2 +(F_4'F_3'F_2)L_1'L_2+(F_2'F_3)L_1L_2+(F_2F_3)L_1'L_2'$$

because there will be no (O6O5'O4), (O6O5O4'), or (O6'O5) input during $\phi_2$ indicative of the requirement of an address for the performance of the order in the O reigster. If no address is required, the machine will proceed with the performance of the order and the sequence register will be restored to $\phi_0$.

Since, under these latter conditions, no address will have been read into the N register during $\phi_2$, the setting of the L register will be interpreted during $\phi_0$ as the address of the next order. The next order will be located at that address and read into the O register in the same manner as described before for the order stored in syllable zero of word pair 0000.

From the foregoing, it is apparent that addresses are interspersed among the orders in the storage unit only when needed. If an address is required, it appears in the next succeeding order syllable. If no address is required, the next order appears in that syllable. Thus, there is never any wasted space in the storage unit which is set aside for addresses but not utilized because the order requires no address.

COMPUTATIONS

As was pointed out at the outset of this description of the computer herein disclosed, the solution of the relatively complex problems of which this computer is capable is effected by the selectively sequenced step by step performance of the quite simple arithmetic operations of addition, subtraction, multiplication, division, data comparison and data transfer.

By far the most complicated of these arithmetic operations is that of division. The operation of the computer during a simple divide operation will now be explained as that operation illustrates the principles of several other of these arithmetic operations and thus will eliminate the necessity of a detailed explanation of each.

*Division*

Before proceeding with a detailed explanation of the circuitry involved, it will be helpful to explain the manner in which this computer divides.

The mathematics of the manner in which the computer of the present invention performs division is best illustrated in FIGURE 50. For purposes of illustration, the dividend has been chosen as 25 and the divisor as 6 which will produce a quotient of 4 with a remainder of 1. The A, B, D and E registers indicated in FIGURE 50 correspond to the A, B, D and E registers in FIGURE 22. The divisor 6, in binary form, is 00110 and appears in positions 5 through 1 of the divisor register D in the chart on the first line representing the zero cycle. The dividend of 25 in binary form is 011001. The dividend appears in positions 1 through 6 of the B register on the zero cycle line of the chart. The successive lines on the chart represent successive cycles of shift to the left in the A, B and E registers. The zero line represents the condition of the registers prior to the initiation of shifting, the second line, designated 1, their condition after the first shift cycle, and the remaining lines, denominated 27 through 32, the condition of the registers after the twenty-seventh, twenty-eighth, twenty-ninth, thirtieth, thirty-first and thirty-second shift cycles respectively have been completed. The value 10101010 originally standing in E register is included merely for illustration of the manner in which a number stored in that register upon the initiation of division is handled by the calculator. The quotient will be placed in the E register as it is ascertained by the calculator. As is apparent from the chart, between cycles 1 and 27 of the shifting operation the dividend 11001 is shifted into positions 32, 31, 30, 29 and 28 of the B register, the highest denominational orders of the number in the register have been entered into the lower denominational orders of the B register. The zeros originally in denominations 7 through 32 of the B register have been transferred into the A register and the divisor 0110 remains unchanged in the D register. Prior to each such shifting step a comparison was made between the divisor and twice the portion of the dividend standing in the A register to ascertain whether 2A was equal to or greater than D. Since the values standing in B which were shifted into A were zeros during each such comparison it was found on each such comparison that 2A was less than D and a resultant zero was entered in the E register as a quotient.

At the completion of the twenty-eighth shift the most significant digit of the number 11001, the dividend, has been shifted into the first denominational order of the A register. During this shift a comparison is made between D and 2A and D is found to be greater than 2A. During the twenty-ninth shift, at the completion of which the two most significant digits of the dividend appear in the A register, a comparison between D and 2A results in the determination that D is equal to 2A. This indicates that a subtraction of D from 2A can be performed. A one is therefore entered into the lowest denominational order of the E register, that is the quotient during the thirtieth shift cycle. D is subtracted from that portion of the dividend appearing in A together with the most significant digit in B as it is shifted into A to produce the result shown at the completion of the thirtieth shift. The result of this combined subtraction and shift is that the remainder is 000001 with the 1 appearing in the thirty-first position of the B register and zeros appearing in all positions of the A register. A comparison between D and 2A indicates that D is now greater than 2A so that a zero is entered into E and the 1 entered into the lowest order of E at the completion of the comparison during the twenty-ninth shift is shifted to the left one denominational order so that the quotient is then 010.

A comparison during the thirty-first shift again indicates that D is greater than 2A resulting in the entry of a further zero in the lowest denominational order of the quotient. At the completion of the thirty-first shift the remaining one of the dividend is in the thirty-second position of the B register. Since D was found to be greater than 2A no subtraction will occur on the thirty-second and final shift which will result in the transfer of the 1 appearing in the thirty-second position of B into the first position of the A register where it will stay as a remainder of 1 and the entry of a final zero into the quotient register so that its five least significant positions read 00100, the binary equivalent of the decimal number 4.

Referring now to FIGURES 22, 38 and 39 for the related circuitry and to the charts of FIGURES 51 to 58 the improved manner in which division is performed by the present calculating device will now be explained.

The dividend is held in a double length recirculating register A—B formed by coupling together the A and B one word recirculating registers in the manner later described. This register A—B is therefore capable of holding two thirty-two digit binary numbers. The divisor is held in the one word recirculating register D and the quotient appears in the remaining one word recirculating register E. The numerical contents of the A, B and E registers are caused to shift left during division operations one digit each word time. This is accomplished in the computer by making the recirculation paths of A, B and E one digit time longer than normal, an extra flip-flop being connected in the circuit for this purpose, as hereinafter described. The contents of D do not shift.

The most significant digit of B is shifted into the least significant position in A during each shifting word time interval. The digit, in the most significant position in A is shifted out the left hand end of the register and is lost. The quotient is shifted into E and what was in E is transferred to B. At the completion of the division operation, the registers each contain the following:

E contains the quotient with the proper sign
A contains the remainder and has the sign of B
B contains what was in E with the same sign
D contains the divisor unchanged At the beginning the number in B can be any size up to the capacity of the register. The number in A, however, must be less than D; if it is not, an overflow flip-flop is turned on and the division is not performed. This is done to prevent a division by zero or one beyond the capabilities of the machine.

A novel feature in the performance of this division is a precomparison between D and 2A (that is twice the significant digits of the dividend appearing in the A register) to determine if D should be subtracted. If 2A is equal or larger, on the next recirculation when A has been shifted left by one digit, A will be equal or larger. In this case D is subtracted from A. This fact is recorded by inserting a one in the right hand end of the E register and D is compared with twice the new value of A. If 2A is not larger than D when the comparison is made, then on the next recirculation a zero is recorded in E.

For illustration, the same simple problem previously used is presented with pulse charts (FIGURES 51 to 58). The problem consists of dividing 25 by 6. The answer, of course, is 4 with a remainder of 1. This is shown in binary form as:

```
          100
    110 √11001
         110
         ---
          000
          000
          ---
           001
           000
           ---
             1
```

Figure 51:
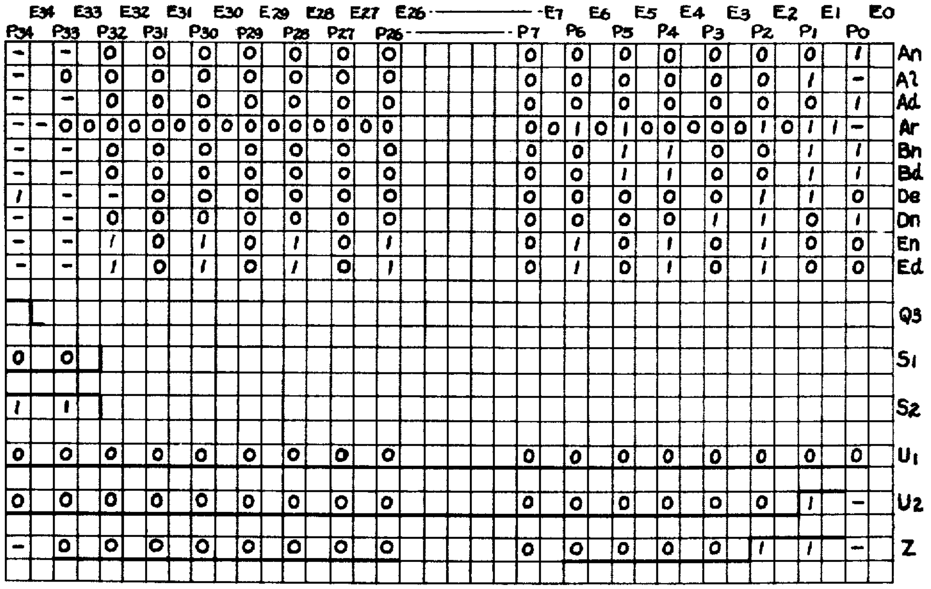

At the beginning of the computation the A register is shown in FIGURE 51 cleared to zero. This can be seen by referring to line $A_n$ (A normal) in FIGURE 51. $\underline{A_n}$ (FIGURE 22) is the flip-flop in the A—B recirculation that holds the digit of A at the times corresponding to the pulse times shown on the timing chart (FIGURE 20). $P_0$ is the pulse time that holds the sign digit of A. According to the convention used in this machine, a one in $\underline{A_n}$ during $P_0$ means that the sign of the number is plus, while a zero in $A_n$ during $P_0$ means that the sign of the number is a minus. The pulses in $\underline{A_l}$ (A late) $\underline{A_d}$ (A driver) are shown. $\underline{A_l}$ is the flip-flop in the A—B recirculation chain that holds each digit of the number A after it has left $\underline{A_n}$. Thus the pulse that was in $\underline{A_n}$ in $P_0$ can be seen in $\underline{A_l}$ in $P_1$.

During normal recirculation, the driver $\underline{A_d}$ will hold the same digit that is in $\underline{A_n}$ during any particular pulse interval. However, when it is desired to shift the number in the A register to the left, $\underline{A_d}$ is controlled to respond to pulses from $\underline{A_l}$ instead of $\underline{A_n}$. These circuits are shown in FIGURE 22. The recirculation path is now one digit longer because an extra flip-flop ($\underline{A_l}$) has been inserted into the recirculation path.

$\underline{A_r}$ is the flip-flop whose contents are being written or recorded on the drum. The digits of A and B are recorded alternately as has been pointed out in the detailed description of the A—B recirculation circuitry.

The control for the B, D and E registers is shown in FIGURE 22, from which it may be seen that $\underline{B_n}$, $\underline{B_d}$, $\underline{D_n}$ and $\underline{E_n}$ all perform similar functions for the B, D and E recirculating registers. $\underline{A_e}$, $\underline{B_e}$, $\underline{D_e}$ and $\underline{E_e}$ are all flip-flops that hold a particular digit of the numbers in A, B, D and E, respectively, one digit time before that digit is held in the corresponding normal flip-flop $\underline{A_n}$, $\underline{B_n}$, $\underline{D_n}$ or $\underline{E_n}$. Thus, during $P_0$ the digit that will be stepped into $\underline{D_n}$ next is held in $\underline{D_e}$ (D early).

The dividend, B which for the purpose of the illustrative problem has been assumed to be 25, is held in the B register as can be seen during the normal pulse times in $B_n$ in FIGURE 51. B is assumed to be plus as denoted by the one in $P_0$ for $B_n$.

The divisor D, which has been assumed to be 6, is held in the D register and can be seen at $D_n$ in FIGURE 51. $D_e$ is also shown in FIGURE 51 since it will also be involved in the logic.

The dividend and divisor may be placed in the B and D registers in any one of a number of ways, as for example, by copying from a main memory channel into a working channel and then transferring to the registers in the manner hereinafter explained.

The information in the E register at the beginning of the problem is shown in FIGURE 51 by $E_n$. An arbitrarily chosen binary number consisting of alternate ones and zeros has been chosen for E to demonstrate the manner in which the number appearing in the E register is handled. A minus sign has been arbitrarily assigned to the number in the E register as shown by the zero in $E_n$ at $P_0$.

It is assumed that the code for the divide order, which is 111100, has been placed in the order register O (FIGURE 27) from a working channel in the manner hereinafter described to establish the condition $$O6O5O4O3O2'O1'$$

in that register. It is also assumed that the sequence register $\phi$ is now in the second sequence $\phi_2$ with all other flip-flops of the register off.

During this sequence, $\phi_2$, a check is first made to determine if division by zero or a prohibitive division is being attempted. This check is made by comparing the number stored in the A register (the thirty-two highest denominations of the dividend) with the number in the D register (the thirty-two digit divisor) to make sure that A is less than D. If the thirty-two highest denominations of the dividend contain a number equal to or greater than the divisor a prohibitive division is being attempted and the position will be terminated. The overflow flip-flop $\underline{Z}$ (FIGURE 39), which effectuates this comparison, is turned on to Z during $P_0$ by the circuits shown in FIGURE 39 which are defined by:

$$\underline{Z}=(O6O5O4O3)\phi 2P_0C$$

O6, O5, O4, and O3 are the outputs from the corresponding flip-flops in the order register O that are on when the divide order is given. $\phi_2$ indicates the computer is in the second sequence involved in carrying out the order. $P_0$ is the first pulse time and C is the clock or master timing device in the computer.

During sequence $\phi_2$ the $\underline{Z}$ flip-flop will be turned off during any pulse time succeeding $P_0$ during the word time in which these numbers are compared if during such pulse time there is a "zero" in A and a "one" in D as read from the flip-flops $\underline{A_n}$ and $\underline{D_n}$ respectively (FIGURES 22 and 39). The circuit which effects the cut off of $\underline{Z}$ is shown in FIGURE 39 and defined by:

$$\underline{Z}'=O5O4O3A_n'D_n\phi_2P_0'F_5'F_1C$$

$F_5'$ means that the check is not made during the pulse times $P_{33}$ and $P_{34}$ which do not hold digits of the numbers. $F_1$ limits the comparison to the P pulses. Conversely the $\underline{Z}$ flip-flop will be turned on during any pulse time of this word time following $P_0$ if there is a one in A and a zero in D.

$$\underline{Z}=O6O5O4O3A_nD_n'\phi_2P_0'F_5'F_1C$$

At the end of this comparison, $\underline{Z}$ is off, Z', if A is less than D, and is on, Z, if A is equal to or greater than D. The action of the $\underline{Z}$ flip-flop during the beginning of the sample problem is shown in FIGURE 51.

Since the computer must be readied for a subtraction should it be necessary when the actual division is started, the logic signals must be set up in advance. Whenever a subtraction is to take place the flip-flop $U_1$ (FIGURE 38) must be on. $U_1$ is turned on and off by $U_2$ which is the flip-flop in which the actual pre-comparison telling whether to subtract or not takes place. $S_1$ is a flip-flop that takes the digit in $B_d$ at $P_{32}$ (the left hand digit of the dividend) and stores it since during shifting this is the digit that will be in the $A_d$ driver during $P_1$ of the next word. The controlling circuitry for $\underline{S_1}$ is shown in FIGURE 38, some of which is defined by:

$$\underline{S_1}=B_dP_{32}C$$
$$\underline{S_1'}=B_d'P_{32}C$$

The first pre-comparisons will be made with the computer still in sequence $\phi_2$, before the shifting of the numbers in the A, B and E registers has begun. During $P_0$ the digit of D that will be in $D_n$ during $P_1$ can be found in $\underline{D_e}$. To compare this with 2A, $D_e$ must be compared during $P_0$ with the left-hand digit of B. The digit that will be in $B_n$ during $P_{32}$ was in $B_d$ during the last $P_{32}$, and this is in $S_1$ during $P_0$. Therefore, during sequence $\phi_2$, at $P_0$, $D_e$ is compared with $S_1$, which then holds what will be in $B_n$ at $P_{32}$.

There are several possibilities of what may be in $S_1$ and $D_e$ at $P_0$ and these are shown in the table below:

| | | | | |
|---|---|---|---|---|
| $S_1$ (2A) | 1 | 1 | 0 | 0 |
| $D_e$ (D) | 1 | 0 | 1 | 0 |
| $U_2$ trigger | 1 | 1 | 0 | 1 |

If there is a one in $\underline{S_1}$ and a zero in $\underline{D_e}$ or if $\underline{S_1}$ and $\underline{D_e}$ are equal, $\underline{U_2}$ is turned on since this indicates $$2A \geqq D$$

If, however, $S_1$ holds a zero and $D_e$ holds a one $\underline{U_2}$ should be turned off as $2A<D$.

This is shown in the logic as:

$$\underline{U_2}=D_e'P_0C+S_1\phi_2P_0C$$
$$\underline{U_2'}=S_1'D_e\phi_2P_0C$$

which means that $\underline{U_2}$ will be turned on if there is a zero in $\underline{D_e}$ or a one in $\underline{S_1}$ and will be turned off if there is a zero in $\underline{S_1}$ and a one in $\underline{D_e}$. During pulse times $P_1$ through $P_{31}$ comparison is made between $\underline{A_d}$ and $\underline{D_e}$. If $\underline{A_d}$ is greater than $\underline{D_e}$, $\underline{U_2}$ will be turned on; if $\underline{A_d}$ is less than $\underline{D_e}$ it will be turned off.

$$\underline{U_2}=A_dD_e'P_{32}'F_5'F_1C$$
$$\underline{U_2'}=A_d'D_eP_{32}'F_5'F_1P_0'C$$

The $P_0'$ term is omitted from the $\underline{U_2}$ logic since if there is a $D_e'$ at $P_0$ the term $\underline{U_2}=D_e'P_0C$ would turn on $\underline{U_2}$ anyway.

$\underline{U_2}$ is turned on if there is a one in $A_r$ during $P_{32}$ and is turned off if there is a zero in $A_r$ at $P_{32}$.

$$\underline{U_2}=A_rP_{32}C$$
$$\underline{U_2'}=A_r'P_{32}C$$

$A_r$ is the flip-flop whose contents are bing recorded on the drum through write amplifier $\underline{AB_w}$. Hence what is in $\underline{A_r}$ at $P_{32}$ was in $\underline{B_n}$ at $P_{30}$ and will appear in $\underline{B_n}$ during the next recirculation at $P_{31}$. If at is a one then it will be equal to or greater than the digit in $\underline{D_e}$ thus $\underline{U_2}$ should be on. If it is a zero then it will either be less than $\underline{D_e}$ if $\underline{D_e}$ is a one, in which case $\underline{U_2}$ should be turned off, as it will be equal to $\underline{D_e}$, if $\underline{D_e}$, is a zero. Then the final determination of whether $\underline{U_2}$ should be on or off, which will be indicative of whether or not 2A is greater than D, will have to be made in succeeding digit times.

If $\underline{U_2}$ is on, $\underline{U_1}$ will be turned on at the next $P_{32}$ pulse time ending comparison thus indicating that a subtraction is to be performed. $\underline{U_1}$ will also be turned on if $\underline{A_d}$ was on in $P_{32}$ since this means that the most significant digit of A is a one, and thus that 2A must be larger than D. $\underline{U_1}$ will be turned off indicating that no subtraction is to take place if $\underline{U_2}$ and $\underline{A_d}$ are off in $P_{32}$.

$$\underline{U_1}=U_2P_{32}C+A_dP_{32}C$$
$$\underline{U_1'}=U_2'A_d'P_{32}C$$

$\underline{S_2}$ is the flip-flop that picks up the most significant digit of E at $P_{32}$ during shifting and holds it until $P_1$ when it is placed in the $B_d$ driver.

$$\underline{S_2}=E_dP_{32}C$$
$$\underline{S_2'}=E_d'P_{32}C$$
$$\underline{B}=O6O5O4O3\phi_0'\phi_1'\phi_2'P_1S_2$$

The action of the various units is shown in FIGURE 51 at the beginning of operations.

$\underline{S_1}$ will have a zero in it at $P_0$ and at all other pulse times since there was a $B_d'$ at $P_{32}$ of the previous word (not shown).

Since there is a $D_e'$ at $P_0$, the gate $\underline{U_2}=D_e'P_0C$ will be set and upon the clock fall $\underline{U_2}$ will be triggered on. The information in $P_{33}$ and $P_{34}$ is meaningless at this time as these pulse times are used for storing check digits and the channel number and hence may contain any combination originally. This is indicated on the chart by a dash (—) whenever the state of flip-flop or driver at a particular time is indeterminate. $\underline{U_2}$ will be triggered off at the end of P by the term $\underline{U_2'}=A_d'D_eP_{32}'P_0'F_5'F_1C$ since there is a zero in $\underline{A_d}$ and a one in $\underline{D_e}$.

It has been arbitrarily assumed that $\underline{U_1}$ is off, but it may be either on or off.

The information in $\underline{A_r}$ is presented merely for reference. The information standing in $\underline{A_d}$ at any given time is stepped into $\underline{A_r}$ at the end of the next occurring $F_1$ pulse and the information standing in $\underline{B_r}$ at any given time is stepped into $\underline{A_r}$ at the end of the next occurring $F_1'$ pulse.

$\underline{S_2}$ will be turned on at the end of $P_{32}$ since there was a one in $\underline{E_d}$ at $P_{32}$. (When the registers are not shifting $\underline{E_d}$ holds the same information as $\underline{E_n}$ at the same pulse time.)

At $P_{34}$ in FIGURE 51, with the overflow flip-flop $\underline{Z}$ off ($Z'$) the $Q_3$ driver will be turned on.

$$\underline{Q_3}=O6O5O4V_1P_{34}\phi_2(Z'-O3')$$

$Q_3$ causes the sequence counter to adavnce to $\phi_3$. During $\phi_3$ the numbers appearing in registers A, B and E are shifted to the left and the actual process of division occurs. The numbers in the registers are stepped left one digit space once during each word pair time interval and since there are eight word time intervals per half drum revolution, it requires only two complete drum revolutions to complete the thirty-two digit space shifts required for the entire division operation.

Figure 52:
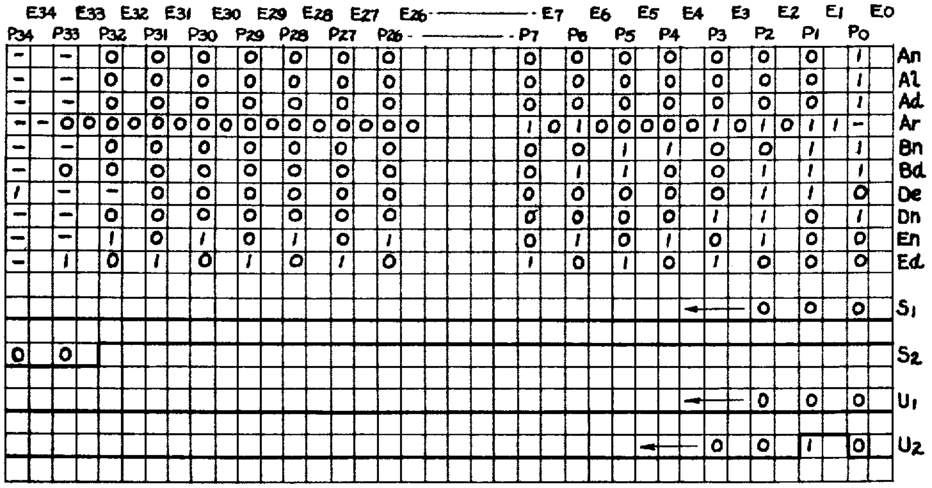

FIGURE 52 shows the conditions of the various flip-flops during the next word time. $\underline{S_1}$ will be turned off since there was a zero in $B_d$ during the last $P_{32}$ and it will remain off since there is again a zero in $B_d$ during $P_{32}$.

$\underline{S_2}$ will remain on until $P_{32}$, when it will go off. This means that it will hold the zero that was in $P_{32}$ until the next $P_1$ when it is entered in $B_d$.

$\underline{U_2}$ will be on during $P_1$ since there is a zero in $D_e$ at $P_0$. However, at the next comparison of $D_e$ and $A_d$ it will be turned off. $\underline{U_1}$ will remain off.

The zero that was held in $\underline{S_1}$ is in $\underline{A_d}$ at $\underline{P_1}$. This is accomplished by the term:

$$\underline{A_d}=O6O5O4O3\phi_0'\phi_1'\phi_2'P_1U_1'S_1$$

This is merley a shift term; since $U_1'$ is present, no subtraction occurs. During the remaining pulse times, shifting is accomplished by the following term:

$$\underline{A_d}=O6O5O4O3\phi_0'\phi_1'\phi_2'P_0'P_1'U_1'A_1$$

The $A_1$ term is present since during recirculation the $\underline{A_d}$ driver is now receiving its information from $\underline{A_1}$.

The one digit that was held in $\underline{S_2}$ from $\underline{P_{32}}$ in the previous word time is transferred to $\underline{B_d}$ at $P_1$.

$$\underline{B_d}=O6O5O4O3\phi_0'\phi_1'\phi_2'P_1S_2$$

For the remaining pulse times $\underline{B_d}$ receives its information from $\underline{B_1}$. The shift term is:

$$\underline{B_d}=O6O5O4O3\phi_0'\phi_1'\phi_2'P_0'P_1'B_1$$

$\underline{D_e}$ and $\underline{D_n}$ are unchanged. However, the quotient must be stepped into the E register. This is accomplished by the following term:

$$\underline{E_d}=O6O5O4O3\phi_0'\phi_1'\phi_2'P_1U_1$$

A one digit will be recorded in $\underline{E_d}$ during $P_1$ if there is a subtraction as indicated by $\underline{U_1}$ and a zero digit will be recorded if no subtraction is being performed as indicated by $U_1'$. The shift and recirculation term during the other pulse times is:

$$\underline{E_d}=O6O5O4O3\phi_0'\phi_1'\phi_2'P_0'P_1'E_1$$

For the assumed division of 25 by 6, the shifting and comparison takes place every word time in a manner essentially unchanged from what has just been described for several more word times. The pattern will begin to vary only when the dividend 25 that was originally entered in the B register begins to shift into the A register.

Figure 53:
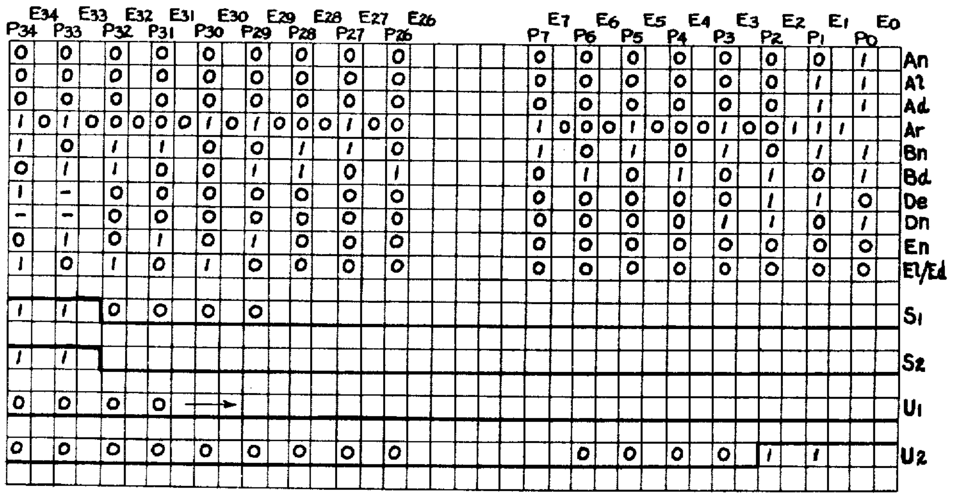

FIGURE 53 shows the condition during the 28th shift when the most significant digit of B is being shifted into A.

$\underline{S_1}$ is zero until $P_{32}$ since it was carrying over a zero from the previous word. It is turned on at $P_{32}$ by the one in $B_d$.

$\underline{S_2}$ is also zero since it was carrying a zero over from the preceding word. It is turned on at $P_{32}$ by the one in $E_d$.

$\underline{U_2}$ is turned off at the end of $P_2$ because of $A_d'D_e$. It remains off at $P_{32}$ since there is a zero in $\underline{A_r}$. $\underline{U_1}$ remains off since at $P_{32}$ both $\underline{A_d}$ and $\underline{U_2}$ are off.

The one that was in $\underline{B_d}$ the previous word time has been shifted into $\underline{A_d}$. B has mostly been filled with one-zero combination that was in E at the beginning of the problem. Thus far the quotient is still zero and these appear in E. D remains unchanged.

Figure 54:
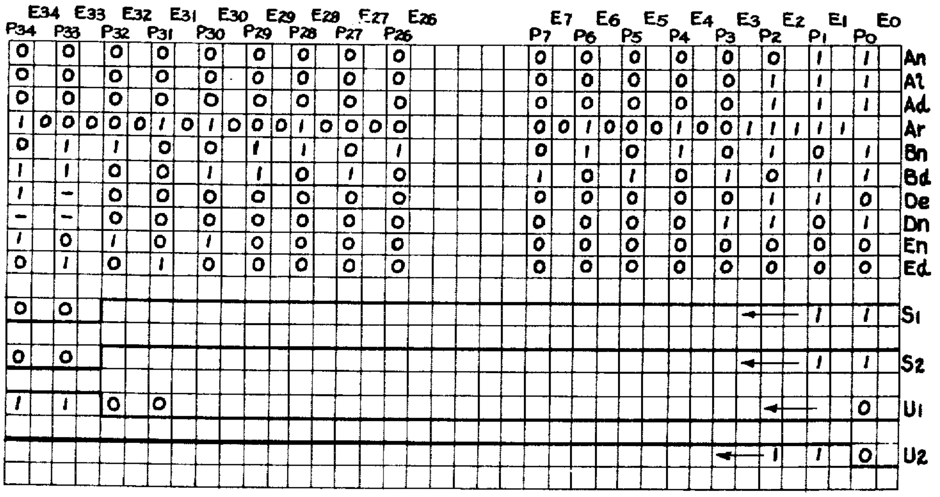

The conditions during the next word time are shown in FIGURE 54. The A, B and E registers have all shifted left one digit from their position as shown in FIGURE 53.

$S_1$ and $S_2$ are turned off at $P_{32}$. The big changes occur in $U_2$ and $U_1$. $U_2$ is turned on at the end of $P_0$ by the zero in $D_e$ at $P_0$. However, this time it is not turned off until $P_{32}$ since in all instances up to and including $P_{31}$ the digit in $A_d$ is greater than or equal to the digit in $D_e$. This means that 2A is now greater than D and hence in the succeeding word time D can be subtracted from A. Thus at $P_{32}$, since $U_2$ is on, $U_1$ will be turned on.

Figure 55:
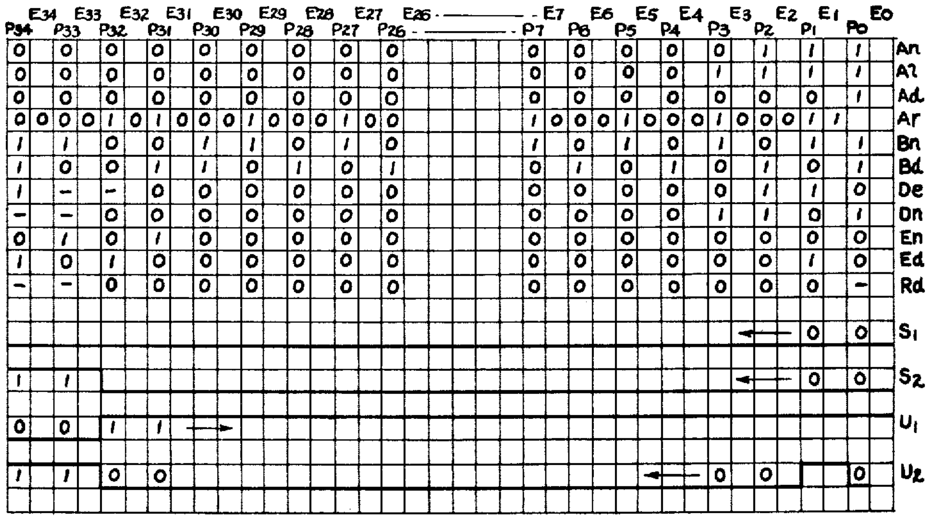

The following word time is shown in FIGURE 55. It is during this word time, when $U_1$ is on, that a subtraction occurs. During $P_1$ of the cycle shown in FIGURE 55 the logic terms that are involved are:

$$A_d = O6O5O4O3\phi_0'\phi_1'\phi_2'P_1U_1S_1D_n'$$
$$A_d = O6O5O4O3\phi_0'\phi_1'\phi_2'P_1U_1S_1'D_n$$

$S_1$ contains the digit that was in $B_d$ during the previous $P_{32}$ and is the digit that would be recorded in $A_d$ during $P_1$ were it not for the subtraction. If $S_1$ holds a one and $D_n$ holds a zero as indicated by $S_1D_n'$, then, during subtraction, it is desired to record a one for an answer and hence $A_d$ is turned on. Also if there is a zero in $S_1$ and a one in $D_n$ it is desired to record a one in $A_d$ for an answer. In this case it is also necessary to turn on a "borrow" flip-flop indicating that it was necessary to borrow a digit from the next most significant digit. The borrow flip-flop is $R_d$ (FIGURE 38). It is turned on at $P_1$ for the case just mentioned. It is also turned on during the following digit times when $A_1$ is off and $D_n$ is on. It is turned off when there is a one in $A_1$ and a zero in $D_n$ which means that a borrow is no longer needed during the next subtraction. It is also turned off at $P_0$ since it should never be on during $P_1$. The logic for $R_d$ is:

$$R_d = S_1'D_nP_1C + P_0'P_1'A_1'D_nF_1C$$
$$R_d' = P_0C + P_1'A_1D_n'F_1C$$

Figure 56:
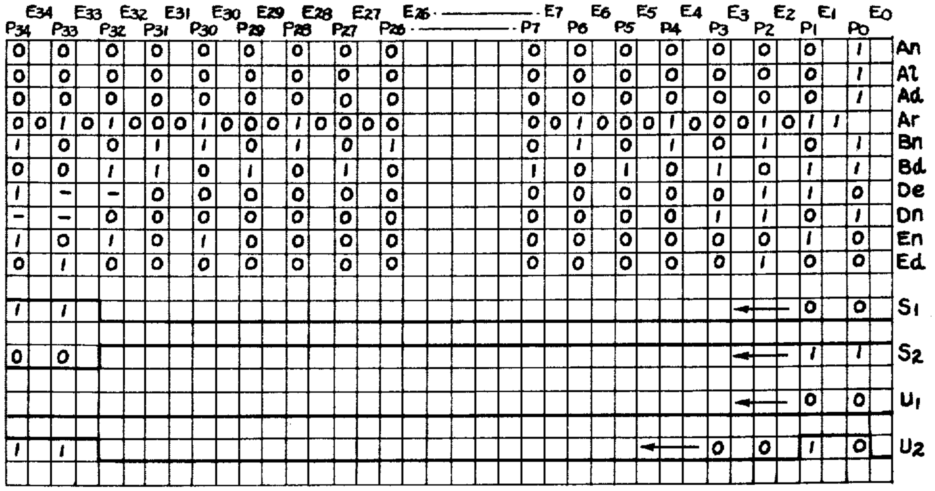

In the example shown in FIGURE 56 there is a zero in $S_1$ and a zero in $D_n$ during $P_1$. Hence $A_d$ is not turned on and hence $A_d$ is zero.

During the following digit times $A_1$, $D_n$ and $R_d$ (FIGURE 22) are compared. A one will be recorded in $A_d$ if there are an odd number of these flip-flops on. This is shown in the logic for $A_d$ as:

$$A_d = (O6O5O4O3\phi_0'\phi_1'\phi_2'P_0'P_1'U_1)A_1D_nR_d$$
$$+(O6O5O4O3\phi_0'\phi_1'\phi_2'P_0'P_1'U_1)A_1D_n'R_d'$$
$$+(O6O5O4O3\phi_0'\phi_1'\phi_2'P_0'P_1'U_1)A_1'D_nR_d'$$
$$+(O6O5O4O3\phi_0'\phi_1'\phi_2'P_0'P_1'U_1)A_1'D_n'R_d$$

During $P_2$, $A_1$ contains a one, $D_n$ contains a one, and there is no borrow, so a zero is recorded in $A_d$. The same condition holds true for $P_3$. During the subsequent word times through $P_{32}$ there is a zero in $A_1$ and a zero in $D_n$ hence zeros are recorded in $A_d$.

A one is recorded in $E_d$ for an answer during $P_1$ in every word time when a subtraction occurs.

The logic is:

$$E_d = O6O5O4O3\phi_0'\phi_1'P_1U_1$$

$S_1$ and $S_2$ remain off $U_2$ is turned on after $P_0$ due to the zero in $D_e$. It comes on again after $P_{32}$ because there is a one in $A_r$ during $P_{32}$. $U_1$ is turned off by the term $U_2'A_d'P_{32}C$ since 2A is no longer larger than D.

Figure 57:
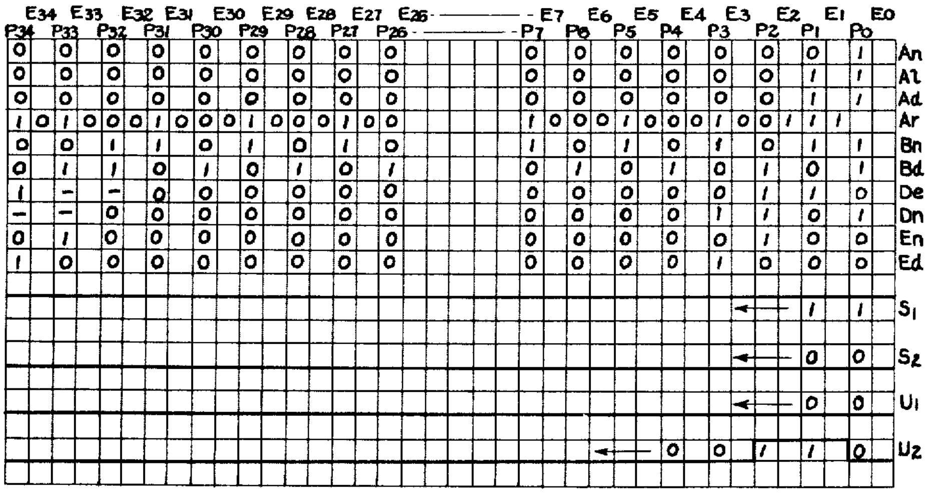

During the following two word times in FIGURES 56 and 57, shifting and comparison is merely carried on as was done previously with no significant changes taking place.

Figure 58:
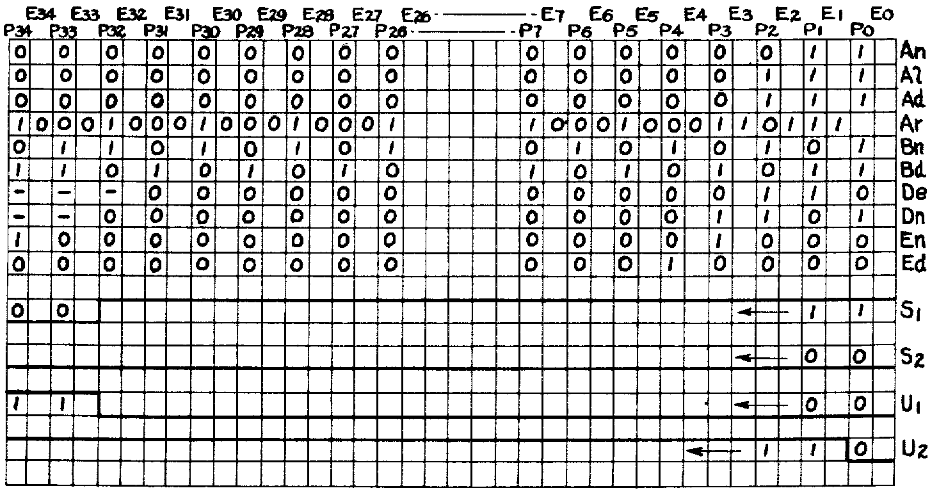

FIGURE 58 shows the last or thirty-second word time involved in the division. $E_n$ now contains 100 which is the answer and $A_n$ contains the remainder 1. $B_n$ contains the one-zero combination that was in $E_n$ at the beginning of the problem. All that remains now is to adjust the signs and reset.

When the clock falls after $P_{32}$ the computer will sequence to $\phi_7$. This sequence lasts only one pulse time; just long enough to compute the signs. This is done during $P_0$ of the next word time. If $B_n$ and $D_n$ are alike a one is recorded for the sign of E; if they are different a zero is recorded.

$$E_d = O6O5O4O3\phi_7B_nD_n$$
$$+O6O5O4O3\phi_7B_n'D_n'$$

The sign of B is corrected to that of E.

$$B_d = O6O5O4O3\phi_7E_n$$

A is given the sign of B since there is the possibility that they may have been different at the beginning, even though they should not have been. In this case, the sign originally in B is assumed to be the correct one.

$$A_d = O6O5O4O3\phi_7B_n$$

Also during P0 the $Q_4$ driver comes on:

$$Q4 = O6O5O4\phi 7P0$$

Since this is the reset signal, as soon as the clock falls the sequence register will be reset and the computer will start picking up the next order.

EXPLANATION OF ORDERS

000001 Reverse Overflow

The purpose of this order is to reverse the state of the overflow flip-flop Z. If the overflow flip-flop Z is on when this order is given it will be turned off; if it is off it will be turned on.

As has been explained previously, during sequence $\phi 0$ comparison is made between the address where the next order is to be picked up as contained in the order-address register L, (FIGURE 26) and the information being read out of the appropriate working channel H—I or J—K. As soon as coincidence has been established, this information is read into the order register O (FIGURE 27). Since this occurs for all orders, the discussion for subsequent orders will assume that the order has been picked up and is in the order register O ready to be carried out.

The computer proceeds from sequence $\phi 0$ to $\phi 1$ in a similar manner for all orders. An F pulse appears at the end of the syllable immediately after the order has been read into the order register O. Since Q1 (FIGURE 32) remains on until the end of the syllable, Q3 (FIGURE 31) will be turned on during the F pulse by the signal Q1F. When the clock falls the signal Q3C will advance the sequence counter $\phi$ FIGURE 28) to $\phi 1$.

The computer will idle in $\phi 1$ for an appropriate time, depending on the order, until it is advanced to $\phi 2$. For the reverse overflow order, 000001, being considered this happens during P34 of the same word time in which the order is obtained. The term in the Q3 logic is:

$$Q3 = O6'O5'\phi 1P34$$

At the end of P34 the computer is stepped into sequence $\phi 2$ by the terms, $$\phi 1 = \phi 1A2'A4'Q3C$$
$$\phi 2 = \phi 1A2'A4'Q3C$$

A2 and A4 are alarm flip-flops. The function of A4 has been explained in the description of the sequence register $\phi$ and overflow alarm operation. The function of A2 will be explained hereinafter.

During P0 of the next word time the order is carried out. If Z is on it is turned off, and if it is off it is turned on.

$$\underline{Z}=O6'O5'O4'O2'O1\phi 2P0CZ'$$
$$\underline{Z}'=O6'O5'O4'O2'O1\phi 2P0CZ$$

Q4 comes on during P34 by the term:

$$\underline{Q4}=O6'D5'\phi 2P34$$

During the next clock pulse the sequence register $\phi$ (FIGURE 28) is reset to zero by the Q4C term, the order having been completed. Thus it required one word time to complete the order once it had been read into the order register.

000010 Reverse the Sign of A

This order is used whenever it is desired to change the sign digit of the number in the A register (FIGURE 22). If the sign digit is a one, signifying plus, it is made to be zero; if it is a zero it is made to be a one.

During sequence $\phi 1$ the order is in the order register. Q3 comes on at P34 by the term:

$$\underline{Q3}=O6'O5'\phi 1P34$$

and at the end of P34 the computer steps into sequence $\phi 2$ by the terms $$\phi 1'=\phi 1A2'A4'Q3C$$
$$\phi 2=\phi 1A2'A4'Q3C$$

in the same manner as in the previous order.

The sign digit of A is changed during P0 of the next word time when it is held in An. If An contains a zero at this time, Ad will not be off, but instead it will be turned on since it is desired to change the sign. If An contains a one at P0, Ad will be prevented from going on and hence will transmit a zero. This is accomplished by the term:

$$\underline{Ad}=O6'O4'O3'O2O1'\phi 2An'P0$$

At the end of this word time the sequence register $\phi$ (FIGURE 28) is reset to zero in the same way as for the previous order.

000011 Make A Positive

This order is executed in the same manner as the previous order except that the sign digit of the number in the A register (FIGURE 22) is always made a one. This is shown in the logic for Ad as:

$$\underline{Ad}=O6'O5'O4'O3'O2O1\phi 2P0$$

000100 Turn on Overflow if A Not Zero

This order causes the contents of the A register (FIGURE 22) to be inspected and the oxerflow flip-flop to be turned on if there are any digits in A, signifying that A is not zero.

The computer goes into sequence $\phi 2$ as in the previous orders. During the next word time, Z is triggered on if there are any digits in A.

$$\underline{Z}=O6'O5'O4'O3O2'An\phi 2P0'F5'F1C$$

The terms P0' and F5' are included to restrict the digits of A to only the number digits. F1 is added to prevent the sign digit from turning Z on.

At the end of this word time the sequence register is reset to zero by the Q4C term as in the previous orders.

000110 Copy D Into A

In this order, the contents of the D register (FIGURE 22) are transferred into the A register. The D register remains unchanged.

The order is again set up in the same way as for the orders already described; the computer goes into $\phi 2$ at the end of P34. During the next word time Ad is turned on and off by Dn, hence the information in A is replaced by that in D.

$$\underline{Ad}=O6'O5'O4'O3O2O1'\phi 2Dn$$

The sequence register is again reset to zero at the end of P34. As in all the orders described thus far, once the order is in the order register only one word time is needed to execute it.

000111 Turn on Overflow if A is Less Than Zero

In this order, the number in the A register (FIGURE 22) is examined to see if it is negative, in which case the overflow flip-flop Z is turned on. If it is zero or positive, Z is left off. (This order is never given when the overflow flip-flop is already on since an alarm flip-flop A4 would then be turned on.)

The computer goes from sequence $\phi 1$ to $\phi 2$ at P34 as in the other orders. The number in A is then examined to determine if it is not zero. If there are any number digits in A, then Z is turned on:

$$\underline{Z}=O6'O5'O4'O3O1An\phi 2P0'F5'F1C$$

The computer must then determine if the sign of this number is a minus. If it is, then Z should remain on, but if the sign is a plus, then Z should be turned off. This is accomplished by looking in Ae at P34 since this digit is the sign digit that will be in An at P0 of the next word time. Therefore, the overflow flip-flop is turned off if the sign digit is a one.

$$\underline{Z}'=O6'O5'O4'O3O1\phi 2AeP34C$$

At the end of P34 the sequence counter is reset to zero.

001000 Exchange A and B

The complete information that was in the B register (FIGURE 22) is placed in A and the information that was in the A register is placed in B. This information exchange takes place during $\phi 2$ in the word time after the order has been read into the order register O (FIGURE 22). The Ad driver receives its information from Bn and the Bd driver receives its information from An.

$$\underline{Ad}=O5'O4O3'O2'O1'\phi 2Bn$$
$$\underline{Bd}=O5'O4O3'O2'O1'\phi 2An$$

At the end of P34 the sequence register again resets to $\phi 0$.

001001 Exchange A and E

This sequence of operations for this order is the same as for the previous exchange order. In this case the information in the A register (FIGURE 22) is transferred to the E register and the information in the E register is transferred to the A register.

$$\underline{Ad}=O5'O4O3'O2'O1\phi 2En$$
$$\underline{Ed}=O5'O4O3'O2'O1\phi 2An$$

001010 Exchange A and D

This order again follows the pattern of the other exchange orders. The information in A is copied into D and the information in D is copied into A.

$$\underline{Ad}=O6'O5'O4O3'O2O1'\phi 2Dn$$
$$\underline{Dr}=O6'O5'O4O3'O2O1'\phi 2F1CAn$$
$$\underline{Dr}'=O6'O5'O4O3'O2O1'\phi 2F1CAn'$$

The information from A is read into the Dr flip-flop, which in normal recirculation receives its information from Dn, but during this exchange order receives its information from An.

001011 Complement A

In the execution of this order the one's complement of the number in the A register is obtained. Each zero is replaced by a one and each one is replaced by a zero. This also includes the sign digit.

The computer progresses from sequence $\phi 1$ to $\phi 2$ at the end of word after the order has been picked up as has been true of all these orders requiring only one word time to execute. If there is a zero in An, Ad is turned on thus changing the zero to a one. If there is a one in An, Ad is not turned on, thus entering a zero.

$$\underline{Ad}=O6'O5'O4O3'O2O1\phi2An'$$

At the end of the word the computer resets to sequence $\phi0$.

001100 Subtract One From A

This order causes the absolute value of the number in A (FIGURE 22) to be reduced by one. Thus if A is a decimal +10 (binary 1010) it will be reduced to a decimal +9 (binary 1001). If A is a decimal −10 it will be made a decimal −9.

Ra (FIGURE 42) is the flip-flop that is used as a carry flip-flop during the normal addition that occurs during sequence $\phi4$. In this case, it is also used to permit subtracting one from A. Ra is turned on following P0 which holds the sign digit.

$$\underline{Ra}=\phi4'P0C$$

It is turned off by F1C following the first one that appears in A.

$$\underline{Ra}'=\phi4'P0'AnF1C$$

A one is obtained in A as the result of the subtraction if there is a zero in An when Ra is on.

$$\underline{Ad}=O5'O4O3O2'O1'\phi2An'Ra$$

If Ra is off, then the number in An is just copied into Ad.

$$\underline{Ad}=O5'O4O3O2'O1'\phi2AnRa'$$

An example is presented below to illustrate this:

| | P4 | P3 | P2 | P1 |
|---|---|---|---|---|
| An | 1 | 0 | 1 | 0 |
| Ra | 0 | 0 | 1 | 1 |
| Ad | 1 | 0 | 0 | 1 |

If it is assumed that the number in A originally is 1010, then during P1 a zero will be in An. Since Ra was turned on at P0, the combination An'Ra exists and a one will be recorded in Ad. During P2 there is a one in An and Ra is still on, hence since the combination AnRa exists, a zero will be entered by Ad. Since there is a one in An during P2 the output of the diode gate $\phi4'AnP0'F1C$ will rise during F1 and when the clock falls at the end of P2, Ra will be triggered off. During P3 and P4 (and for the remaining digits not shown) the number in An will merely be transferred into Ad since Ra will continue to remain off.

There is one other function associated with this order. Whenever the "subtract one" order is given and the result in Ad is equal to any number but zero the overflow flip-flop Z (FIGURE 39) will go on. If the result is zero the overflow flip-flop will not be turned on.

During P1 if the digit in An is a zero, then it is known that when one is subtracted there will be a one in the answer, and since the result is not zero, Z will be turned on.

$$\underline{Z}=O5'O4O3O2'O1'\phi2CAnF4'F1$$

The sequence register resets at the end of P34 since this order only requires one word time to carry out.

001101 Clear A

In this order all the digits in A are changed to zero with the exception of the sign digit which is made a plus one.

The computer proceeds from sequence $\phi1$ to $\phi2$ as before. During P0 the Ad driver is turned on to make A plus:

$$\underline{Ad}=O4O3O2'O1\phi2P0$$

During the remaining digit times Ad remains off since there is no term in the logic that can turn it on. After P34, the computer is reset to sequence $\phi0$.

001110 Shift A and B Right One Digit

This order causes A and B to shift to the right one digit, with the exception of the sign digits that remain unchanged in position. The least significant digit of A becomes the most significant digit of B. A zero is placed in the most significant position in A and the least significant digit in B is lost.

After the computer goes into $\phi2$ following P34, the sign digit of A is recorded unchanged:

$$\underline{Ad}=O6'O5'O4O3O2AnP0$$

However, all other digits in A are shifted to the right by making the recirculation path one digit time shorter; that is, Ad receives its information from Ae instead of An.

$$\underline{Ad}=O6'O4O3O2O1'\phi2AeP0'P32'$$

At P32 there is no term that can turn Ad on and hence a zero will be recorded during this time.

During P0 the sign digit of B is carried over unchanged.

$$\underline{Bd}=\phi7'P0O3Bn$$

The remaining digits in B are shifted one digit to the right by taking the information for Bd from Be. Since during P1, Bd is driven from Be instead of Bn, the digit that was in Bn at P1 is lost. This is the least significant digit of B.

$$\underline{Bd}=\phi2O6'O4O3O2O1'BeP0'P32'$$

During P1 the least significant digit of A was picked up by the S1 flip-flop (FIGURE 38).

$$\underline{S1}=AnO1'P1C$$
$$\underline{S1}'=An'O1'P1C$$

It is held in S1 until P32 at which time it is transferred into the most significant position of B.

$$\underline{Bd}=\phi2O6'O4O3O2O1'P32S1$$

This completes the order and after P34 the sequence register is reset to sequence $\phi0$.

001111 Shift A and B Left One Digit

This order causes A and B to shift to the left one digit, with the exception of the sign digits that remain unchanged in position. The most significant digit of B becomes the least significant digit of A and the most significant digit of A is lost. A zero is placed in the least significant position of B.

The computer goes from $\phi1$ to $\phi2$ following P34 of the word in which the order is picked up.

During P0 the sign digits of A and B are carried over unchanged.

$$\underline{Ad}=O6'O5'O4O3O2AnP0$$
$$\underline{Bd}=\phi7'P0O3Bn$$

However, all other digits in A and B are shifted to the left one digit by making the recirculation paths for each one digit time longer; that is, Ad receives its information from A1 and Bd receives its information from B1.

$$\underline{Ad}=O6'O4O3O2O1\phi2A1F4'$$
$$\underline{Bd}=O6'O4O3O2O1\phi2B1P0'P1'$$

Since there is no term provided to turn on Bd at P1, a zero will be recorded. During P32 of the previous word time the digit that was in Bd at P32, which is the most significant digit of B, is picked up by the S1 flip-flop (FIGURE 38) and is held until P1 when it is transferred to the least significant position of A.

$$\underline{Ad}=O6'O4O3O2O1\phi2S1P1$$

Since at P32, during the shift left, the digit that was in P31 previously is being entered in Ad, the most significant digit of A that was in P32 is lost.

At P34 the order is complete and the sequence register resets to $\phi 0$.

111001 Multiplication

Multiplication is performed in the four recirculation registers A, B, D and E. One of the factors is held in the D register and the other factor is held in the E register. The product appears in the A and B registers. Two registers are normally required since the product may contain as many digits as the two factors combined.

The A, B and E recirculating registers are made to shift constantly to the right. This is accomplished by making them one digit shorter than standard during the multiplication so that their contents go around faster than normal. The D register that does not shift holds one of the factors. As the digits of the shifting factor are shifted out of the right hand end of its register, they are put in a flip-flop where each one in its turn remains for one recirculation time. If, during any recirculation time, the digit in this flip-flop is a one, then the non-shifting factor will be added to the partially formed product in A and B. Since the product is being stepped right continually, each successive addition is in a more significant position in it which matches the fact that more and more significant digits are being stepped out of the shifting-factor register E. The digits that are being stepped out of the right hand end of the product register A meanwhile are going into the left hand end of the other product Register B.

If there were any digits in A to begin with, they are added to the product and shifted over into B along with it. In this addition they will take the sign of the product regardless of their original sign.

If there were any digits in B to begin with, they are shifted into E undisturbed and take no part in the multiplication. Letting *a*, *b*, *d* and *e* stand for the numbers that were in the four registers originally, after the multiplication, the contents will then be:

A and B contain *ed* plus *a* with the sign of *ed*
D contains *d*
E contains *b*

In carrying out this order the number in the E register is multiplied by the number in the D register. The answer is a double length product and is stored in the A and B registers. The absolute value of any number previously in A is considered as a positive number and is added to the absolute value of the product. The final answer has the sign of E times D. Any number previously in B goes to E and the number originally in E is lost.

The multiply order is picked up from the working channel and placed in the order register during sequence $\phi 0$ in the manner previously described. (It is assumed that the desired numbers have been placed in the A, D and E registers prior to this by execution of a suitable one of the copy as exchange orders herein described.) The computer then idles in sequence $\phi 1$, until P34, at which time $\underline{Q3}$ comes on by the term:

$$\underline{Q3}=O6O5O4\phi1P34$$

The sequence register then advances to $\phi 2$.

$$\underline{\phi1}=\phi1A2'A4'Q3C$$
$$\underline{\phi2}=\phi1A2'A4'Q3C$$

The computer remains in sequence $\phi 2$ for the remainder of the drum revolution until V1 (FIGURE 36) comes on as previously explained. $\underline{Q3}$ then comes on (FIGURE 34):

$$\underline{Q3}=O6O5O4V1P34\phi2(Z'+O3')$$
$$\underline{\phi2'}=\phi2Q3C$$
$$\underline{\phi3}=\phi2Q3C$$

The multiplication now takes two full drum revolutions to complete. At each half-revolution when signals V1 and P34 coincide, $\underline{Q3}$ is turned on to advance the sequence register $\phi$ (FIGURE 28).

$$\underline{Q3}=(O6O5O4V1P34)\phi3O2'+(O6O5O4V1P34)(\phi2'\phi3'\phi7')$$

Thus during $\phi 3$, $\phi 4$, $\phi 5$ and $\phi 6$ multiplication occurs. During $\phi 7$, which lasts for only one pulse time, the signs are adjusted.

The number in D is unchanged by the multiplication and merely recirculates, hence, there is no special logic involved.

The number in E shifts to the right once each word time. To accomplish this, E*d* is driven by E*e* instead of E*n* as in normal recirculation:

$$\underline{Ed}=O6O5O4O1\phi0'\phi1'\phi2'P0'P32'Ee$$

P0' is included in this expression because since P0 contains the sign digit it should not enter into the shifting. It undergoes the normal recirculation.

$$\underline{Ed}=O6EnO7'P0$$

During P1 of successive word times the various digits of B are picked up by the $\underline{S2}$ flip-flop (FIGURE 38).

$$\underline{S2}=BnP1C$$
$$\underline{S2}'=Bn'P1C$$

They are held in $\underline{S2}$ until P32 when they are inserted in E.

$$\underline{Ed}=O6O5O4O1\phi0'\phi1'\phi2'P32S2$$

Thus the digits of B are shifted into E until at the end of the multiplication E has been completely replaced by B.

As the digits of E are shifted out of the right hand end of the E register they are picked up and stored for one thirty-two digit number time interval in the $\underline{Sm}$ flip-flop as shown in FIGURE 44 and defined by:

$$\underline{Sm}=EeP0C$$
$$\underline{Sm}'=P32C$$

Essentially, the process of multiplication consists of either adding the number in D to the partially formed product in A once during every word time if there is one in $\underline{Sm}$ or not adding it if there is a zero in $\underline{Sm}$. Since A is being shifted constantly to the right into B, each successive addition is in a more significant position.

As explained in the section on addition, the carry flip-flop, in this case $\underline{Rm}$ (FIGURE 45), is turned on whenever there are ones in both $\underline{Ae}$ and $\underline{De}$ and is turned off whenever there are zeros in both $\underline{Ae}$ and $\underline{De}$. $\underline{Rm}$ is turned off at P34 since the carry flip-flop should not be on when beginning a new addition.

$$\underline{Rm}=AeDeP34'F1C$$
$$\underline{Rm}'=Ae'De'F1C+34C$$

If there is a zero in $\underline{Sm}$ then during the word time that it remains there, the number in A will merely shift to the right without having anything added to it since $\underline{Ad}$ is turned on by $\underline{Ae}$.

$$\underline{Ad}=O6O5O4O1\phi0'\phi1'\phi2'P0'P32'Sm'Ae$$

When $\underline{Sm}$ is on, indicating that the number in D is to be added to A, then the same mechanics that are employed in addition are employed. When there are an odd number of ones in $\underline{Ae}$, $\underline{De}$ and $\underline{Rm}$, a one is recorded in $\underline{Ad}$. When there are an even number of ones, a zero is recorded.

$$\begin{aligned}\underline{Ad}=&(O6O5O4O1\phi0'\phi1'\phi2'P0'P32'Sm)AeDeRm\\&+(O6O5O4O1\phi0'\phi1'\phi2'P0'P32'Sm)AeDe'Rm'\\&+(O6O5O4O1\phi0'\phi1'\phi2'P0'P32'Sm)Ae'DeRm'\\&+(O6O5O4O1\phi0'\phi1'\phi2'P0'P32'Sm)Ae'De'Rm\end{aligned}$$

During P0 the sign of A is recirculated.

$$\underline{Ad}=\phi7'O6O5AnP0$$

Any number previously in A is considered a positive number (regardless of its sign) and the product as it is formed is added to it.

During P32 the digit in A*e* is meaningless. The only time a one could be recorded for an answer is if $\underline{Sm}$ were on indicating an addition and if $\underline{Rm}$ were on indicating a carry from the last digit addition of $\underline{Ae}$ and $\underline{De}$.

$$\underline{Ad}=O6O5O4O1\phi0'\phi1'\phi2'P32SmRm$$

Each word time a digit of A is shifted into B this digit is the right hand digit of A and must be the digit that represents the sum of the first addition if one occurred. The digits that are in $\underline{An}$ and $\underline{En}$ at P1 are the same digits that were in $\underline{Ae}$ and $\underline{Ee}$ at P0. They represent the least significant digits of the numbers in A and E at the time.

If there is a zero in $\underline{En}$ at P1, it means that no addition between A and D is to take place during that word time and, hence, the least significant digit of A should be shifted into B unchanged. $\underline{S1}$ is the flip-flop that picks up this digit during P1 and holds it until P32, when it is placed in $\underline{Bd}$.

$$\underline{S1}=AnEn'P1C$$
$$\underline{S1}'=An'En'P1C$$

If, however, $\underline{En}$ contains a one, then the result of the addition between A and D must be stored in $\underline{S1}$. If there is a one only in $\underline{An}$ or $\underline{Dn}$ at P1, then S1 is turned on. If there are ones in both $\underline{An}$ and $\underline{Dn}$, or in neither $\underline{An}$ and $\underline{Dn}$ at P1, $\underline{S1}$ is turned off, thus carrying a zero as the result of the addition. If they were both ones, however, the carry flip-flop R*m* would go on.

$$\underline{S1}=AnDn'EnO1P1C+An'DnEnO1P1C$$
$$\underline{S1}'=AnDnEnO1P1C+An'Dn'EnO1P1C$$

$\underline{Bd}$ is constantly recirculating and shifting to the right. This is accomplished by driving $\underline{Bd}$ from $\underline{Be}$.

$$\underline{Bd}=O6O5O4O1\phi1'\phi2'P0'P32'Be$$

At P32 the digit from A that is stored in S1 is inserted in B.

$$\underline{Bd}=O6O5O4O1\phi0'\phi1'\phi2'P0'P32S1$$

At P0 the sign digit is entered in $\underline{Bd}$. It is recorded from $\underline{Bn}$ since it does not shift.

$$\underline{Bd}=O6\phi7'P0Bn$$

The multiplication lasts for two drum revolutions or thirty-two word times. At the end of each half drum revolution the sequence register advances. At the end of $\phi3$ the Q3 driver comes on by the term:

$$\underline{Q3}=O6O5O4O2'\phi3V1P34$$

The sequence register is advanced by the term:

$$\underline{\phi3'}=S'\phi Q3C$$
$$\underline{\phi4}=S'\phi3Q3C$$

Q3 comes on at the end of the three remaining half drum revolutions by the term:

$$\underline{Q3}=O6O5O4\phi2'\phi3'\phi7'V1P34\phi0'$$

The sequence register is advanced by the Q3C term in each case.

By the end of $\phi6$ the multiplication has been completed and during $\phi7$, which lasts for only one digit time, the signs are adjusted.

The number in E (which was previously in B) is given the sign of B.

$$\underline{Ed}=O6O5O4O1\phi7Bn$$

The double length product in A and B is given the algebraic sign of the multiplication of D and E.

$$\underline{Ad}=O6O5O4O1\phi7EnDn+O6O5O4O1\phi7En'Dn'$$
$$\underline{Bd}=O6O5O4O1\phi7EnDn+O6O5O4O1\phi7En'Dn'$$

At the end of P0 the sequence register is reset by the term Q4C. Q4 comes on at P0 by the term:

$$\underline{Q4}=O6O5O4\phi7P0$$

ADDITION AND SUBTRACTION

There are four orders that can be employed to perform addition and subtraction. These are:

| | |
|---|---|
| 010100 | $-A-W$ |
| 010101 | $-A+W$ |
| 010110 | $+A-W$ |
| 100111 | $+A+W$ |

Four orders were provided instead of just two to allow greater flexibility in coding.

The process of addition as used in the computer will be briefly described. The addition of two numbers A*n* and W*n* is shown below:

| | | | | | | | | |
|---|---|---|---|---|---|---|---|---|
| 0 | 0 | 1 | 1 | 1 | 1 | 0 | 0 | R*a* (carry) |
| 0 | 1 | 0 | 1 | 1 | 0 | 1 | 0 | W*n* |
| 1 | 0 | 0 | 1 | 0 | 1 | 1 | 0 | A*n* |
| 1 | 1 | 1 | 1 | 0 | 0 | 0 | 0 | Sum |

The carries are held in a flip-flop $\underline{Ra}$. This carry flip-flop is turned on whenever there are ones in both $\underline{Wn}$ and $\underline{An}$ and is turned off whenever they are both zero. A zero is recorded for an answer whenever there are no ones or an even number of ones in $\underline{Wn}$, $\underline{An}$ and $\underline{Ra}$. Conversely, a one is recorded for an answer whenever there is an odd number of ones.

The following example shows the case where $\underline{An}$ is being subtracted from $\underline{Wn}$.

| | | | | | | | | |
|---|---|---|---|---|---|---|---|---|
| 0 | 0 | 1 | 1 | 1 | 1 | 0 | 0 | R*a* (borrow) |
| 1 | 0 | 1 | 0 | 1 | 0 | 0 | 1 | W*n* |
| 1 | 0 | 0 | 1 | 1 | 0 | 1 | 0 | A*n* |
| 0 | 0 | 0 | 0 | 1 | 1 | 1 | 1 | Difference |

In this case the carry flip-flop ($\underline{Ra}$) becomes a borrow flip-flop. $\underline{Ra}$ is turned on whenever there is a zero in $\underline{Wn}$ and a one in $\underline{An}$ and is turned off whenever there is a one in $\underline{Wn}$ and a zero in $\underline{An}$. A zero is recorded for an answer whenever there are no ones or an even number of ones in $\underline{Wn}$, $\underline{An}$ and $\underline{Ra}$. Conversely, a one is recorded for an answer whenever there is an odd number of ones.

Now ones and zeros are recorded as answers for precisely the same set of conditions for both addition and subtraction. This greatly simplifies construction. The only difference is that in subtraction the carry flip-flop is made a borrow flip-flop and is turned on and off by different logic from that used in addition.

In addition one of the two numbers being added is always held in the A register or accumulator. The other number is selected from one of the working channels by the address register and is referred to as "W." W will be unchanged by the addition. A will be replaced with one of four things; $A+W$, $A-W$, $-A+W$ or $-A-W$ depending on which of the four following orders are given:

| | | |
|---|---|---|
| A+W | ORDER: | WA, Add W to A. |
| A−*W* | | WS, Subtract W from A. |
| $-A+W$ | | WW, Subtract W from A and then negate A i.e. negate the sum. |
| $-A-W$ | | W−, Add W to A and then Negate A. |

The binary numbers A and W are simultaneously read off the drum one digit at a time with the least significant digits first, i.e, from right to left. The first digits to be read off are the sign digits or the digits that tell whether A and W are positive or negative since they are least significant digits. When the sign digits are read they are compared with the order to be carried out to determine the *net* sign of A and W. Thus if the order was $-A-W$, and A was positive and W was negative the net sign of A would be minus but the net sign of W would be plus.

If the net signs are the same the answer will of necessity have that sign. Therefore, it is recorded as the new sign digit of A, and A and W are simply added to get the rest of the new A.

If the net signs are opposite the machine then makes the arbitrary assumption that W is the larger number and the sign of W is automatically written as the new sign of A. A is then subtracted from W. In the binary system it is easier to subtract than it is to complement-and-add so the subtraction is straightforward. However, if the borrow flip-flop is still on when the machine has finished with the most significant digit, it is then known that the assumption about W being larger than A was false.

Actually, the A register now holds the complement of the correct A prefixed with the wrong sign. Since A is kept in a one word recirculating register this situation will no sooner have been detected until the new A is read off the drum again. Therefore, as is explained in the following paragraphs, the sign of A is changed; all the ones are turned into zeros; all the zeros are turned into ones; and the borrow flip-flop is used to add one to the least significant digit, thus yielding the correct answer for A.

*Overflow*

Whenever an addition is to be performed which might involve such large numbers as to overflow the accumulator, it should be followed by a conditional skip coded into the problem. Whenever an overflow does occur, a special flip-flop called the overflow flip-flop is turned on. If this happens and a conditional skip has been coded into the problem, control will be transferred to a section of the routine which takes the proper scaling down action. If this precaution has not been observed and a supposedly "safe" addition turns on the overflow flip-flop, it will remain on. The next time an addition is performed (or any other operation that could possibly turn on the overflow flip-flop) an alarm bell will ring and the machine will stop.

If an overflow addition is performed all the digits but the most significant one will be recorded correctly. The presence of the most significant one can be inferred from the overflow, and when the scaling is adjusted it may be reinserted.

The steps the computer follows in carrying out these operations will be presented now.

During sequence $\phi0$, the order is read into the order register. As explained before in connection with the description of the "no address system," during sequence $\phi2$, the address is read into the address register. During $\phi3$ the computer searches for the word whose address is in the address register. When it has been found $Vn$ (FIGURE 40) is on at P34 and Q3 (FIGURE 31) comes on.

$$\underline{Q3}=O6'O5P34\phi3Vn$$

The computer then advances to sequence $\phi4$ by Q3C.

Sequence $\phi4$ lasts for one word time and it is during this interval that the addition is performed. $Wn$ is the driver that presents the word in the working channel whose address is in the address register N (FIGURE 29). For the orders $A+W$ and $-A+W$ if the sign of W is plus then a plus is recorded for the sum, if it is a minus then a minus is recorded.

$$\underline{Ad}=O5O4'O3\phi4P0O1Wn$$

If the net signs of A and W are the same, then of necessity the correct sign of the sum will be the same as that of W. If the net signs are different, the sign associated with the sum will be correct only if W is greater than A.

For the orders $A-W$ and $-A-W$ if the sign of W is plus then a minus is recorded for the sum, if it is a minus then a plus is recorded for the sum.

$$\underline{Ad}=O5O4'O3\phi4P0O1'Wn'$$

This again means that if the net sign of W is positive a plus is recorded for the sum. If the net sign of A is the same as that of W then the sign recorded for the sum is correct. If the net sign of A is different from that of W then the sign digit is correct only if W is greater than A.

$\underline{Sa}$ (FIGURE 42) is the flip-flop that is used to indicate when a subtraction is to take place. A subtraction will occur whenever the net signs of A and W are opposite. Thus for the order $A+W$ the net signs will be opposite if W is minus and A is plus or if W is plus and A is minus.

$$\underline{Sa}=(O5O4'O3O2O1P0C\phi4)Wn'An + (O5O4'O3O2O1P0C\phi4)WnAn'$$

For the order $A-W$ the net signs will be opposite if the signs of A and W are the same.

$$\underline{Sa}=(O5O4'O3O2O1'P0C\phi4)WnAn + (O5O4'O3O2O1'P0C\phi4)Wn'An'$$

Also for the order $-A-W$ the net signs will be opposite if the signs of A and W are not alike.

$$\underline{Sa}=(O5O4'O3O2'O1'P0C\phi4)Wn'An + (O5O4'O3O2'O1'P0C\phi4)WnAn'$$

For the order $-A+W$ the net signs will be opposite if the signs of A and W are alike.

$$\underline{Sa}=(O5O4'O3O2'O1P0C\phi4)Wn'An' + (O5O4'O3O2'O1P0C\phi4)WnAn$$

$\underline{Ra}$ is used as the carry flip-flop. If $\underline{Sa}$ is off it means that A and W are to be added together. During addition, $\underline{Ra}$ is turned on whenever there are ones in both $\underline{An}$ and $\underline{Wn}$ and is turned off whenever they are both zero. It is always turned of at P34.

$$\underline{Ra}=\phi4P0'F5'F1Sa'CWnAn$$
$$\underline{Ra'}=\phi4P0'F5'F1Sa'CWn'An'+P34C$$

If $Sa$ is on, it means that $\underline{An}$ is to be subtracted from $Wn$. In this case $\underline{Ra}$ becomes a borrow flip-flop. $\underline{Ra}$ is turned on whenever there is a zero in $\underline{Wn}$ and a one in $\underline{An}$ and is turned off whenever there is a one in $\underline{Wn}$ and a zero in $\underline{An}$.

$$\underline{Ra}=\phi4P0'F5'F1SaCWn'An$$
$$\underline{Ra'}=\phi4P0'F5'F1SaCWnAn'$$

$\underline{Ad}$ will be turned on indicating a one whenever there is an odd number of ones in $\underline{An}$, $\underline{Wn}$ and $\underline{Ra}$ and will be off when there are no ones or an even number of ones in $\underline{An}$, $\underline{Wn}$ and $\underline{Ra}$.

$$\underline{Ad}=(O5O4'O3P0'\phi4)RaAnWn + (O5O4'O3P0'\phi4)RaAn'Wn' + (O5O4'O3P0'\phi4)Ra'AnWn' + (O5O4'O3P0'\phi4)Ra'An'Wn$$

After an addition is complete, the computer will reset to sequence $\phi0$.

$$\underline{Q4}=O6'O5\phi4P34Sa'$$

The computer will also reset to $\phi0$ if the borrow flop-flop is off after a subtraction, indicating W was greater than A.

$$\underline{Q4}=O6'O5\phi4P34Ra'$$

Q4C, it will be recalled, is the signal that resets the sequence register $\phi$.

If, after a subtraction is complete, the borrow flip-flop $\underline{Ra}$ is still on, it means the assumption that W is larger than A was wrong. In this case $\underline{Q3}$ comes on and the sequence register advances to sequence $\phi5$.

$$\underline{Q3}=O6'O5P34\phi4RaSa$$

To obtained the correct answer, the sign of A is changed, the number in A is complemented and $\underline{Ra}$ is used to add one to the answer.

$\underline{Ra}$ is turned on during P0 if sequence $\phi5$ is reached since it is desired to add one to the number in A.

$$\underline{Ra}=\phi4'P0C$$

It is turned off after the first one occurs in A.

$$\underline{Ra}=\phi4'AnP0'F1C$$

To obtain the complement of A and to add one to the result, a one is recorded in $\underline{Ad}$ *if* $\underline{Ra}$ and $\underline{An}$ are both plus or both minus.

$$\underline{Ad}=O6'\phi5RaAn+O6'\phi5Ra'An'$$

During P34 the Q4 driver comes on and at the end of P34 the sequence register is reset to $\phi 0$.

$$\underline{Q4}=O6'O5P34\phi 5$$

011000 Copy W to A Under Control of D

This order causes the specified word to be copied into A in only those digits in which there is a one in D. A remains the same where there are zeros in D.

During sequence $\phi 0$, the order is read into the order register O as previously explained with reference to FIGURE 27. During $\phi 2$, the address is read into the address register N as previously explained with reference to FIGURE 29 and during $\phi 3$ this word is located. The mechanics of this sequence of operations have been described previously, and is the same for all orders followed by the address of a word.

The computer goes into sequence $\phi 4$ as soon as the coincidence has been established.

$$\underline{Q3}=O6'O5P34\phi 3Vn$$
$$\underline{\phi 4}=S'\phi 3Q3C$$

During $\phi 4$ a one will be copied into A from W (via W*n*, FIGURE 41) whenever there is a one in the corresponding position in D.

$$\underline{Ad}=O5O4O3'O2'O1'\phi 4WnDn$$

If there is a zero in W and a one in D, then a zero will be recorded in A.

If there is a zero in D, then the corresponding digit in A will be recirculated.

$$\underline{Ad}=O5O4O3'O2'O1'\phi 4AnDn'$$

Q4 comes on at the end of P34.

$$\underline{Q4}=O6'O5\phi 4P34Sa'$$

The S*a*' term is always off since during this order the computer is not subtracting.

011001 Copy W to A

This order causes the word in the working channel H—I or JK to be copied into A.

W is looked up in the same manner as described for the previous order. During sequence $\phi 4$, $\underline{Ad}$ receives its information from $\underline{Wn}$ (FIGURE 41), thus copying W into A.

$$\underline{Ad}=O6'O5O4O1\phi Wn$$

At the end of P34 the computer resets to $\phi 0$.

011010 Copy W to D

This order causes the word in the working channel to be copied into D. It is the same as the previous order except that $\underline{Wn}$ is copied into D instead of A.

$$\underline{Dr}=O6'O5O4O2O1'F1C\phi 4Wn$$
$$\underline{Dr'}=O6'O5O4O2F1C\phi 4Wn'$$

011011 Exchange W and A

The information in A is exchanged with that in the specified word W.

This order is very similar to the one in which W is copied into A (011001) with the exception that A is also copied into W at the same time. The word in W is copied into A by the same term:

$$\underline{Ad}=O6'O5O4O1\phi 4Wn$$

During $\phi 4$, the Q7 flip-flop is turned on.

$$\underline{Q7}=O6'O5O3'O2O1\phi 4F1'C$$

It is on only during the F1 pulses and is turned off during F1' pulses.

$$\underline{Q7'}=F1C$$

A is copied into the particular H, I, J or K recirculating line (FIGURES 24 and 25) depending on the location of the desired word. If the biplexed word is found in the P pulses, N3 is on and it is recorded one flip-flop sooner in the recirculating line.

$$\underline{H2}=\theta n'N3N8'CQ7O4An$$
$$\underline{H2'}=\theta n'N3N8'CQ7O4An'P33'$$
$$\underline{H3d}=\theta n'N3'N8Q7O4An$$
$$\underline{I2}=\theta nN3N8'CQ7O4An$$
$$\underline{I2'}=\theta nN3N8'CQ7O4An'P33'$$
$$\underline{I3}=\theta nN3'N8'CQ7O4An$$
$$\underline{I3'}=\theta nN3'N8'CQ7O4An'P33'$$
$$\underline{J2}=\theta n'N3N8CQ7O4An$$
$$\underline{J2'}=\theta n'N3N8CQ7O4An'P33'$$
$$\underline{J3d}=\theta n'N3'N8'Q7O4An$$
$$\underline{K2}=\theta nN3N8CQ7O4An$$
$$\underline{K2'}=\theta nN3N8CQ7O4An'P33'$$
$$\underline{K3}=\theta nN3'N8CQ7O4An$$
$$\underline{K3'}=\theta nN3'N8CQ7O4An'P33'$$

At the end of the word time the sequence register is reset to sequence $\theta 0$ as in the other orders.

011100 Turn on the Overflow if A is Less than W

This order will cause the overflow flip-flop to be turned on if the absolute value of the number in A is less than the absolute value of the number in W.

The computer goes into sequence $\phi 4$ as described for the orders just described. During $\phi 4$ if there is a one in W and a zero in A, Z will be turned on since the digit of W is greater than that of A.

$$\underline{Z}=O6'O4O3\phi 4P0'F5'F1CWnAn'$$

If the digit in A is greater than that in W the overflow flip-flop is turned off.

$$\underline{Z'}=O6'O4O3\phi 4P0'F5'F1CWn'An$$

Thus at the most significant end of the word, Z will be on if A is less than W.

Q4 comes on at the end of P34 to provide the reset signal.

010000 Logically Multiply A and W

In this order, the number in A is compared with the number in the specified word. If there is a one in A and a one in W, then a one is recorded in A. If there is a zero in A or in W then a zero is recorded in A.

The computer goes into sequence $\phi 4$ as in the last series of orders. A one is entered in $\underline{Ad}$ during all digit times when there is a one in both A and W. If there is a zero in either A or W, then $\underline{Ad}$ is not turned on thus entering a zero.

$$\underline{Ad}=O5O4'O3'O2'O1'\phi 4AnWn$$

The computer resets at the end of P34.

010001 Copy a Designated Syllable of W into A

This order causes a designated syllable of W to be copied into A. The syllable will occupy the same relative position in A that it occupied in its original word.

The computer sequences into $\phi 4$ in the same manner as in the orders involving word copying. $\underline{Q6}$ is the flip-flop that comes on during the desired syllable. $\underline{F2}$ and $\underline{F3}$ define the various syllable times. $\underline{N1}$ and $\underline{N2}$ designate what syllable is desired. $\underline{Vn}$ insures that Q6 will be on only when coincidence is with the correct word made. The F4' term is included since the F2F3' diode gate is on during P0 which is undesirable.

$$\begin{aligned}\underline{Q6}=&(VnF1'F5'C)F2'F3'N1N2\\&+(VnF1'F5'C)F4'F2F3'N1'N2\\&+(VnF1'F5'C)F2'F3N1N2'\\&+(VnF1'F5'C)F2F3N1'N2'\end{aligned}$$

$\underline{Q6}$ is turned off at the end of the F1 pulses.

$$\underline{Q6'}=F1C$$

When $\underline{Q6}$ is off $\underline{An}$ is merely copied into $\underline{Ad}$.

$$\underline{Ad}=O5O4'O3'O2'O1\phi 4AnQ6'$$

During the appropriate syllable, when $\underline{Q6}$ is on, the corresponding syllable of W is copied.

$$\underline{Ad}=O5O4'O3'O2'O1\phi 4WnQ6$$

At P34, Q4 comes on and the computer then resets to $\phi 0$.

010011 Copy a Designated Syllable of A into W

During this order a syllable in A is copied into a designated syllable of W. The syllable will occupy the same relative position in both A and W.

The computer goes into sequence $\phi 4$ as in the orders just described. As soon as the computer is in $\phi 4$, the $\underline{Q7}$ flip-flop comes on during the P pulses and is off during the E pulses.

$$\underline{Q7}=O6'O5O3'O2O1\phi 4F1C$$
$$\underline{Q7}'=F1C$$

Q6 again comes on at the designated syllable as explained in the last order. At this point $\underline{An}$ is copied into the desired H, I, J, or K recirculating line as chosen by $\theta n$ and N8. N3 specifiies which half of the biplexed word is to be used.

$$\underline{H2}=\theta n'N3N8'CQ7Q6An$$
$$\underline{H2'}=\theta n'N3N8'CQ7Q6An'P33'$$
$$\underline{H3d}=\theta n'N3'N8'Q7Q6An$$
$$\underline{I2}=\theta nN3N8'CQ7Q6An$$
$$\underline{I2'}=\theta nN3N8'CQ7Q6An'P33'$$
$$\underline{I3}=\theta nN3'N8'CQ7Q6An$$
$$\underline{I3'}=\theta nN3'N8'CQ7Q6An'P33'$$
$$\underline{J2}=\theta n'N3N8CQ7Q6An$$
$$\underline{J2'}=\theta n'N3N8CQ7Q6An'P33'$$
$$\underline{J3d}=\theta n'N3'N8Q7Q6An$$
$$\underline{K2}=\theta nN3N8CQ7Q6An$$
$$\underline{K2'}=\theta nN3N8CQ7Q6An'P33'$$
$$\underline{K3}=\theta nN3'N8CQ7Q6An$$
$$\underline{K3}'=\theta nN3'N8CQ7Q6An'P33'$$

At P34, Q4 comes on and the computer then resets to $\phi 0$.

110010 Conditional Skip

If the overflow flip-flop $\underline{Z}$ (FIGURE 39) is on this order causes the next order to be taken from any specified syllable in the working channels as specified by the address. If $\underline{Z}$ is off continue in the regular list of orders. The overflow flip-flop $\underline{Z}$ will be off at the conclusion of this order.

During sequence $\phi 0$ of this order, the order is read into the order register O (FIGURE 27). During $\phi 2$ the address is read into the address register N (FIGURE 29) and during sequence $\phi 3$ the computer idles until the next P34. At P34 during sequence $\phi 3$, if $\underline{Z}$ is not on, the sequence register $\phi$ will be reset to $\phi 0$ by Q4 thus terminating the order.

$$\underline{Q4}=O6O5O4'O1\phi 3P34Z'$$

If $\underline{Z}$ is on at P34 during sequence $\phi 3$, the $\underline{Q3}$ driver will come on.

$$\underline{Q3}=O6O5O4'P34\phi 3(Z+01)$$

The sequence register will then be advanced to $\phi 4$ by Q3C.

Following P0 of sequence $\phi 4$, the overflow flip-flop Z is reset to zero.

$$\underline{Z}'=O6O5O4'O1'\phi 4P0C$$

Since the address register N (FIGURE 29) contains the address giving the new position where the order-address register is to start counting this order is carried out by transferring the contents of the address register N to the order address register L (FIGURE 27).

$$\underline{Ln}=(O6O5O4'\phi 4F5'C)Nn$$
$$\underline{Ln}'=(O6O5O4'\phi 4F5'C)Nn'$$

In this case "$n$" is used to designate all integers from zero to eight since all eight flip-flops in the L register are set.

At P34, the $\underline{Q4}$ driver comes on by the term:

$$\underline{Q4}=O6O5O4'P34\phi 4$$

The sequence register is then reset to $\phi 0$ by Q4C.

110011 Unconditional Skip

This order is similar to the last order except that the next order is always taken from the specified syllable regardess of whether $\underline{Z}$ is on or not. This means that the computer will always sequence into $\phi 4$ since O1 is on.

$$\underline{Q3}=O6O5O4'P34\phi 3(Z+O1)$$

The remainder of the order is carried out in the same way as for the conditional skip order.

100001 Read in Four Binary Digits

This order causes four binary digits, corresponding to one decimal digit, to be read from either the typewriter or tape reader of the input-output unit 150 into the four significant denominational orders of the A register.

During sequence $\phi 0$, the order is read into the order register O, as previously explained with reference to FIGURE 27. During $\phi 1$, the computer idles until the $\underline{Gr}$ and $\underline{G0}$ one shots are relaxed. $\underline{Gr}$ (FIGURE 47) is fired by an input and $\underline{G0}$ (FIGURE 48) is fired by an output. A voltage $Cr$ from the electric typewriter must be present indicating that the machine is not in the process of a carriage return. This voltage is supplied by the input-output apparatus as previously described. When these conditions are satisfied $\underline{Q3}$ will come on by operation of the input circuitry set forth in FIGURE 31 and defined by:

$$\underline{Q3}=O6O5'O4'O3'\phi 1Gr'G0'Q9'Cr$$

The computer will then advance to sequence $\phi 2$ by the Q3 signal as may be seen from FIGURE 28.

During sequence $\phi 2$ the $\underline{Td}$ driver fires under control of the input circuits shown in FIGURE 47 and defined by:

$$\underline{Td}=O6O5'O4'O3'\phi 2Gr'$$

T$d$ starts the read mechanism in the electric typewriter if tape is being read. Any tape finger coming up will produce a voltage on the corresponding output lead from the tape reader. These voltages are designated by $t1$, $t2$, $t3$, $t4$, $t5$ and $t6$ (FIGURE 47). T$d$ normally causes the lamp 176 (FIGURE 1) to light on the typewriter control panel. The manner in which $\underline{Td}$ controls the typewriter and tape reader, and the production of the voltages $t1$–$t6$, will be obvious from the earlier description of the input-output apparatus and the prior patents therein referred to. The $\underline{Gr}$ one-shot is fired as soon as any tape-sensing finger finds a hole in the tape, as may be seen from FIGURE 47 and as defined by:

$$\underline{Gr}=(t1+t2+t3+t4+t5+t6)C$$

The various voltage inputs trigger on the corresponding flip-flops $\underline{T1}$, $\underline{T2}$, $\underline{T3}$ and $\underline{T4}$ through the circuits shown in FIGURE 47 which are defined by:

$$\underline{T1}=t1C$$
$$\underline{T2}=t2C$$
$$\underline{T3}=t3C$$
$$\underline{T4}=t4C$$

Q9 is turned on by the following term:

$$\underline{Q9}=GrV0P34C$$

V0P34C occurs at each half drum revolution. By the following V0P34C, all the T flip-flops whose inputs are energized should have come on and the computer sequences to $\phi 3$.

$$\underline{Q3}=O6O5'O4'O3'\phi 2V0P34Q9(T1'+T2'+T3'+T4'+T5'+T6')$$

The last "or" term is for a code delete when all holes in the tape are punched. In this case the computer remains in sequence $\phi 2$ because $\underline{Q3}$ will not come on. If the unperforated tape leader is in the reader, $\underline{Gr}$ will not fire, $\underline{Q9}$ will not come on and the computer stays in sequence $\phi 2$ and advances the tape.

During P1 of sequence $\phi 3$, $\underline{T1}$ is read into the A register through $\underline{Ad}$.

$$\underline{Ad}=O6O5'O4'O3O1\phi 3T1P1$$

During P2, T2 is read into A.

$$\underline{Ad}=O6O5'O4'O3O1\phi 4T2F4'$$

$\underline{Q3}$ comes on during P2.

$$\underline{Q3}=O6O5'O4'O3'\phi 0'\phi 1'\phi 2'F1F4'\phi 7'$$

At the clock fall after P2 the Q3C term advances the computer to $\phi 4$. During $\phi 4$ which lasts only during P3, T3 is read into A.

$$\underline{Ad}=O6O5'O4'O3'O1\phi 4T3$$

The computer then advances to sequence $\phi 5$ by the term for Q3 given above the $\underline{T4}$ is read into A.

$$\underline{Ad}=O6O5'O4'O3'O1\phi 5T4$$

The computer then sequences to $\phi 6$ and $\phi 7$. At $\phi 7$ it resets to $\phi 0$.

$$\underline{Q4}=O6O5O4\phi 7F1$$

100011 Read in Six Digits

This order is similar to the previous input order except that six digits are read in instead of four. This is accomplished during sequence $\phi 2$ when $\underline{T5}$ and $\underline{T6}$ as well as $\underline{T1}$, $\underline{T2}$, $\underline{T3}$ and $\underline{T4}$ are read in.

$$\underline{T5}=t5C$$
$$\underline{T6}=t6C$$

During sequence $\phi 6$ and $\phi 7$ these digits are read into A.

$$\underline{Ad}=O4'O3'O2O1\phi 6T5$$
$$\underline{Ad}=O4'O3'O2O1\phi 7T6$$

100010 Read in Sign Digit

This order reads in a plus or minus sign. A one is recorded during P0 in A if the sign is plus. This order is again carried out as for the previous tape orders except that the digit in $\underline{T1}$ is read in A during $\phi 3$.

$$\underline{Ad}=O6O5'O4'O3'O2O1'\phi 3P0T1$$

During the other sequences the digits in A are merely recirculated.

$$\underline{Ad}=O5'O4'O3'O1'AnP0'$$

100101 Read Out Four Digits

This order is used to take numbers from the computer. As will be explained, the four least significant digits in the A register are read out as a decimal number to operate the typewriter or punch the four digits on the tape.

During sequence $\phi 0$ the order is read into the order register O in the manner previously explained with reference to FIGURE 27. During $\phi 1$, the computer idles until the $\underline{G0}$ (FIGURE 48) one-shot has relaxed and $Cr$ (the carriage return voltage signal) is on. The computer then sequences to $\phi 2$ at P34 under control of $\underline{Q3}$ as shown in FIGURE 28. The control for $\underline{Q3}$ is defined by:

$$\underline{Q3}=O6O4'O3\phi 1P34G0'Cr$$

When the computer reaches $\phi 2$ the $\underline{Gs}$ one-shot is fired which starts the punch mechanism.

$$\underline{Gs}=O6O4'O3\phi 2C$$

$\underline{Gs}$ lasts for about 60 milliseconds. As soon as $\underline{Gs}$ comes on, it triggers the $\underline{G0}$ one-shot which lasts for 130 milliseconds. The $\underline{G1}$ one-shot which actuates the corresponding punch will come on during $\phi 2$ if there is a one in $\underline{An}$ during P1.

$$\underline{G1}=O6O4'O3O1AnF1CP1\phi 2$$

The manner in which the above described apparatus operates to control the punching operation will be apparent from a consideration of the earlier description of the input-output mechanism and the prior patents therein referred to. The computer sequences every digit time by the term until $\phi 7$.

$$\underline{Q3}=O6O4'O3\phi 0'\phi 1'P0'F1\phi 7'$$

During sequences $\phi 3$, $\phi 4$ and $\phi 5$, the $\underline{G2}$, $\underline{G3}$ and $\underline{G4}$ one-shots are fired if there is a one in $\underline{An}$ during P2, P3 and P4, respectively.

$$\underline{G2}=O6O4'O3O1AnF1C\phi 3$$
$$\underline{G3}=O6O4'O3O1AnF1C\phi 4$$
$$\underline{G4}=O6O4'O3O1AnF1C\phi 5$$

During sequence $\phi 7$ a hole will be punched in the number six position if $\underline{G4}$ is off or if $\underline{G3}$ and $\underline{G2}$ are off.

$$\underline{G6}=O6O4'O3F1C(G4'+G3'G2')\phi 7O2'$$

Also during $\phi 7$ the computer resets to sequence $\phi 0$.

$$\underline{Q4}=O6O5'O4'\phi 7F1$$

100111 Read Out Six Digits

This order is used to take letters from the computer. This order causes the letter to be typed or the six least significant digits in the A register to be punched on the tape. It is carried out as in the previous order except during sequences $\phi 6$ and $\phi 7$ the digits in A$n$ at P5 and P6 are also read.

$$\underline{G5}=O6O4'O3O2O1AnF1C\phi 6$$
$$\underline{G6}=O6O4'O3O2O1AnF1C\phi 7$$

100110 Read Out Sign Digit

This order causes the sign digit to be read out. It operates the same as the other orders except that only the code for the sign digit is set up. This means that G1 is turned on during P0 and G5 is turned on during P5 if a plus is to be read out or only during P5 if a minus is to be read out.

$$\underline{G1}=O6O4'O3O1'AnP0\phi 2C$$
$$\underline{G5}=O6O4'O3O1'F1C\phi 6$$

111010 Shift A Right Eight Digits

In this order A is shifted right eight digits. Digits leaving the right hand end come back in the left hand end. The sign digit does not shift.

The computer sequences from $\phi 1$ to $\phi 2$ by the term:

$$\underline{Q3}=O6O5O4\phi 1P34$$

The computer then idles until V1P34 when it goes into sequence $\phi 3$.

$$\underline{Q3}=O6O5O4V1P34\phi 2(Z'+O3')$$

During $\phi 3$ the sign digit is not modified.

$$\underline{Ad}=O6O5\phi 7'AnP0$$

During the digits from P1 to P31 the word in A is made to shift right one digit each word time by making the recirculation line one digit shorter.

$$\underline{Ad}=O6O5O4O2\phi 3P0'P32'Ae$$

The S1 flip-flop picks up the digit that was shifted off the right hand end of A and stores it.

$$\underline{S1}=AnO1'P1C$$
$$\underline{S1}'=An'O1'P1C$$

During P32 the digit in $\underline{S1}$ is reinserted in the left hand of A.

$$\underline{Ad}=O6O5O4O2\phi 3P32S1$$

The computer remains in sequence $\phi 3$ until V1P34 occurs again eight word times later at which time A has shifted right eight digits. Q4 comes on at this time and the computer is reset to sequence $\phi 0$.

$$\underline{Q4}=O6O5O4V1P34O2\phi 3$$

101010 Copy the Slave Into a Designated Channel

This order causes the complete information in the working channel designated as the slave to be copied into the channel in the main memory whose address is in the address register.

During $\phi0$, the order is read into the order register O and during $\phi2$ the address is read into the address register N as in the previous orders followed by addresses. However, in this case the search must be made for a channel and this is done in sequence $\phi3$.

Y1 (FIGURE 43) is the "search" flip-flop. It is turned on by pressing a search button $\underline{Sh}$ or during $\phi3$ of this order.

$$\underline{Y1}=Sh'+O6O5'O4\phi3CV0P34$$

It is turned off when the proper channel has been found.

$$\underline{Y1}'=Y0Q2V0P34C$$

Y0 is the flip-flop that tells when the proper channel has been found. It goes on every V0P34 and is turned off whenever N1 (FIGURE 29) does not correspond to the digits $\underline{Mr}$ (FIGURE 46) during P34V0' or is not opposite to $\underline{Mr}$ during E34V0'.

Q2 is a flip-flop that gets turned on only at V0P34C during a search. If at the end of the next V0P34C, Y0 is not still on, Q2 will go off. In going off Q2 transmits a negative pulse to one-shot $\underline{Gm}$ which in turn fires one-shot $\underline{Dc}$ associated with the stepping switches $\underline{Ss}$ (FIGURE 46). This one-shot $\underline{Dc}$ closes a relay which applies power to the stepping motor. As soon as the one-shot goes off, the power relay opens, the stepping armature returns to normal, and the wipers of switch Ss (FIGURE 46) move one step to a new set of contacts. When the power relay is open and the stepping armature is back in normal position a signal Dc' Gm' is sent to the logic section. This is the sign for $\underline{Q2}$ to try again. $\underline{Q2}$ goes on and off, the one-shot is triggered and so on until the right channel has been found. At this time $\underline{Q2}$ will not go off and the search is complete.

$$\underline{Q2}=Y1V0P34CQ2'Dc'Gm'$$
$$\underline{Q2}'=Y0'Y1V0P34CQ2+Q4C$$

During sequence $\phi3$, the slave is copied into channel 65. $\underline{M6}$ (FIGURE 46) is the flip-flop that records zeros in the check channel and $\underline{M7}$ records ones.

$$\underline{M6}=(O6O5'O4O3'\phi3C)(He'Q8')+(O6O5'O4O3'\phi3C)(Je'Q8)+\phi4C$$
$$\underline{M6}'=(O6O5'O4O3'\phi3C)(HeQ8')+(O6O5'O4O3'\phi3C)(JeQ8)$$
$$\underline{M7}=(O6O5'O4O3'\phi3C)(HeQ8')+(O6O5'O4O3'\phi3C)(JeQ8')+\phi4C$$
$$\underline{M7}'=(O6O5'O4O3'\phi3C)(He'Q8')+(O6O5'O4O3'\phi3C)(Je'Q8)$$

The computer goes out of sequence $\phi3$ during the first V0F'P34 when Y0 is on.

$$\underline{Q3}=O6O5'O4F'V0P34Y0\phi3$$

During sequence $\phi4$ the computer idles. It is advanced to sequence $\phi5$ by the term:

$$\underline{Q3}=O6O5'O4F'V0P34\phi0'\phi1'\phi2'\phi3'A2'O3'\phi6'$$

During sequence $\phi5$, the slave is compared with Mr to check for altered words. The $\underline{X1}$ flip-flop checks one of the biplexed words and the $\underline{X2}$ flip-flop checks the other word.

$$\underline{X1}=P33C$$
$$\underline{X1}'=(H2'Q8'Mr)(F5'F1C)\phi7'+(J2'Q8Mr)(F5'F1C)\phi7'+(H2Q8'Mr')(F5'F1C)\phi7'+(J2Q8Mr')(F5'F1C)\phi7'$$
$$\underline{X2}=P34C$$
$$\underline{X2}'=[(F1'+F3+F4')(F2+F5')](F1'C)[(MrH2'Q8')+(MrJ2'Q8)+(Mr'H2Q8')+(Mr'J2Q8)]\phi7'$$

If $\underline{X1}$ or $\underline{X2}$ is off during P33 the $\underline{A2}$ alarm flip-flop will be turned on.

$$\underline{A2}=(O6O5'O4O3'\phi5\phi7'X1'P33C)(H2'Q8')(N3+N4+N7+N5)+(O6O5'O4O3'\phi5\phi7'X1'P33C)(J2'Q8)(N3+N4+N7+N5)+(O6O5'O4O3'\phi5\phi7'X2'F5F2'F1'C)(H2'Q8')(N3+N4+N7+N6)+(O6O5'O4O3'\phi5\phi7'X2'F5F2'F1'C)(J2'Q8)(N3+N4+N7+N6)$$

This check last for one full drum revolution. The computer then advances to sequence $\phi6$ by Q3C. During $\phi6$ the $\underline{Md}$ driver comes on, which is the signal for the information to be copied into the selected permanent memory channel from the working channel.

$$\underline{Md}=(O6O5'O4O3')\phi6\phi7'$$

The $\underline{M0}$ flip-flop records zeros in the main memory and the $\underline{M1}$ flip-flop records ones. The explanation of the logic terms for these flip-flops has been presented earlier.

The copying-in procedure advances sequences $\phi6$ and $\phi7$ or two drum revolutions. The computer advances into sequence $\phi7$ by the term:

$$\underline{Q3}=(O6O5'O4F'V0P34\phi0'\phi1'\phi2'\phi3'A2')\phi7'$$

The computer does not reset after $\phi7$ but instead $\phi4$ is turned on. During this sequence when both $\phi4$ and $\phi7$ are on the computer idles. When Q3C occurs again at the next F'V0P34C, the sequence register steps from $\phi4$ to $\phi5$. Thus $\phi5$ and $\phi7$ are both on. During this sequence the information in the main memory is compared with that in the check channel 65.

$$\underline{X1}'=(MrM4')(\phi7F5'F1C)+(Mr'M4)(\phi7F5'F1C)$$
$$\underline{X2}'=(F2'+F3+F4')(F2+F5')(F1'C)(MrM4')+(Mr'M4)\phi7O3'$$

Failure to check turns on $\underline{A2}$.

$$\underline{A2}=(X1'+X2')\phi7\phi5C$$

When Q3 comes on again, $\phi4$ is again turned on and the sequence register advances from $\phi5$ to $\phi6$. During this sequence which is defined by $\phi4\phi6\phi7$ the computer idles. During the next F'V0P34C, the computer is reset to sequence $\phi0$.

$$\underline{Q4}=O6O5'O4F'P34V0\phi7\phi6$$

101011 Copy the Master Into a Designated Channel

This order is carried out in exactly the same manner as the previous order with the exception of $\underline{Q8}$. $\underline{Q8}$ is the flip-flop that determines whether the H or the J channel should be operated on.

$$\underline{Q8}=L8O1+L8'O1'$$

101110 Copy a Designated Channel Into the Slave

This order causes the information in the designated channel to be copied into the slave.

During $\phi0$ the order is read into the order register. The computer then idles through sequence $\phi1$ until $\phi2$ at which time the address is read into the address register N. During $\phi3$ the search for the correct channel is made, however, no information is read into the check channel as in the two previous orders. During sequence $\phi4$ the computer idles until the next F'V0P34. During sequence $\phi5$ the channel is copied into the slave from $\underline{Mr}$ (FIGURE 46).

$$\underline{H3d}=O6O5'O4O3\phi5MrQ8'$$
$$\underline{J3d}=O6O5'O4O3\phi5MrQ8$$

The computer advances into sequence $\phi6$ after a complete drum revolution when F'V0P34 occurs.

$$\underline{Q3}=(O6O5'O4F'V0P34\phi0'\phi1'\phi2'\phi3'A2')\phi7'$$

During sequence $\phi6$, the alarm flip-flop $\underline{A2}$ is turned on if $\underline{X1}$ or $\underline{X2}$ is turned off due to a faulty comparison.

$$\underline{A2}=(O6O5'O4O3)(X1'+X2')\phi6C$$

At the next F'V0P34 the computer advances to sequence $\phi 7$ where it idles for one revolution and then resets to sequence $\phi 0$.

$\underline{Q4}=O6O5'O4O3F'P34V0\phi 7$

101111 Copy a Designated Channel Into the Master

This order causes the information in the designated channel to be copied into the master. It is carried out the same as the previous order with the exception that Q8 is set up so that the channel is copied into the master.

The invention may be embodied in other specific forms without departing from the spirit or essential characteristics thereof. The present embodiment is therefore to be considered in all respects as illustrative and not restrictive. While a preferred embodiment of the invention has been illustrated and described, the same is not to be limited to the details shown and described, except as defined in the appended claims.

What is claimed and desired to be secured by United States Letters Patent is:

In a calculating device, a rotatable magnetic recording data storage drum, a plurality of sensing heads mounted adjacent the periphery of said drum in spaced relation axially of said drum whereby each is associated with a distinct recording track about the periphery of said drum, the tracks associated with each of said sensing heads constituting a distinct section for data storage and each such track having recorded thereon a signal indicative of first and second interspersed series of binary digits representing respectively a section identification number and the complement of such number, a signal comparison circuit, means operable to establish a data transmission channel between a selected one of said sensing heads and said signal comparison circuit, selectively settable means for producing in timed relation with the sensing of the channel identification signals from the tracks on said drum a signal indicative of the binary identification number of a channel to be selected, and means for transmitting a signal produced by said selectively settable means to said comparison circuit for the determination of the identity of numerical significance thereof with the portion of the signal from the selected one of said sensing heads constituting such first series of binary digits and to assure that the numerical significance of each of its digits is the antithesis of that of the corresponding denominational digit of said second series.

References Cited in the file of this patent

UNITED STATES PATENTS

| | | |
|---|---|---|
| 2,522,609 | Gloess | Sept. 19, 1950 |
| 2,589,130 | Potter | Mar. 11, 1952 |
| 2,700,755 | Burkhart | Jan. 25, 1955 |
| 2,771,595 | Hendrickson et al. | Nov. 20, 1956 |

OTHER REFERENCES

E.R.A. Inc.: 24 Digit Parallel Computer With Magnetic Drum Memory, St. Paul, Minn., 1949, pp. 27–28 and FIGS. 3.2–2, 3.3–11.